United States Patent
Schwalbe et al.

(10) Patent No.: US 6,537,506 B1
(45) Date of Patent: Mar. 25, 2003

(54) MINIATURIZED REACTION APPARATUS

(75) Inventors: Thomas Schwalbe, Bad Vilbel (DE); Klaus Golbig, Maintal-Doernigheim (DE); Michael Hohmann, Darmstadt (DE); Petra Georg, Frankfurt (DE); Andreas Oberbeck, Wiesbaden (DE); Bernd Dittmann, Sulzbach (DE); Jiri Stastna, Eschborn (DE); Sebastian Oberbeck, Greifenstein (DE)

(73) Assignee: Cellular Process Chemistry, Inc., Kennewick, WA (US)

( * ) Notice: Subject to any disclaimer, the term of this patent is extended or adjusted under 35 U.S.C. 154(b) by 0 days.

(21) Appl. No.: 09/496,999

(22) Filed: Feb. 3, 2000

(51) Int. Cl.$^7$ ................................................. B01J 19/00
(52) U.S. Cl. ........................ 422/130; 422/99; 422/100; 422/129; 422/131; 422/138
(58) Field of Search ......................... 422/99, 100, 102, 422/129, 130, 131, 138, 224; 436/164, 174, 809; 435/287.1, 287.8, 288.3, 288.4

(56) References Cited

U.S. PATENT DOCUMENTS

| | | | |
|---|---|---|---|
| 3,881,701 A | 5/1975 | Schoenman et al. ........... 259/4 |
| 4,222,671 A | 9/1980 | Gilmore ....................... 366/337 |
| 4,728,502 A | 3/1988 | Hamill ......................... 422/116 |
| 5,209,906 A | 5/1993 | Watkins et al. .............. 422/200 |
| 5,534,328 A | 7/1996 | Ashmead et al. ............ 428/166 |
| 5,580,523 A | 12/1996 | Bard ............................ 422/50 |
| 5,595,712 A | 1/1997 | Harbster et al. ............. 422/129 |
| 5,641,400 A | * 6/1997 | Kaltenbach et al. ...... 210/198.2 |
| 5,690,763 A | 11/1997 | Ashmead et al. ............. 156/60 |
| 5,698,485 A | * 12/1997 | Bruck et al. .................. 501/87 |
| 5,741,466 A | 4/1998 | Bodnaras .................... 422/228 |
| 5,811,062 A | 9/1998 | Wegeng et al. .............. 422/129 |
| 5,928,880 A | * 7/1999 | Wilding et al. ............. 435/7.21 |
| 5,961,932 A | 10/1999 | Ghosh et al. ................ 422/193 |
| 5,976,472 A | 11/1999 | Chatterjee et al. .......... 422/130 |
| 5,993,750 A | * 11/1999 | Ghosh et al. ................ 422/191 |
| 6,036,927 A | * 3/2000 | Chatterjee et al. .......... 422/211 |
| 6,126,723 A | * 10/2000 | Drost et al. ...................... 96/4 |
| 6,171,865 B1 | * 1/2001 | Weigl et al. .................. 436/52 |
| 6,192,596 B1 | * 2/2001 | Bennett et al. ................. 34/76 |
| 6,221,226 B1 | * 4/2001 | Kopf-Sill ..................... 204/602 |
| 6,264,900 B1 | * 6/2001 | Schubert et al. ............. 422/224 |

* cited by examiner

*Primary Examiner*—Jill Warden
*Assistant Examiner*—Dwayne K. Handy
(74) *Attorney, Agent, or Firm*—Ronald M. Anderson

(57) ABSTRACT

A stacked plate chemical reactor in which simple plates, each incorporating no surface features other that an opening, are stacked together. When openings in adjacent plates are properly aligned, a fluid pathway is defined between inlet ports for each chemical reactant and an outlet port for a chemical product. In one embodiment of the invention, sixteen simple plates are stacked to provide a reactor incorporating three heat transfer fluid pathways, two reactant fluid pathways, one product fluid pathway, multiple mixing chambers, multiple reaction chambers, two reactant pretreatment heat exchangers, two reaction chamber heat exchangers, and multiple temperature sensor pathways. Precise dimensional control of the reactant fluid pathway height enables stacked laminar flow paths for the reactants to be achieved, allowing efficient and rapid diffusion mixing to occur. Because the simple plates incorporate no features other than openings, fabrication of such plates is easily achieved. Different reactor designs, having additional reactant pathways, more or fewer heat transfer fluid pathways, more or fewer heat exchangers, more or fewer mixing chambers, more of fewer reaction chambers, and more or fewer sensor pathways can readily be achieved by adding or removing plates from the stack, and or by changing the pattern and number of openings in the simple plates that are used. The simple plates can be field in the stack during use of the chemical reactor using pressure exerted on opposite outer simple plates of the stack, or can be permanently joined. A preferred material for the fabrication of the plates is stainless steel, although other materials such as glass, plastic, and other metals can alternatively be used, which are compatible with the selected reactants and the desired product.

61 Claims, 13 Drawing Sheets

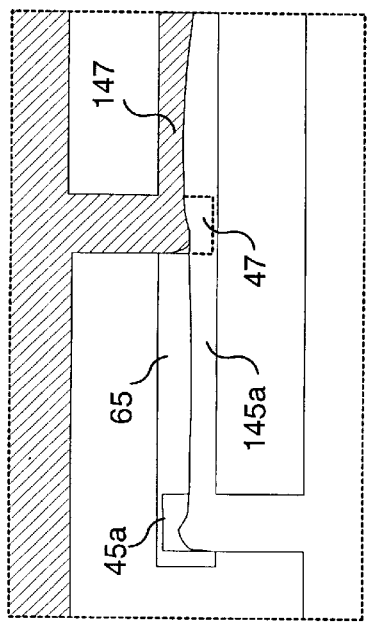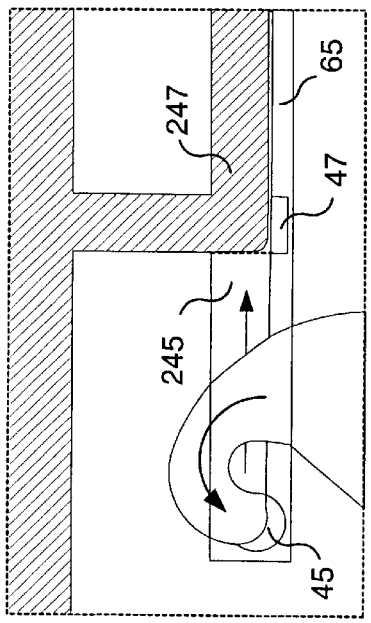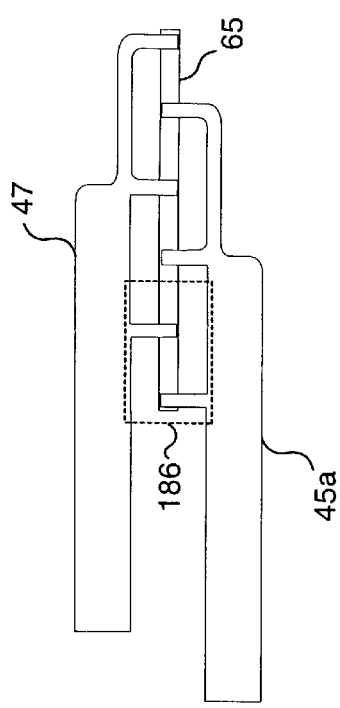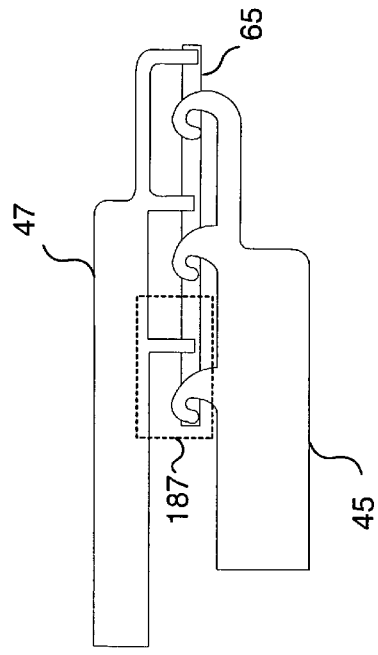
FIG. 22
FIG. 23

MINIATURIZED REACTION APPARATUS

FIELD OF THE INVENTION

This invention generally relates to a miniaturized chemical processing apparatus, and more specifically, to a miniaturized chemical processing apparatus assembled from stacked plates that cooperate to provide fluid channels for conveying reactants and other fluids.

BACKGROUND OF THE INVENTION

Methods of controlling and optimizing processes for producing chemical compounds are well known. The control of parameters such as temperature, pressure, mixing conditions, relative volumes of the reactants, and the use of catalysts are generally well understood. Traditionally, newly discovered chemical compounds and processes involving either the production of such compounds, or processes involving the use of such compounds, have been initially carried out by researchers in "bench-scale" environments. Particularly promising chemicals or processes may ultimately be produced in quantity by application to industrial scale processes. Often, problems are encountered in scaling up a process from the laboratory to industrial scale production.

Problems associated with moving from bench-scale production to industrial scale production often involve changes in process conditions between the bench-scale environment and the industrial environment. For example, the temperature of the reactants within a small beaker or flask in a laboratory is much easier to keep constant than the temperature within a production tank having a capacity of hundreds of liters, as is often the case in a chemical processing plant. Variations in other process conditions within a large tank are also more difficult to control, and frequently effect the quality and yield of the desired product.

Another aspect of laboratory development of processes to produce chemical compounds is that often potentially dangerous chemicals are used to create the desired product. Fires and explosions in research laboratories and concomitant injury to personnel and property are well known risks in the chemical research industry. The risks are not limited only to research only, as industrial chemical production facilities also may experience fires and explosions related to chemical production using dangerous chemicals. Often, due to the quantities of chemicals used in industrial scale processes, such accidents are significantly more devastating in an industrial setting than similar accidents in a research setting.

Recently, much attention has been directed to the use of micro-scale reactors for both development and production of chemical processes. These types of reactors offer several advantages. As noted above, the control of chemical processes within very small reactors is much simpler than control in a large-scale production tank. Once a reaction process has been developed and optimized in a micro-scale reactor, it can be scaled up to industrial production level by replicating the micro-scale reactors in sufficient quantity to achieve the required production output of the process. If such reactors can be fabricated in quantity, and for a modest cost, industrial quantities of a desired product can be manufactured with a capital expenditure equal to or even less than that of a traditional chemical production facility. An additional benefit is that because the volume of material in each individual reactor is small, the effect of an explosion or fire is minimized, and with proper design, an accident in one reactor can be prevented from propagating to other reactors.

Safety in the research setting is also improved, as such reactors generally require less exposure to hazardous substances and conditions by research personnel than traditional "wet-chemistry," which typically requires that the researcher physically handle chemicals in a variety of glass containers, often in the presence of an open flame and/or other heat sources. Any accident in such an environment is likely to increase the risk that the researcher will be exposed to hazardous chemicals, as well as the risk of causing significant damage to the laboratory. In contrast, small scale or microreactors can be designed as self-contained units that minimize the researcher's potential exposure to chemical substances. Since when using a microreactor, the researcher is not required to physically manipulate containers of chemical materials to carry out a desired reaction, the reactor can be located in an area so that if an accident should occur, any resulting fire or explosion can be relatively easily contained.

Another area in which microreactors offer an advantage over conventional chemical process development and production is in the mixing of reactants. A mixing channel of the proper scale encourages a laminar flow of the reactants within the channel and is readily achievable in a microreactor. A laminar flow enhances mixing by diffusion, which eliminates the need to expend energy to physically stir or agitate the reactants and is an extremely fast and efficient mixing technique.

Microreactors particularly offer great promise to the pharmaceutical industry, which engages in chemical research on many new chemical compounds every year, hoping to find a drug or chemical compound with desirable and commercially valuable properties. Enhancing the safety and efficiency of such research is valuable in and of itself. And, when coupled with the potential that these reactors offer for eliminating the problems of moving from bench-scale production to industrial production, it will be apparent that a microreactor suitable for use in carrying out a variety of chemical processes and having an efficient and low-cost design will be in high demand.

Several different designs for microreactors have been investigated. For example, such reactors are described in U.S. Pat. No. 5,534,328 and U.S. Pat. No. 5,690,763 (both listing Ashmead as the inventor). These patents describe reactors structures for chemical manufacturing and production, fabricated from a plurality of interconnected layers. Generally, each layer has at least one channel or groove formed in it and most include orifices that serve to fluidly connect one layer to another. These layers are preferably made from silicon wafers, because silicon is relatively inert to the chemicals that may be processed in the reactor, and because the techniques required to mass produce silicon wafers that have had the required channels and other features etched into their surfaces are well known.

A disadvantage of the reactors described by Ashmead stems from the rather expensive and complicated process for manufacturing the devices. While silicon wafer technology is advanced to the state that wafers having desired surface features can readily be mass produced, the equipment required is capital intensive, and unless unit production is extremely high, the substantial costs are difficult to offset. While Ashmead does suggest that other materials can be used to fabricate the layers, such as metal, glass, or plastic, the surface features required (grooves, channels, etc.) must still be formed in the selected material. The particular surface features taught by Ashmead require significant manufacturing steps to fabricate. For instance, while forming an opening into a material is relatively easy, forming a groove or channel that penetrates only part way through the material comprising a layer is more difficult, as the manufacturing process must not only control the size of the surface feature, but the depth, as well. When forming an opening that completely penetrates through a material comprising a layer, depth control does not need to be so precisely controlled. Ashmead teaches that not only openings that completely penetrate the layers are required, but also that surface features (grooves/channels) that do not completely penetrate the individual layers are required. Hence, multiple processing steps are required in the fabrication of each layer, regardless of the material selected. Accordingly, it would be desirable to develop a microreactor comprising layers that do not require such detailed fabrication.

A patent issued to Bard (U.S. Pat. No. 5,580,523) describes a modular microreactor that includes a series of fluidly connected modules, each module having a particular function (fluid flow handling and control, mixing, chemical processing, chemical separation, etc.). Bard specifically teaches that the plurality of modules are mounted laterally on a support structure, and not stacked, as disclosed by Ashmead. In a preferred embodiment of Bard, silicon wafer technology is again used to etch channels and/or other features into the surface of a silicon wafer. Other disclosed fabrication techniques include injection molding, casting, and micromachining of metals and semiconductor substrates. Again, the processing required to fabricate the individual modules goes beyond merely forming a plurality of openings into each component. Furthermore, the lateral layout of the reactor described by Bard requires a larger footprint than a stacked plate reactor. In Bard's reactor, the more modules added, the larger the footprint of the entire reactor. In contrast, when additional plates are added to a stacked plate reactor, the footprint of the reactor does not change, which can be a distinct advantage, as in many work environments the area an apparatus occupies on a work bench or floor is more valuable than the vertical height of the apparatus. It would be desirable to provide a reactor design that has a minimal footprint, while still providing the flexibility to add components to customize the reactor for a particular process.

In U.S. Pat. No. 5,961,932 (Ghosh), a reactor is described that is formed from a plurality of ceramic layers, which are fluidly connected, at least one layer including a permeable partition. In particular, Ghosh describes the desirability of sizing fluid channels appropriately to provide for laminar flow and mixing via diffusion, rather than mixing via turbulence. In his preferred embodiment, Ghosh describes that channels, chambers, and passageways are formed in each layer. The particular process Ghosh describes to accomplish this task involves fabricating the layers from "green" or uncured ceramic, which once shaped as desired, must be sintered. Significantly, the sintering process changes the size of the ceramic layer, so that the sizes of the features formed into the ceramic layer in the initial stages of production are not the sizes of the features in the finished product. It would be desirable to provide a reactor design in which the dimensions of the individual components can be rigidly controlled during fabrication, and not subject to shrinkage, which can negatively effect the dimensions of the finished reactor. This object is particularly important when a reactor design focuses on achieving a laminar flow, because precise dimensional control of fluid pathways in the reactor must be maintained to achieve a consistent laminar flow.

In all of these prior art reactors, relatively complicated manufacturing techniques are required. The manufacture of layers of silicon material requires a large capital investment. Sintering of a ceramic material requires the precise control of the shrinkage process, or individual components of a desired size cannot be achieved. In all cases, the prior art teaches that complicated structures (for example, fluid channels and reaction chambers) must be etched or otherwise fabricated in each layer. Additionally, orifices or passages also need to be formed in each layer, so that fluids can move between adjacent layers of the reactor. Thus, a series of different manufacturing steps typically must be performed for each layer. It would be desirable to provide a reactor design offering the advantages described above, that is relatively simple to manufacture, so as to minimize capital investment in scaling up production from the laboratory to the industrial level. It is therefore an aim of this invention to provide a micro-scale reaction apparatus that can be economically manufactured, can maintain a desired relatively narrow temperature range for a process, has a relatively modest footprint, and can provide efficient diffusion mixing using a precisely controlled laminar flow.

SUMMARY OF THE INVENTION

In accord with the present invention, a reactor is defined for reacting one chemical with at least one other chemical, for the purpose of forming a chemical product. The reactor includes a plurality of simple plates, each simple plate having at least one opening formed therein, the simple plates being stacked together to form a plurality of layers and arranges so that at least one opening in each simple plate overlaps at least one other opening in an adjacent simple plate, thereby forming at least one pathway between at least some of the layers.

Preferably, openings within different layers align so as to form at least one inlet port and at least one outlet port, for the receipt and discharge of chemicals, and to form at least one pathway for conveying chemicals to be processed. At least one pathway is formed that is in fluid connection with the inlet and outlet ports, and each simple plate has at least one opening formed in it.

A material from which the simple plates are fabricated is selected for compatibility with the chemical process. In one embodiment, the simple plates are formed from a material selected from the group consisting of crystalline wafers, ceramics, glasses, polymers, composite materials, and metals. Preferably, if formed from a metal, stainless steel is used. The material of the crystalline wafer is selected from the group consisting of silicon and germanium.

It is also preferable that the reactor accommodate a plurality of operations, including temperature control, control of chemical residence time, chemical mixing, and chemical reacting. Temperature control is achieved using a combination of one or more temperature sensors and one or more heat exchangers. Preferably, chemical mixing is carried out by employing pathways sized so that a reactant achieves a stacked laminar flow with respect to at least one other reactant.

In a reactor adapted for processing at least two reactants to form a desired chemical product, an inlet opening for each of the reactants and an outlet opening for the chemical product is provided in at least one of two outer simple plates. An intermediate simple plate is included for mixing the reactants and has at least one opening in fluid communication with each inlet opening and the outlet opening.

Generally, at least one heat transfer fluid inlet port is included in at least one of the outer simple plates, so that at least one heat transfer fluid can be introduced into the chemical reactor. Each heat exchanger is defined by an opening in a different intermediate simple plate. The opening is in fluid communication with the heat transfer fluid inlet and outlet ports and is disposed between adjacent simple plates.

Preferably, each heat exchanger is used to modify the temperature of at least one of the reactants and/or the chemical product. The heat exchangers can be used to modify a temperature of one of two reactants such that they are at different temperatures.

The chemical reactor typically includes a plurality of intermediate simple plates, and the openings in these plates define a first fluid path for a first of the at least two reactants, and a second fluid path for a second of the at least two reactants. Preferably, the plurality of intermediate simple plates define an inter-digital-mixer that separates and aligns the first fluid path and the second fluid path into a plurality of individual fluid paths. The plurality of individual fluid paths are then joined in a laminar flow pathway to provide a stacked laminar flow of the first and second reactants. The stacked laminar flow enables mixing of the reactants to be achieved by diffusion mixing. Preferably, a height of the joined fluid paths is reduced to enhance the diffusion mixing. In at least one embodiment, the height of each individual stacked laminar flow is reduced to less than 50 micrometers.

In one embodiment, a width of the laminar flow pathway is increased, so that a flow rate of a fluid in the pathway remains constant as the height of the pathway is reduced. Preferably, when the inter-digital-mixer separates and aligns the first fluid path and the second fluid path into a plurality of individual fluid paths, a pressure drop for each of the individual fluid paths are substantially equivalent. The inter-digital-mixer also ensures that when the first fluid path and the second fluid path are separated and aligned into a plurality of individual fluid paths, so that each individual fluid path enters the at least one opening in which the individual fluid paths are joined, from the same side.

In one embodiment, the openings in the plurality of intermediate simple plates share common shapes and sizes to the extent possible, to minimize fabrication costs. Preferably, all the simple plates are chamfered at one corner to provide a reference when assembling the simple plates to form the chemical reactor.

Because temperature control of reactants and the resulting product is critical to yield and purity, the chemical reactor preferably includes at least one temperature sensor to monitor a temperature of the product or at least one of the reactants. A temperature sensor is disposed in at least one of the outer simple plates, and another temperature sensor is disposed in at least one of the plurality of intermediate simple plates.

The thickness of the outer simple plates is about 3 millimeters, and that of the plurality of intermediate simple plates is at least about 0.2 millimeters, but not more than about 0.6 millimeters.

In one embodiment, the simple plates are removably held together in the stack by an applied compressive force. In such an embodiment, a housing provides the compressive force, producing a pressure acting on the outer simple plates. The mean surface roughness of the plates should be less than about 1 micrometers, and the simple plates should be substantially free of scratches. The pressure should be greater than or equal to 50 Newtons per square centimeter. In another embodiment, the simple plates are permanently joined. When permanently joined, the mean surface roughness of the plates is preferably less than about 5 micrometers. Permanent joining can be achieved using diffusion welding or vacuum soldering.

Preferably, when the thickness of the intermediate simple plates that are adjacent to a heat exchanger is about 0.3 millimeters. When a series of openings in the simple plates of the chemical reactor defines a fluid path for a heat transfer fluid that flow through more than one heat exchanger, the flow rate and fluid pressure of the heat transfer fluid within each such heat exchanger are substantially.

Another aspect of the present invention is directed to a method for producing stacked plate reactor, which includes steps generally consistent with the apparatus described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 22 is a schematic view of selected portions of an inter-digital-mixer that does not enable the desired stacked laminar flow of reactants; and FIG. 23 is a schematic view of selected portions of a preferred design for an inter-digital-mixer that does enable the desired stacked laminar flow of reactants.

DESCRIPTION OF THE PREFERRED EMBODIMENT

Figure 1:
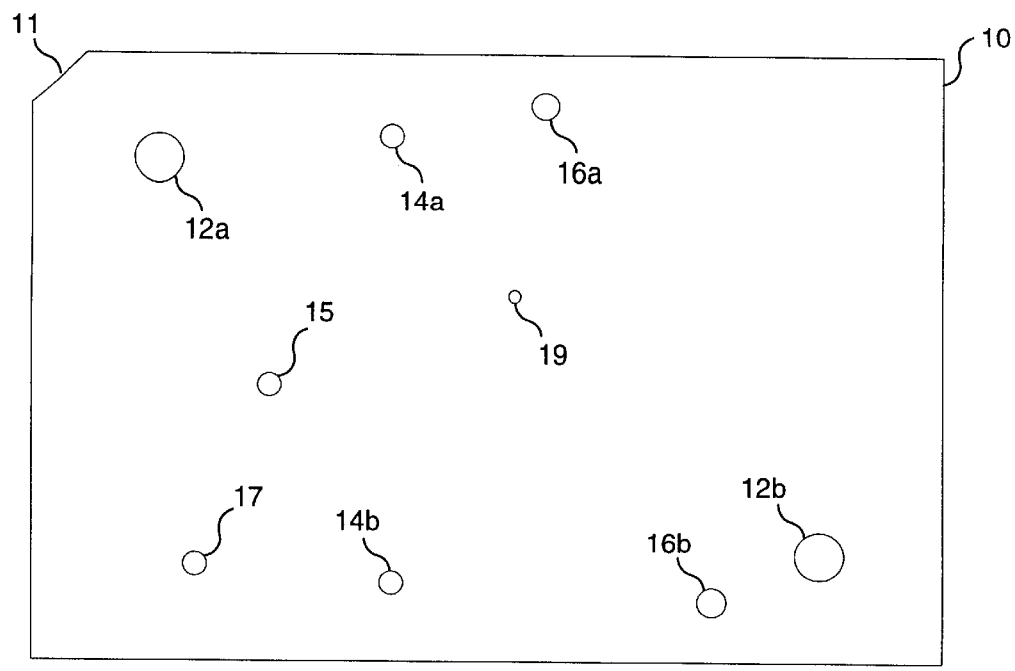
FIG. 1 is a plan view of a top simple plate of a preferred embodiment for a chemical reactor in accord with the present invention, including openings for reactants, heat transfer media inlets and outlets, and an opening for a temperature sensor.

The present invention is a miniaturized chemical reaction apparatus fabricated from a plurality of simple plates. Unlike prior art stacked layer chemical reactors that require relatively complicated surface features, such as grooves or channels that do not penetrate the component to be formed into each layer, the simple plates employed in the present invention require no more than an opening be formed through each plate. Machining or stamping openings into a flat plate is significantly less complicated than the silicon etching, injection molding, and ceramic molding/sintering processes described in the prior art for producing the surface features that the prior art uses to channel fluid flow. Yet the relatively simple technique of forming openings in a flat plate can be used to achieve a very useful chemical reactor, if the openings are properly placed, and the plates are properly configured and stacked so that the openings in the plates cooperate to convey fluids through the apparatus.

In the following description and the claims that follow, it will be understood that the term "simple plate" means a plate that has substantially planar opposed surfaces, e.g., a flat sheet of material. The simple plates used in the embodiments of the present invention disclosed herein are all generally rectangular and are characterized by having one or more openings that pass completely through the simple plate. Thus, the term "simple plate" as used herein and in the claims should be understood to mean a plate that does not include any etchings, grooves, or channels that do not completely penetrate the plate.

The term "groove," as used herein, should be understood to mean a surface feature that has been formed into the surface of an object, that does not penetrate completely through the object, and applies to components of prior art chemical reactors. The term "crystalline wafer," as used herein and in the claims that follow, means a material that has a crystalline structure and has been sliced into wafer-like components. Silicon and germanium are examples of materials employed for producing such crystalline wafers; however, it is not necessary for the material to be a semiconductor to comprise a crystalline wafer. Also, it is not necessary for the material to be a single element such as silicon or germanium, but rather such a material can be a mixture of several elements that together form a material, which can be fabricated into crystalline wafers. The fabrication techniques commonly used in the semiconductor industry to form substrate wafers can be employed to produce crystalline wafers.

In a preferred embodiment, the simple plates are formed of a high quality stainless steel, and standard metal working techniques such as stamping and/or milling are used to fabricate the simple plates. It should be understood that a variety of other materials can be used to fabricate simple plates. Metals other than stainless steel can alternatively be used, as well as other materials, such as glass, plastic, or a combinations of these materials. Crystalline wafers are another alternative material from which to form the simple plates. The use of other materials will be accompanied by fabrication techniques appropriate to the specific type of material, such as injection molding for plastic materials. The material used to fabricate the plates must be considered in light of the chemical properties of the reactants used in a particular reaction. Stainless steel is a relatively chemically inert material, and is an appropriate material for many chemical reactants. Tantal alloys and silver alloys are also expected to be useful. Hydrofluoric acid is a chemical that is extremely corrosive to metals and glass. Special plastic materials are appropriate when the desired reaction involves hydrofluoric acid. Those of ordinary skill in the art of chemical processing will readily understand how the choice of reactants necessitates an appropriate material be selected for fabricating the simple plates of the reactor.

A preferred embodiment of the present invention, as described below, represents a design that has been optimized for a liquid/liquid phase reaction involving two reactants. It should be understood that the underlying concept of the present invention, i.e., a reactor formed of a stack of plates incorporating only openings, can be applied to many other types of reactions, such as liquid/gas, gas/gas, liquid/solid, or gas/solid. As will be described in detail below, the preferred embodiment includes four heat exchangers; three heat transfer media pathways, and two reactant fluid pathways. However, it should similarly be understood that similar stacked plate reactors can be easily designed to include more or fewer heat exchangers, more or fewer heat transfer media pathways, and more reactant pathways.

The disclosed preferred reactor has been optimized for processing two component liquid/liquid reactions that generally require only temperature controls. However, it should be understood that other types of reactions, requiring additional processing controls, can be processed in a stacked simple plate reactor in accord with the present invention, if the reactor is optimized for that control parameter. For example, reactors can readily be designed to incorporate magnetic, piezoresistive, piezoelectric, shape memory, radioactive, catalytic, and electrostatic control parameters.

The plurality of stacked simple plates enables a reactor to be constructed that performs from one to all of the following functions: reactant conditioning, control of reactant supply, thermal pre-treatment, combination and mixing of reactants under controlled thermal conditions, intermediate thermal treatment, post-procedural isothermal containment, post-procedural thermal treatment of reactant products, and product separation. In particular, simple plates can readily be designed and fabricated in which the dimensional characteristics of the reactant fluid passages formed by the interconnected openings of the simple plates provide for a stacked laminar flow of the reactants. Such a stacked laminar flow ensures that a particularly efficient type of mixing, referred to as diffusion mixing, can occur.

The quality of the interconnections between the simple plates is of great importance, since the interconnections must be free of gaseous and liquid leakage. This requirement is achieved through a combination of specially prepared surfaces and use of simple plates that are fabricated to close tolerances. The individual simple plates can be assembled by pressure fitting (using clamps or a housing that encloses the simple plates and applies a compressive force to the outer plates), or individual simple plates can be permanently assembled using diffusion welding technology, vacuum soldering, or other suitable techniques for joining the simple plates together.

The pressure fitting technique has the advantage of allowing a reactor to be built using specific simple plates that can readily be disassembled so that the reactor design can be changed by adding or removing simple plates. In this manner, the same simple plates can be used in more than one reactor to effect different chemical processes. However, if the simple plates are assembled using pressure fitting, very good control of the surface finishes is required, with almost no scratches on the surface of the simple plates, and a mean surface roughness less than 1 μm. The pressure that should be applied to maintain a stack of simple plates that have been fabricated from metals into a reactor, to prevent gas or liquid leakage, is preferably about 50 Newtons/cm².

Successful diffusion welding to join metallic simple plates also requires a substantially scratch free surface, although the mean surface roughness can be increased up to 5 μm. In diffusion welding, the simple plates are pressed together and heated to about 1000° C. in a vacuum or inert atmosphere. At such temperatures, ions from each surface diffuse across the surface boundary layers, thus joining the surfaces.

Vacuum soldering is a technique that requires a mean surface roughness of less than 5 μm, although more scratches can be tolerated than in diffusion welding. The simple plates are first coated with a thin film (3–5 μm) of silver, either by sputtering, vapor deposition, or electrical deposition. Other metallic films, such as gold or copper, can also be used. The simple plates are then heated in a vacuum to about 900° C. The silver liquefies, filling any voids due to scratches or surface irregularities, and bonds the simple plates together to form a reactor.

It should be noted that when the reactor is assembled using diffusion welding or vacuum soldering, a superior bond can be obtained by minimizing the surface area that is to be bonded. Thus, simple plates that incorporate one or more openings occupying a significant portion of the surface area of the simple plates can be more efficiently bonded with either of these two techniques than simple plates with few or small openings that comprise only a small portion of their total area.

Preferably, any stacked simple plate reactor should have the ability to maintain a desired narrow temperature range within the reactor, so that reaction dynamics can be closely controlled. In a preferred embodiment, the reactant and heat transfer media enter the stacked simple plate reactor via vertically oriented fluidic channels. Reacted product and spent heat transfer media exit the reactor via similarly disposed vertically oriented fluidic channels. The chemical processing operations occur in horizontally disposed channels within the reactor. It should be noted that the use of the term channel when used in conjunction with a stacked simple plate reactor should not be construed to mean that such a channel corresponds to a groove formed into the surface of an individual plate. While each individual simple plate only has openings and no grooves, channels or other fluid pathways are easily obtained in a stacked simple plate reactor. To form a channel, an elongate narrow opening is formed in one simple plate and that simple plate is sandwiched between two simple plates that do not have a corresponding elongate opening. The top of the channel is defined by the upper simple plate, the sides of the channel are defined by the sides of the opening formed in the middle simple plate, and the bottom of the channel is defined by the bottom plate. Thus, the depth of the channel is the same as the thickness of the middle simple plate. Fluid pathways between adjacent simple plates within a stacked simple plate reactor are created when openings through the stacked simple plates are aligned.

To achieve precise control of the desired reactions, the stacked simple plate reactor preferably includes a control circuit with several temperature sensors, as well as flow controls for a heat transfer media that is circulated through the reactor. The sensors may be disposed outside of the stacked simple plate reactor, but are preferably disposed either within the stacked simple plate reactor, or in the reactor housing, if such housing is provided. Note that if the simple plates are permanently joined, or clamps are used to press the simple plates together, then a reactor housing is not required. The control circuit may similarly be mounted externally, or disposed within the stacked simple plate reactor, or within the reactor housing (if such a housing is provided).

The fluidic system of the stacked simple plate reactor is preferably characterized by having a small pressure drop across the entire system. Furthermore, potential clogging problems are minimized by having few constrictions within the reactor, by introducing as few sharp directional flow changes as possible, by maintaining a small inner volume (about 1 ml), and by enabling rapid diffusion mixing in the mixing portion of the reactor. Preferably, fluidic channel geometries range from 100–500 μm, especially with respect to reactant fluid pathways (the dimensions of any heat transfer media pathways are less critical), and the walls separating the heat transfer media from the reactants or product should be of similar scale, to enable rapid heat transfer. As discussed above, several materials can be used to fabricate a stacked simple plate reactor; however, simple plates that are adjacent to openings in those simple plates comprising heat exchangers are preferably fabricated from a material that has good thermal conductivity. However, if the dimensional thickness of each plate adjacent to a heat exchanger is small, on the order of 0.3 mm, the effect of the thermal conductivity of different materials is negligible.

In general, the openings in each simple plate of a stacked simple plate reactor correspond to a fluid pathway established by stacking a plurality of simple plates, such that openings in simple plates above and below overlap, thereby allowing fluids to move throughout the reactor. Openings may also correspond to passageways for sensors, particularly temperature sensors. Preferably, to maximize heat transfer, the fluid flow directions of the heat transfer media within openings defining a heat exchanger are opposite to the direction of reactant flow.

Figure 2:
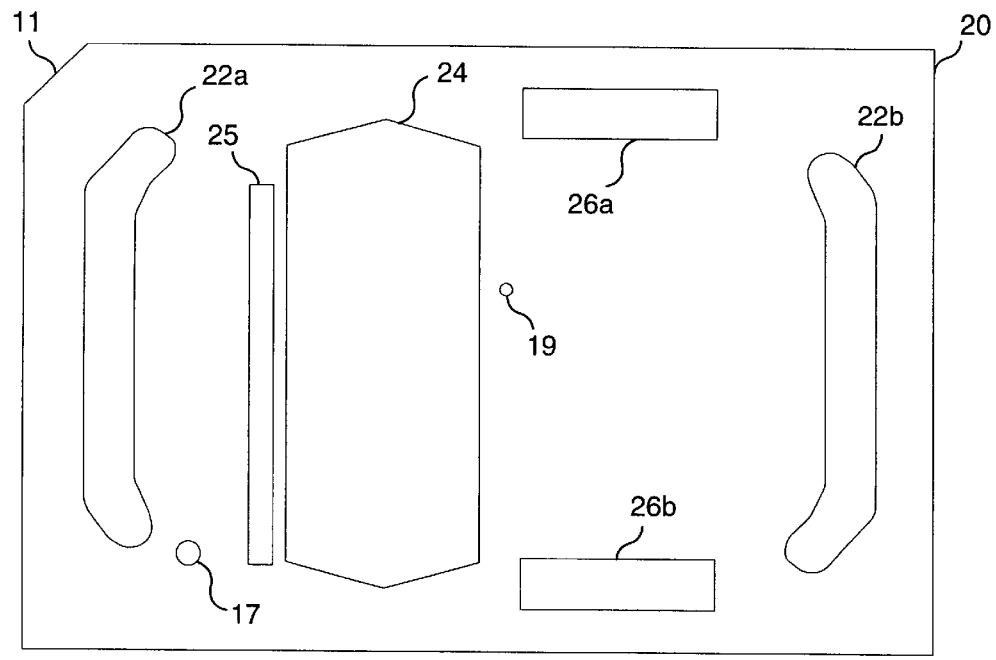
FIG. 2 is a plan view of the second simple plate of the preferred reactor, showing a plurality of heat exchanger manifolds, a first reactant opening, a second reactant distributor, and a first heat exchanger.
Figure 15:
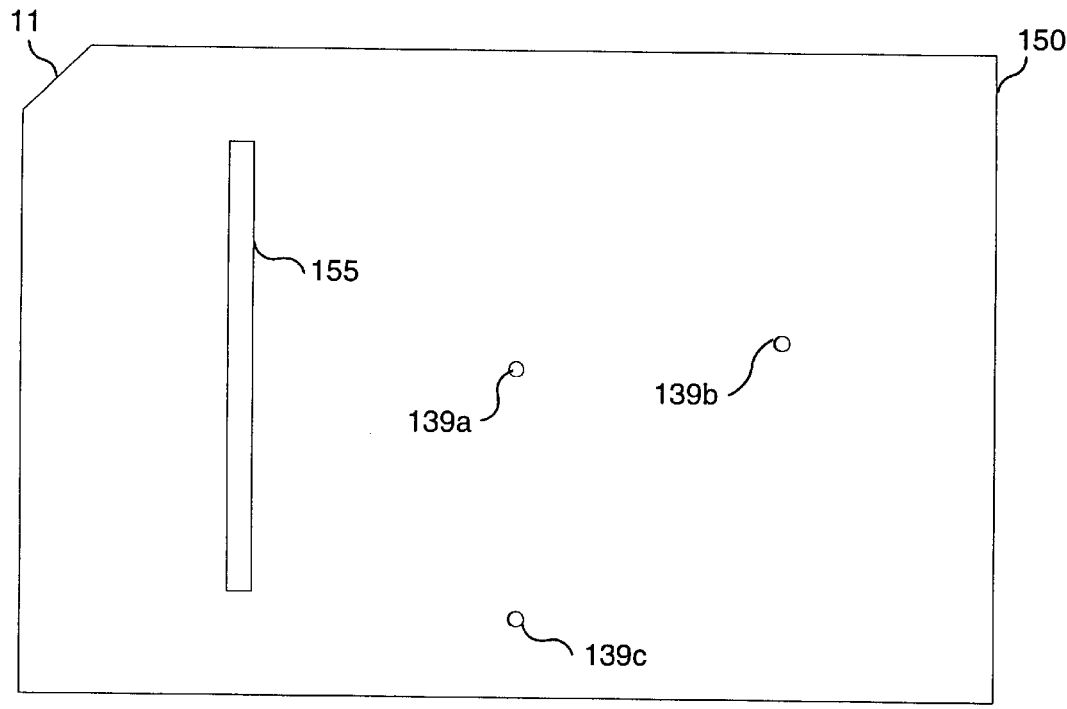
FIG. 15 is a plan view of the fifteenth simple plate of the preferred reactor, illustrating a product channel and a plurality of temperature sensing openings.
Figure 16:
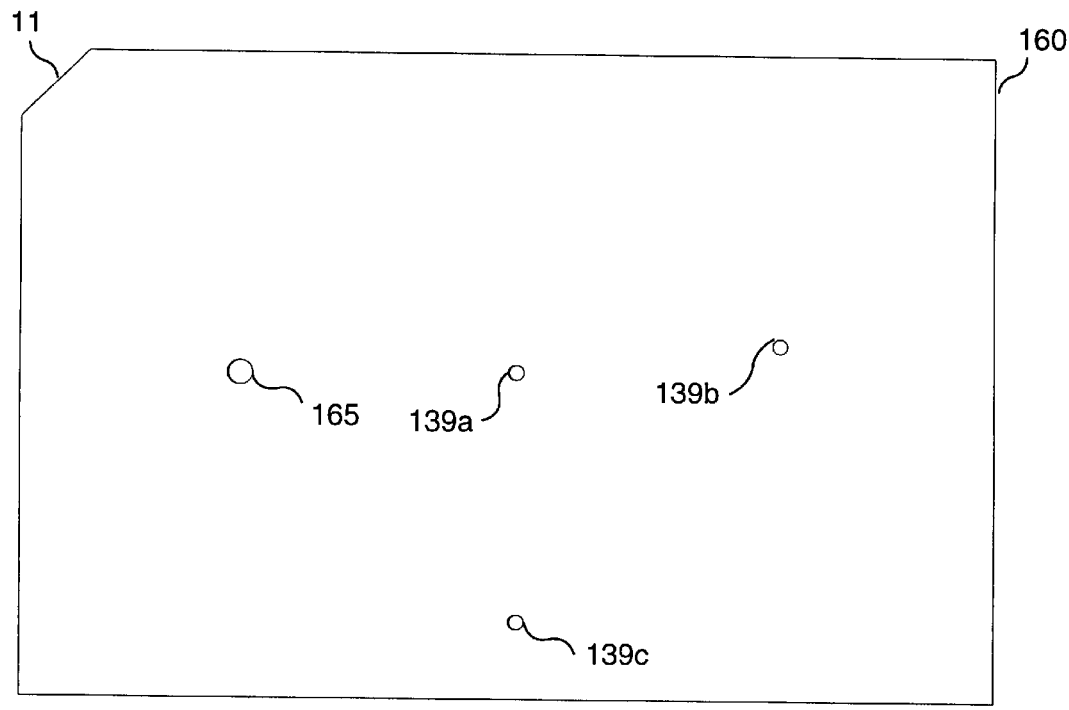
FIG. 16 is a plan view of the sixteenth and bottom simple plate of the preferred reactor, illustrating a product withdrawal opening and a plurality of temperature sensor openings.
Figure 17:
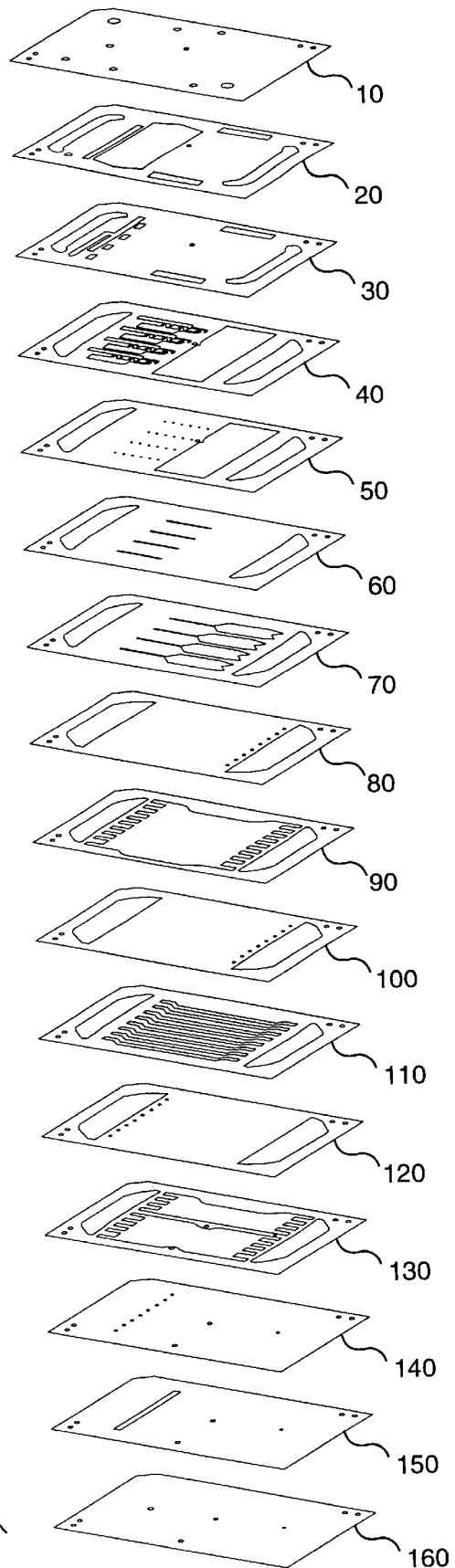
FIG. 17 is an exploded isometric view of the preferred reactor, illustrating how all sixteen simple plates are stacked.
Figure 18A:
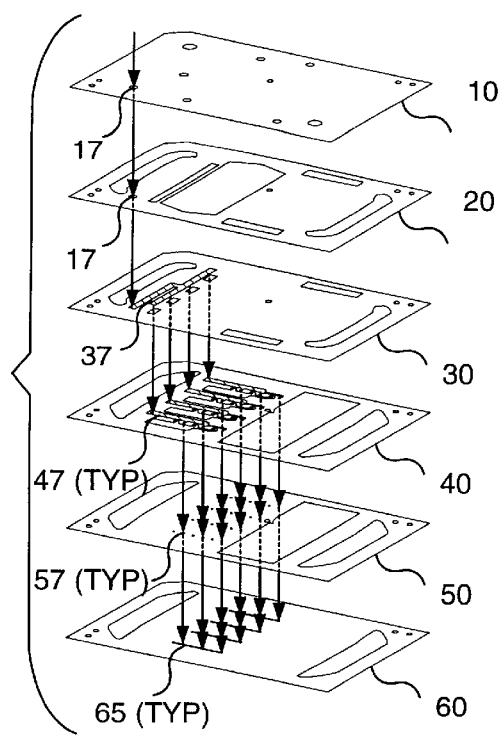
FIG. 18A is an exploded isometric view of the first six simple plates of the preferred reactor, illustrating a fluid path for a first reactant.
Figure 18B:
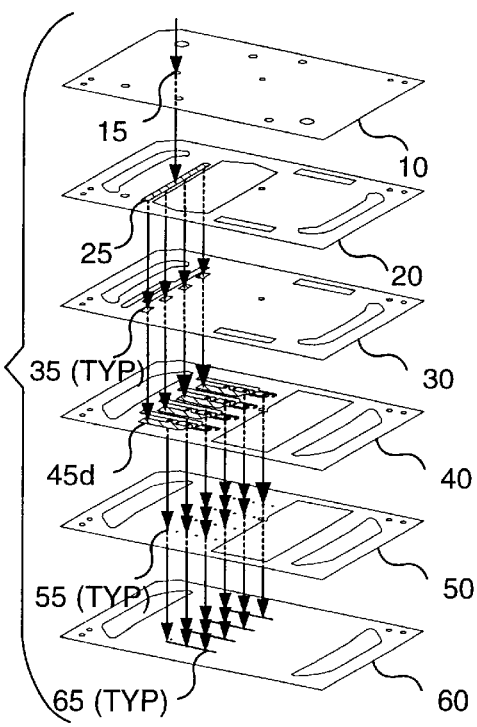
FIG. 18B is an exploded isometric view of the first six simple plates of the preferred reactor, illustrating a fluid path of a second reactant.
Figure 18C:
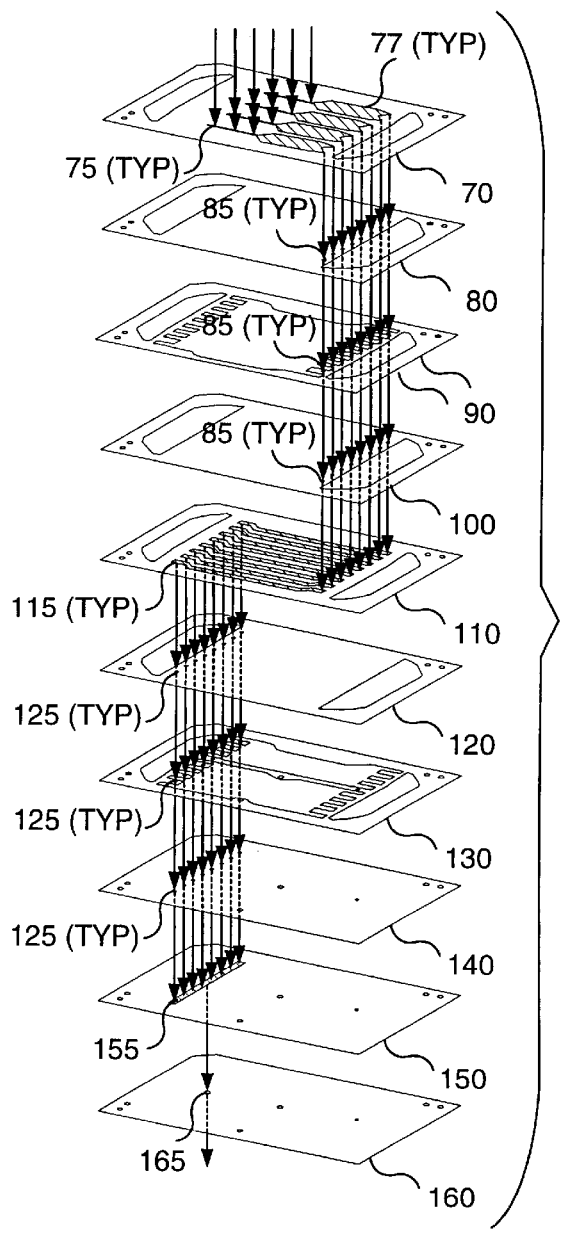
FIG. 18C is an exploded isometric view of simple plates seven through sixteen of the preferred reactor, illustrating the combined fluid paths of the first and second reactants after they have been mixed, and then through the balance of the preferred reactor.
Figure 19A:
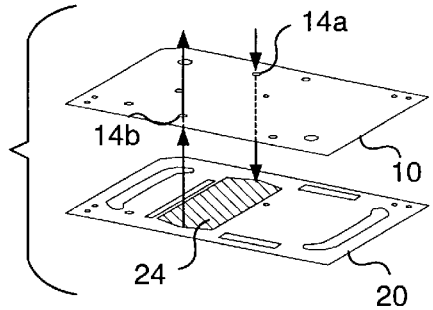
FIG. 19A is an exploded isometric view of the first two simple plates of the preferred reactor, illustrating a fluid path for heat transfer media servicing the first heat exchanger.
Figure 19B:
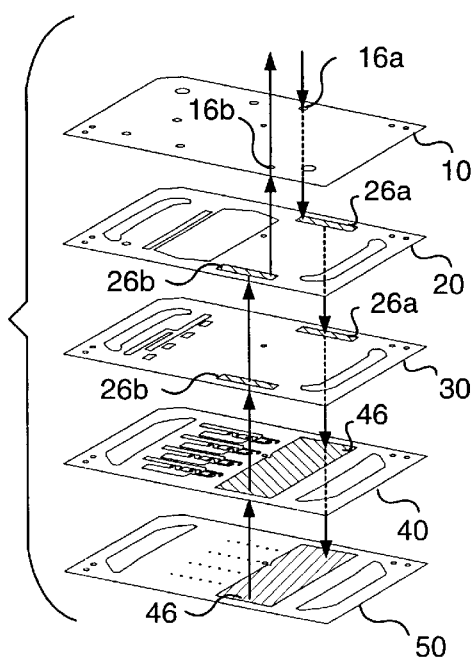
FIG. 19B is an exploded isometric view of the first four simple plates of the preferred reactor, illustrating a fluid path for heat transfer media servicing the second heat exchanger.
Figure 19C:
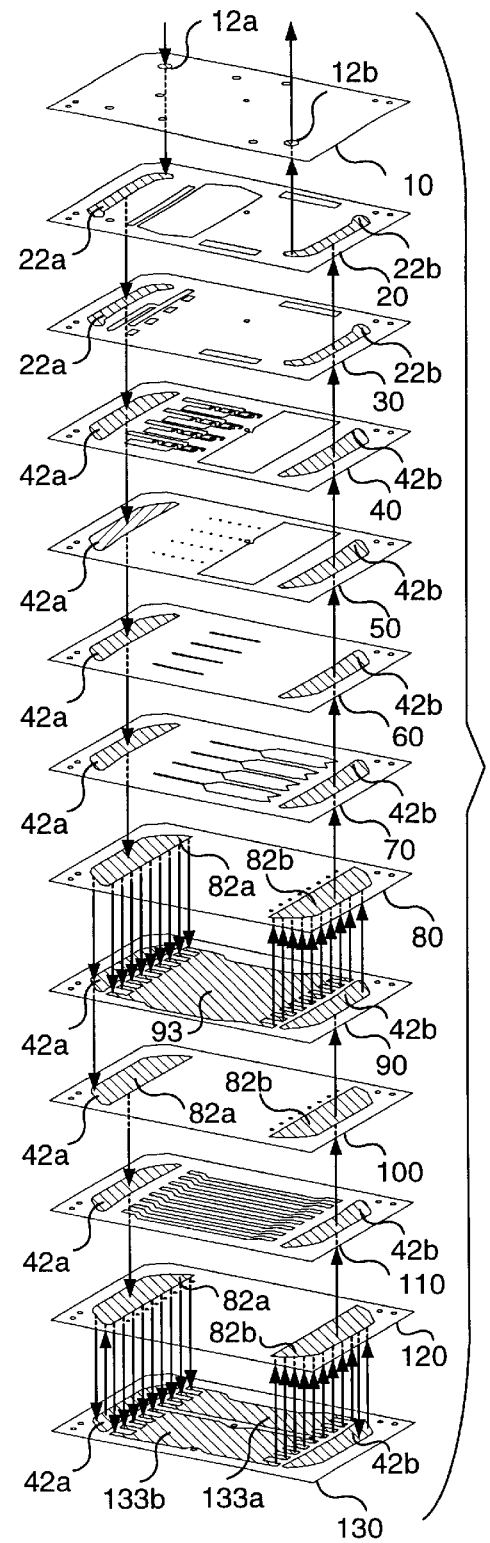
FIG. 19C is an exploded isometric view of the first thirteen simple plates of the preferred reactor, illustrating the fluid paths for heat transfer media servicing heat exchangers three and four.

FIGS. 1–16 illustrate simple plates 1–16, with FIG. 1 representing a top simple plate 10, and FIG. 16 illustrating a bottom simple plate 160. The preferred reactor includes these 16 simple plates, stacked one on top of another, in layers. In the Figures, the Figure number corresponds to the layer or plate of the reactor for FIGS. 1–16. Thus, FIG. 1 represents the first layer; FIG. 2 represents the second layer, and so on. FIG. 17 shows the orientation of the simple plates stacked one on top of another. FIGS. 18A–18C show the reactant fluid paths (for Reactants A and B) through the stacked plate design. FIGS. 19A–19C illustrate the fluid paths of heat transfer media to each heat exchanger within the stacked plate design. FIGS. 20–23 illustrate further details related to achieving the desired stacked laminar flow, which is critical to the success of this design, as such laminar flow enables rapid and efficient diffusion mixing to occur.

With reference to FIG. 1, a preferred shape for the simple plates is generally rectangular, though other shapes, such as circular disks, can also be used. It should be noted that all plates preferably include a chamfered edge, to aid in the stacking of the plates in the proper orientation relative to each other. If one plate were oriented in the wrong direction, it is likely that at least one, if not all, of the fluid paths through the reactor would be blocked, disrupted, or improperly joined, and the reactor would likely not be functional. Thus, top plate 10 has a chamfer 11, in the upper left-hand corner. It is not relevant at which corner the chamfer is disposed, as long as all the chamfers on all the succeeding plates are orientated and positioned in the same way, to ensure that once assembled, continuous fluid paths for reactants and heat transfer media are achieved in the stacked simple plate reactor. Similarly, a different type of indexing feature than a chamfered edge could be used as an alignment reference, such as a slot or other mark or shape variation consistently represented on each simple plate. The chamfered corner is preferred, as it is a feature easily incorporated into a simple plate, and chamfers are already recognized as alignment indicators, and widely used in the semiconductor industry on silicon wafers.

In addition to chamfer 11, top simple plate 10 incorporates a plurality of openings for heat transfer media, reactants, and a temperature sensor. Top simple plate 10 incorporates three heat transfer media inlets 12a, 14a, and 16a (for heat transfer media A–C, respectively) and three heat transfer media outlets corresponding to each heat transfer media inlet; including an outlet 12b for a heat transfer media A, an outlet 14b for a heat transfer media B, and an outlet 16b for a heat transfer media C. Two reactant inlet ports are also provided, an opening 15 for a Reactant A, and an opening 17 for a Reactant B. A temperature sensor opening 19 is also provided and will be aligned with corresponding temperature sensor openings in other simple plates, thus forming a temperature sensor passageway within the reactor in which a temperature sensor can be inserted and disposed at a desired location within the stacked simple plate reactor.

FIG. 2 illustrates the second layer of the preferred reactor, showing a second simple plate 20. As described above, second simple plate 20 also includes chamfer 11. Openings corresponding to every opening in simple plate 10 are also providing in simple plate 20; however, it should be noted however that almost all of the openings are shaped differently. Heat transfer media A, entering the reactor from inlet 12a in simple plate 10, passes through second simple plate 20 via a heat transfer media A intake manifold 22a. After progressing through subsequent simple plates of the preferred reactor, heat transfer media A again passes through simple plate 20, this time via a heat transfer media A exhaust manifold 22b. From that point, heat transfer media A exits the preferred reactor via outlet 12b in top simple plate 10.

In second simple plate 20, heat transfer media B services a first heat exchanger 24. Heat transfer media B enters first heat exchanger 24 through inlet 14a in top simple plate 10, and flows from first heat exchanger 24 via outlet 14b in top simple plate 10. Reactant A flows into a Reactant A distributor 25 in second simple plate 20, while Reactant B, passes through second simple plate 20 via Reactant B opening 17. Heat transfer media C flows through second simple plate 20 using a heat transfer media C intake manifold 26a, passing through subsequent simple plates and then returning via a heat transfer media C exhaust manifold 26b. Temperature sensor A (not shown) passes through second simple plate 20 within temperature sensor opening 19.

The fluid paths of heat transfer media A–C, and the purposes of the four separate heat exchangers in the preferred stacked simple plate reactor will be discussed in detail below, with respect to FIGS. 19A, 19B, and 19C. Briefly, the purpose of first heat exchanger 24 in simple plate 20 is to modify the temperature of Reactants A and B before they are combined. In many reactions, it is desirable for the reactants to be at the same temperature prior to mixing the reactants. However, there are certain reactions for which it is beneficial for a Reactant A and a Reactant B to be brought to different temperatures prior to mixing. It is envisioned that a stacked simple plate reactor can be designed to achieve this goal by changing the openings through the simple plates described above to provide for an additional heat exchanger. Thus, separate heat exchangers can be provided and used to separately modify the temperatures of Reactants A and B.

Figure 3:
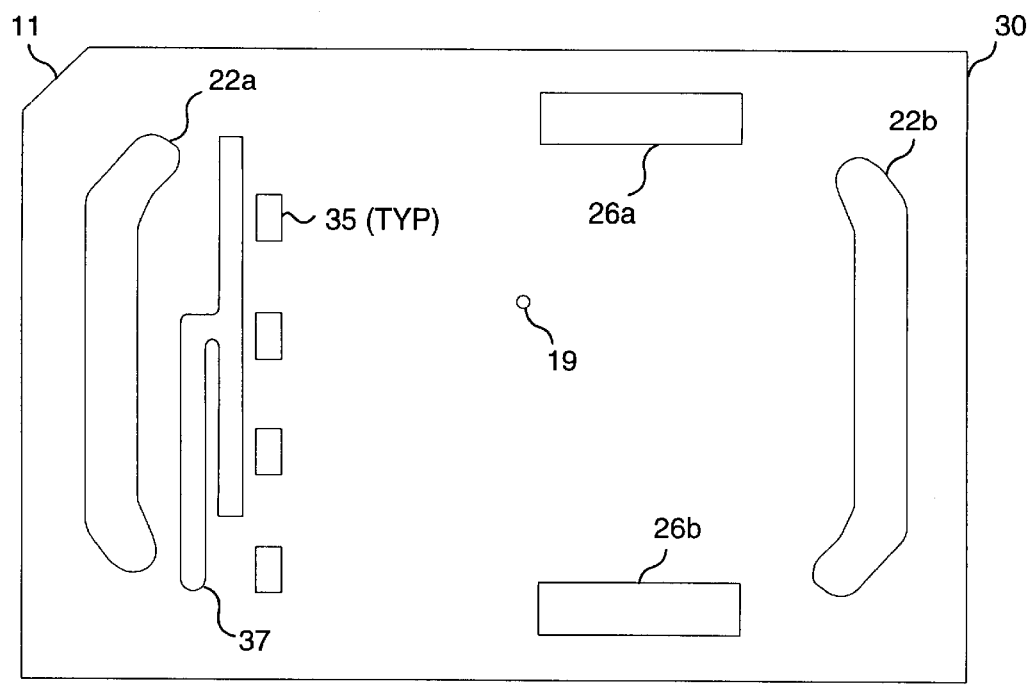
FIG. 3 is a plan view of the third simple plate of the preferred reactor, illustrating a plurality of heat exchanger manifolds, a first reactant distributor, and a second reactant opening.

FIG. 3 provides details of the passages in the third layer of the preferred reactor. A third simple plate 30 includes chamfer 11. Heat transfer media A flows through third simple plate 30 via heat transfer media A intake manifold 22a and out through heat transfer media A exhaust manifold 22b. Note that heat transfer media B does not flow through the third layer of the preferred reactor, as heat transfer media B feeds first heat exchanger 24 in second simple plate 20 in the second layer of the preferred reactor and is then exhausted through outlet 14b in top simple plate 10. Heat transfer media C flows through the third layer via heat transfer media C intake manifold 26a, and also via heat transfer media C exhaust manifold 26b. Reactant A flows through third simple plate 30 using a plurality of Reactant A fluid openings 35, which are fed from Reactant A distributor 25 in second simple plate 20. Reactant B enters the third layer of the preferred reactor via Reactant B opening 17 of second simple plate 20, and then flows into a Reactant B distributor 37 in third simple plate 30. Third simple plate 30 also includes temperature sensor opening 19.

Figure 4:
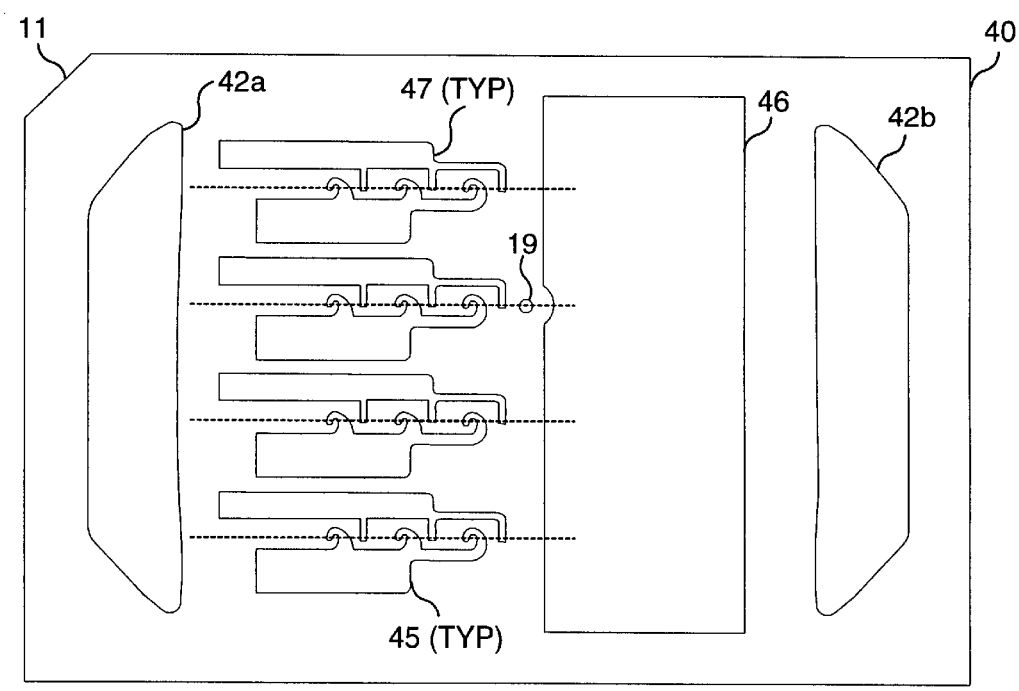
FIG. 4 is a plan view of the fourth simple plate of the preferred reactor, showing two heat exchanger manifolds, an inter-digital-mixer for the reactants, and a second heat exchanger.

FIG. 4 provides details of the fourth layer of the preferred reactor, showing a fourth simple plate 40, which has chamfer 11. Heat transfer media A flows through fourth simple plate 40 via a heat transfer media A manifold 42a and out through a heat transfer media A exhaust manifold 42b. It should be noted that the shape of the heat transfer media A intake manifold and exhaust manifold in simple plate 40 have changed in shape from the corresponding heat transfer media A intakes 22a and exhaust manifolds 22b in second simple plate 20 and third simple plate 30. The functional significance of this shape change is to reduce the overall pressure drop in the reactor. The slight curve on the outside edges of intake manifold 42a and exhaust manifold 42b has been included to optimize the fluid flow of heat transfer media A within the preferred reactor. It should also be noted that because intake manifold 42a and exhaust manifold 42b are larger in size than intake manifold 22a and exhaust manifold 22b, the surface area of the simple plate is reduced. As noted above, a smaller surface area results in a superior bond if diffusion welding or vacuum soldering is used to assemble the simple plates in the stack.

Fourth simple plate 40 of FIG. 4 incorporates a second heat exchanger 46, which is serviced via heat transfer media C intake manifold 26a and heat transfer media C exhaust manifold 26b of simple plate 30. Second heat exchanger 46 moderates the temperatures of Reactants A and B as the two reactants enter mixing chambers in a subsequent layer of the preferred reactor.

Fourth simple plate 40 incorporates important features that effect the fluid paths of Reactants A and Reactants B. Collectively, these features are referred to as an "inter-digital-mixer." The purpose of the inter-digital-mixer is to precisely align the fluid paths of Reactants A and B, such that a stacked laminar flow is enabled, while also ensuring that an equal pressure drop is achieved for the two reactants. A stacked laminar flow is preferred to enable diffusion mixing to occur. Diffusion mixing is recognized as being both extremely fast and efficient.

Figure 5:
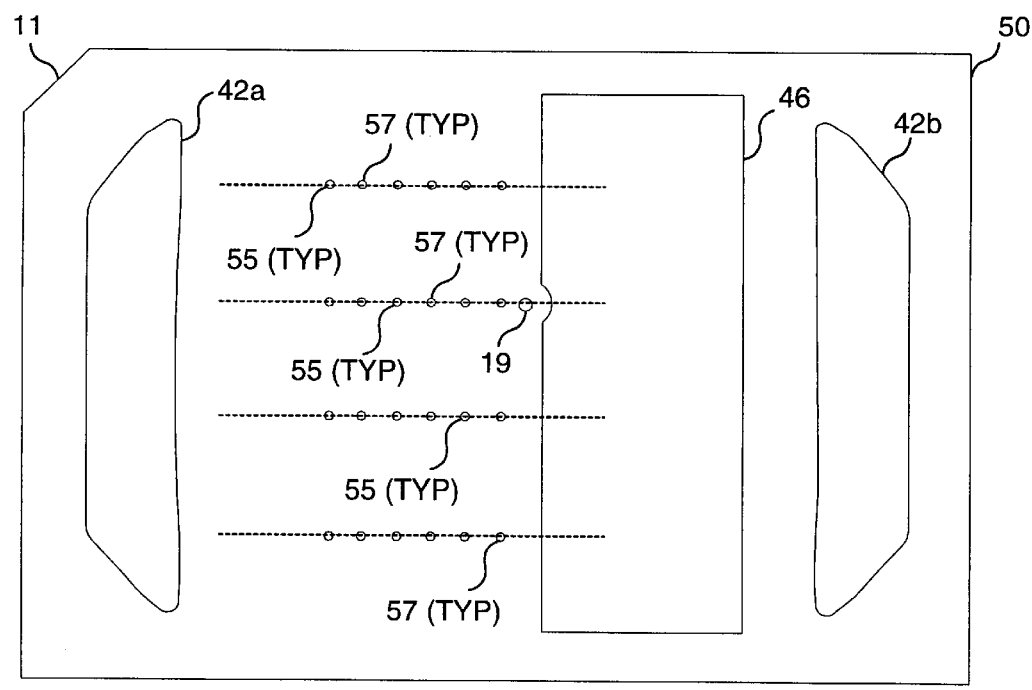
FIG. 5 is a plan view of the fifth simple plate of the preferred reactor, showing two heat exchanger manifolds, a plurality of openings for the reactants, and a second heat exchanger.

Reactant A flows through a series of openings 45, while Reactant B flows through a series of openings 47. Further details of the preferred stacked laminar flow will be provided below in conjunction with FIGS. 20–23. A series of dashed lines has been included on FIG. 4, to illustrate that certain portions of openings 45 and 47 are aligned. As will become clear in examining the details of the fifth layer of the preferred reactor and a simple plate 50, as illustrated in FIG. 5, once Reactants A and B have passed through the fluid paths formed by openings 45 and 47, the fluid paths of the reactants will be aligned. Simple plate 40 also includes temperature sensor opening 19.

Referring now to FIG. 5, a fifth simple plate 50 includes chamfer 11. Heat transfer media A passes through the fifth layer of the preferred reactor via heat transfer media A intake manifold 42a, and out through heat transfer media A exhaust manifold 42b. Fifth simple plate 50 also includes an opening corresponding to second heat exchanger 46. The purpose of having second heat exchanger 46 occupy two layers is to both increase the fluid capacity of second heat exchanger 46, and to also reduce the surface area of both simple plates 40 and 50, to provide better bonding. A functional reactor could be achieved by replacing second heat exchanger 46 in simple plate 40 with heat transfer media B intake manifold 26a and heat transfer media B exhaust manifold 26b (as in simple plates 20 and 30); however, the second heat exchanger of such a reactor would be slightly less effective.

The fifth layer of the preferred reactor also incorporates a plurality of fluid openings for Reactants A and B. Note that in the fifth layer, Reactants A and B have yet to be mixed together. The inter-digital-mixer of fourth layer (openings 45 and 47 in simple plate 40) has arranged the fluid paths of the reactants so that they are aligned in an alternating pattern. Notice that the dashed lines in simple plate 40 correspond to the plurality of Reactant A and B fluid openings in simple plate 50. The reactant fluid openings in simple plate 50 include twelve Reactant A openings 55, and twelve Reactant B openings 57. These openings are aligned in four rows of six openings, each row comprising three fluid openings for Reactant A, and three fluid openings for Reactant B, in an alternating pattern. Simple plate 50 also includes temperature sensor opening 19.

Figure 6:
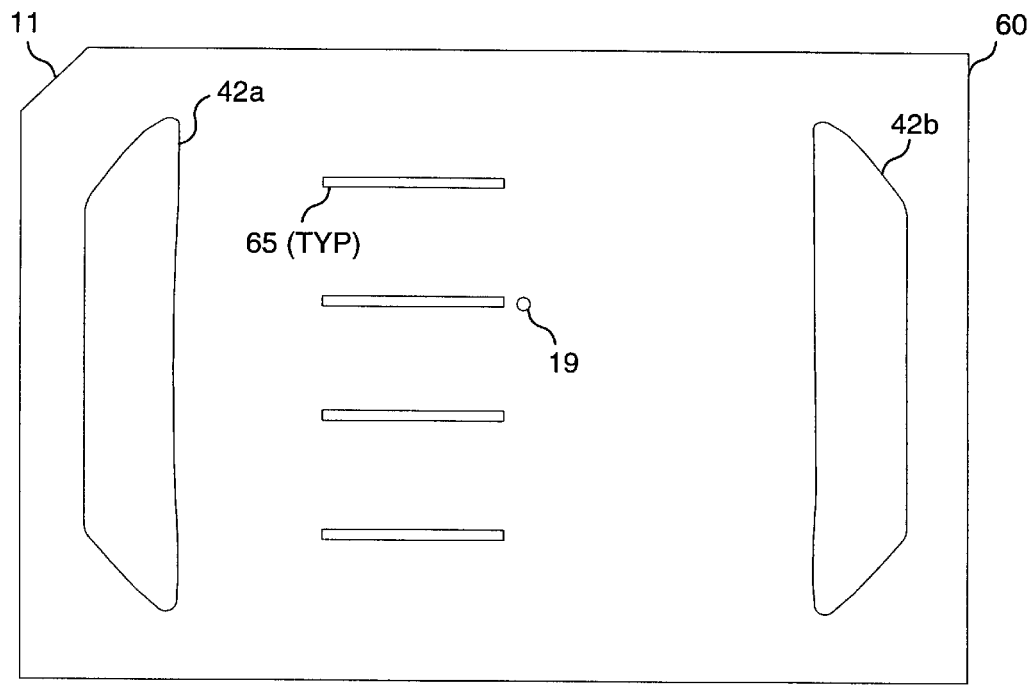
FIG. 6 is a plan view of the sixth simple plate of the preferred reactor, showing two heat exchanger manifolds, and a plurality of reactant fluid channels.

FIG. 6 provides details of the sixth layer of the preferred reactor, showing a sixth simple plate 60 that includes chamfer 11. Heat transfer media A flows through the sixth layer using a heat transfer media A intake manifold 42a and a heat transfer media A exhaust manifold 42b. It is in the sixth layer that the Reactants A and B are first intermingled. The sixth layer incorporates four stacked laminar flow fluid channels 65, which are fed from the as yet un-mingled, alternating fluid openings 55 and 57 in fifth simple plate 50. Thus, fluid channels 65 convey both Reactant A and Reactant B. As will be described in detail below, the reactants flow through fluid channels 65 in a stacked laminar flow pattern. The sixth layer also includes temperature sensor opening 19.

Note that second heat exchanger 46 of fourth and fifth simple plates 40 and 50 is adjacent to a solid portion of simple plate 60. Thus second heat exchanger 46 is modifying the temperature of that solid portion of sixth simple plate 60, which in turn will modify the temperature of a corresponding portion of the next layer of the reactor.

Figure 7:
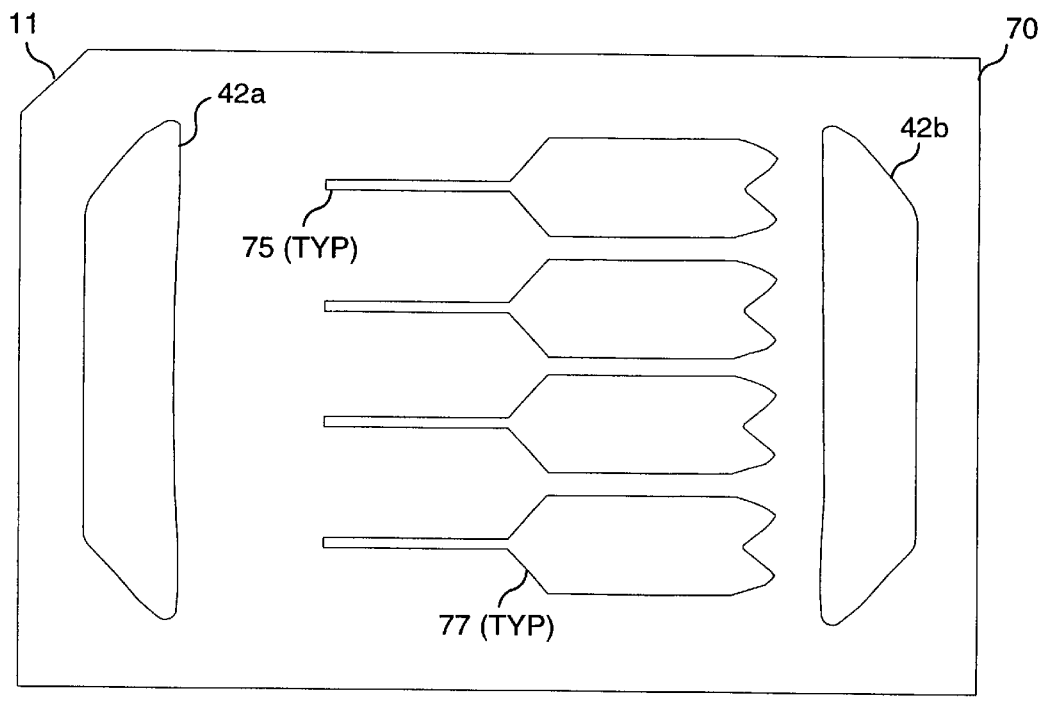
FIG. 7 is a plan view of the seventh simple plate of the preferred reactor, showing two heat exchanger manifolds, a plurality of reactant fluid channels, and a plurality of mixing chambers for the reactants.

The seventh layer of the preferred reactor includes a plurality of mixing chambers, which are fed from the combined fluid channels 65 of simple plate 60. FIG. 7 shows a seventh simple plate 70 that also incorporates chamfer 11. Heat transfer media A flows through the seventh layer via a heat transfer media A intake manifold 42a and a heat transfer media A exhaust manifold 42b. Reactants A and B flow through four fluid channels 75 in a stacked laminar flow pattern. These fluid passages are fed from the corresponding fluid channels 65 in the sixth layer. Four fluid channels 75 lead to four mixing chambers 77, one mixing chamber being included for each fluid passage. These mixing chambers provide sufficient residence time for rapid diffusion mixing to occur.

It should be noted that seventh simple plate 70 does not incorporate an opening for a temperature sensor. Preferably a temperature sensor passes through the first six layers of the reactor and is disposed immediately above seventh simple plate 70. In this position, the temperature sensor is positioned to be able to monitor the temperature of the mixture of Reactants A and B in one mixing chamber 77. The temperature thus monitored is used to determine parameters for heat transfer media C (which services second heat exchanger 46 of the fourth and fifth layers). The optimal temperature range for reactants in most reactions is known. In some cases, the temperature sensor will indicate that Reactants A and B in mixing chamber 77 are not yet at the desired temperature. Then heat transfer media C will be used to increase the temperature of the reactants in the mixing chambers (via second heat exchanger 46). In other cases, the temperature sensor (not shown) will indicate that Reactants A and B in mixing chambers 77 are hotter than the desired temperature, and second heat exchanger 46 will be used to lower the temperature of the reactants. Note that heat exchanger 26 in the second layer is used to modify the temperature of Reactants A and B in the inter-digital-mixer of the fourth layer to a desired level. Generally, that desired level will be the reaction temperature. It is possible for heat exchanger 26 to be used to modify the temperatures of Reactants A and B to a temperature that is not the same as the reaction temperature, and then to use heat exchanger 46 to modify the temperatures of Reactants A and B to obtain the desired reaction temperature.

Figure 8:
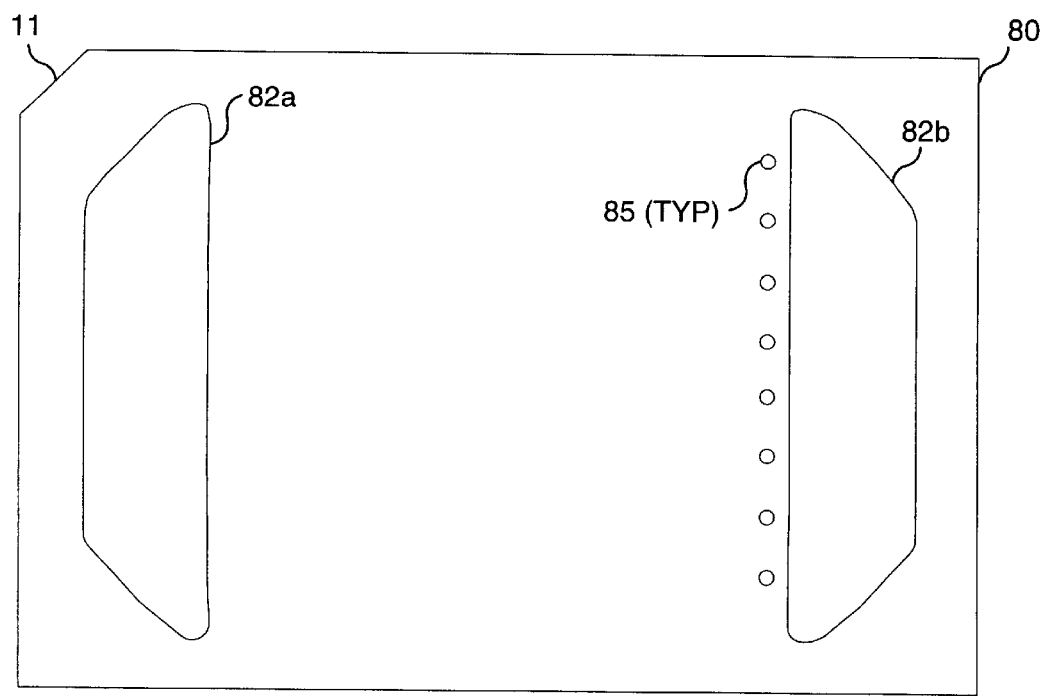
FIG. 8 is a plan view of the eighth simple plate of the preferred reactor, showing two heat exchanger manifolds and a plurality of product openings.
Figure 9:
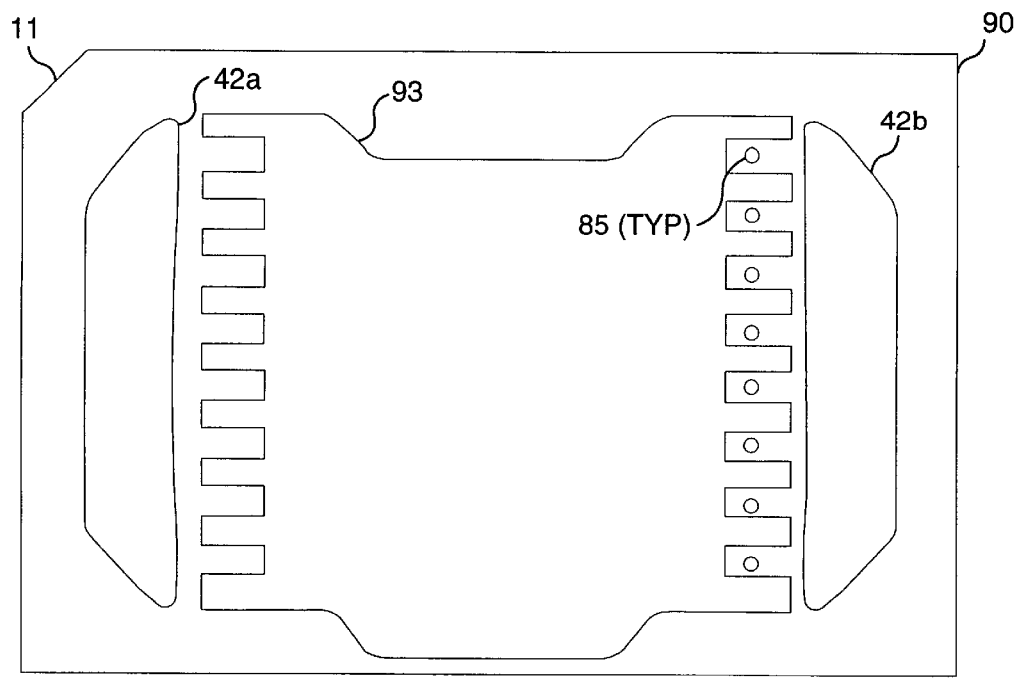
FIG. 9 is a plan view of the ninth simple plate of the preferred reactor, showing two heat exchanger manifolds, a third heat exchanger, and a plurality of product openings.

In the eighth layer of the preferred reactor, mixed Reactants A and B move from mixing chambers 77 and pass to lower layers of the reactor. FIG. 8 shows an eighth simple plate 80 that also incorporates chamfer 11. Heat transfer media A passes through the eighth layer, using a heat transfer media A intake manifold 82a, and a heat transfer media A exhaust manifold 82b. It should be noted that the size of heat transfer media A intake and exhaust manifolds 82a and 82b have changed relative to the sizes of the heat transfer media A intake and exhaust manifolds 42a and 42b of the preceding layers. The purpose of this change in size will become clear in examining a ninth layer of the preferred reactor, as shown in FIG. 9. Simple plate 80 includes a plurality of mixed reactant opening 85, which are in fluid communication with mixing chambers 77.

The ninth layer includes a third heat exchanger 93 that is used to moderate the temperature of the reactants as they pass through reaction channels in an eleventh layer of the preferred reactor. The ninth layer, as illustrated in FIG. 9, is a ninth simple plate 90 having chamfer 11. Now, mixed Reactants A and B flow through ninth simple plate 90 via mixed reactant openings 85. The path of heat transfer media A through ninth simple plate 90 is relatively complex, as compared to the paths of heat transfer media A through the previous layers of the preferred reactor. Heat transfer media A flows through ninth simple plate 90 via an intake manifold 42a, and an exhaust manifold 42b. Heat transfer media A is also flowing through third heat exchanger 93, which has a series of cutouts on both the right and left edges of the heat exchanger. These cutouts are disposed such that they overlap the enlarged areas of heat transfer media A intake and exhaust manifolds 82a and 82b of eighth simple plate 80. In this manner, heat transfer media A intake manifold 82a of eighth simple plate 80 services both heat transfer media A intake manifold 42a of ninth simple plate 90, and also heat exchanger 93 of ninth simple plate 90. Heat exchanger 93 is used to modify the temperature of a plurality of reaction channels in an eleventh layer, as will be described more in detail below, in conjunction with FIGS. 10 and 11.

It should be noted that the shape of third heat exchanger 93 has been designed and empirically tested to maximize fluid flow and heat transfer. For instance, the cut outs on the right side of third heat exchanger 93 are required for mixed reactant openings 85 to be included in layer 9. The left side of third heat exchanger 93 similarly has cut outs, but no mixed reactant openings 85 are located on the left side of simple plate 90, and theoretically cut outs are not required. However, as will be seen in FIG. 13, a fourth heat exchanger is required to have cut outs on the left side for product openings to pass through layer 13. Because the third and fourth heat exchangers moderate the temperature of the same area, reaction channels in layer 11, the fluid dynamics of both heat exchangers should be as similar as possible. Thus, while each heat exchanger is required to have cut outs on only one of the right or left side for fluid openings, each heat exchanger has been designed with cut outs on both the right and left sides to achieve as much fluidic equilibrium as possible.

The indentation on the top edge of third heat exchanger 93, and a similarly shaped protrusion on the bottom edge of third heat exchanger 93, are included so that the flow of heat transfer media within third heat exchanger 93 matches as closely as possible the flows of reactants/product through reaction channels in layer 11. The shapes of the reaction channels and the third heat exchanger have been designed to enable other openings to exist on the simple plates (such as intake and exhaust manifolds, and other required fluid passages) and to match the fluid paths of the heat transfer media to the reactants fluid paths, as closely as possible. Compare the shape of third heat exchanger 93 to the reaction channels of layer 11, and the similarity will be apparent. If the upper and lower indentation and protrusion where not included in third heat exchanger 93, then the flow of heat transfer media through the third heat exchanger would generally flow from the cut outs on the right to the cut outs on the left, with little fluid flowing between these parallel flows. As a result, the heat.transfer media in third heat exchanger 93 would have a flow pattern that does not match the flow pattern of mixed Reactants A and B in the reaction channels of layer 11, thus reducing the effectiveness of the third heat exchanger.

Figure 10:
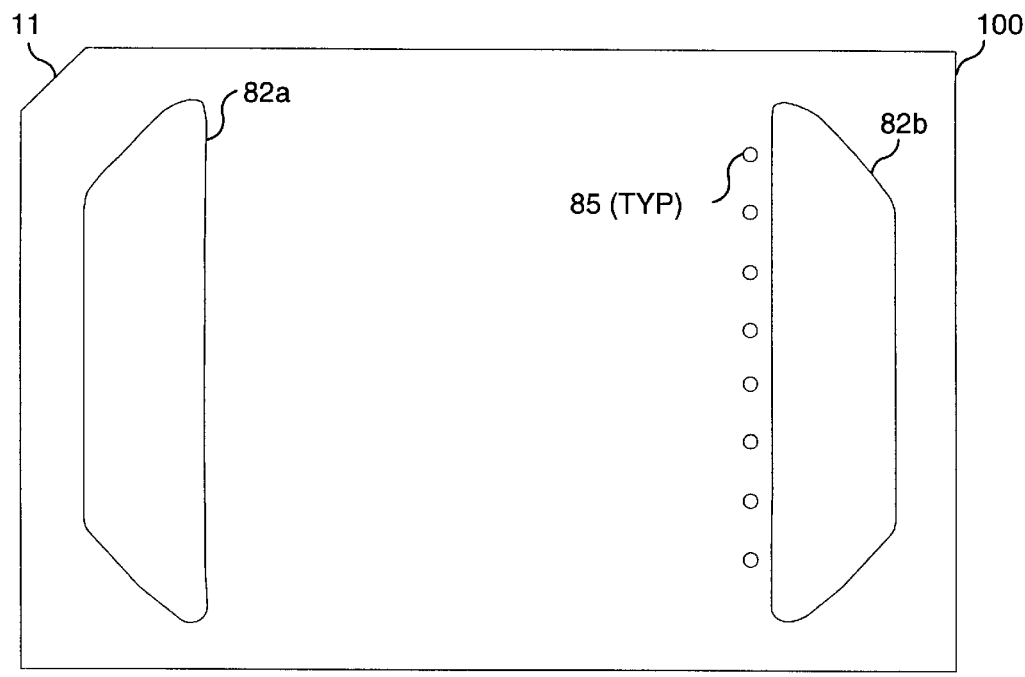
FIG. 10 is a plan view of the tenth simple plate of the preferred reactor, showing two heat exchanger manifolds and a plurality of product openings.

FIG. 10 provides details of a tenth layer of the preferred reactor. FIG. 10 shows a tenth simple plate 100 having chamfer 11. Heat transfer media A flows through the tenth layer using a heat transfer media A intake manifold 82a, and a heat transfer media A exhaust manifold 82b. Note again that the size of the intake and exhaust manifolds for heat transfer media A in the tenth layer have changed, now matching the size of the heat transfer media A intake and exhaust manifolds of the eighth layer. However, in the eighth layer, the purpose of the size change in the heat transfer media A intake and exhaust manifolds was to feed heat exchanger 93 in the ninth layer. The reason for the change in size of the heat exchanger intake and exhaust manifolds in the tenth layer is not related to servicing a heat exchanger. As noted above, the less surface area a simple plate has, the stronger the bond between the simple plates. The enlarged openings reduce the surface area, thus improving the bond strength. Another benefit is that, as will become apparent as later Figures are examined, tenth simple plate 100 (with the exception of the location of chamfer 11) is a mirror image of a subsequent simple plate 120 in the twelfth layer. Simple plate 120 is required to have the larger heat transfer media A intake and exhaust manifolds to feed a fourth heat exchanger in the thirteenth layer immediately below. Merely by changing the location of chamfer 11, the same fabrication configuration can be used to manufacture simple plate 100 and simple plate 120.

It should be noted that third heat exchanger 93 of the ninth layer of the preferred reactor modifies the temperature of a solid portion of tenth simple plate 100. As will be seen in examining an eleventh simple plate 110 of the eleventh layer of the preferred reactor, that solid portion corresponds to a plurality of reaction channels in eleventh simple plate 110. Because such a large portion of tenth simple plate 100 is required to be solid to provide for a heat transfer surface, the use of larger heat transfer media A intake and exhaust manifolds is important to reduce the surface area of simple plate 100, to increase the bond strength. The mixture of Reactants A and B flows through tenth simple plate 100 via a plurality of mixed reactant openings 85.

Figure 11:
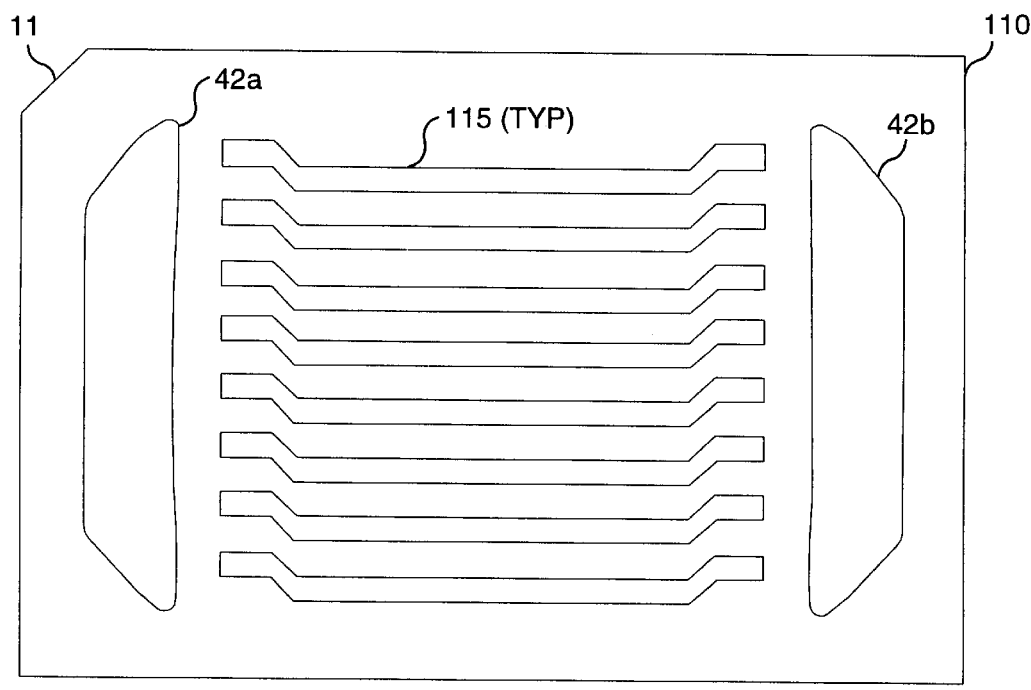
FIG. 11 is a plan view of the eleventh simple plate of the preferred reactor, showing two heat exchanger manifolds, and a plurality of reaction channels.

FIG. 11 provides details on the eleventh layer of the preferred reactor, showing eleventh simple plate 110, with chamfer 11. Heat transfer media A flows through eleventh simple plate 110 via heat transfer media A intake manifold 42a, and heat transfer media A exhaust manifold 42b. The mixed Reactants A and B enter a plurality of reaction channels 115 from the right side of plate 110. Reaction channels 115 are fed from the plurality of mixed reactant openings 85, which form a passage from mixing chambers 77 of the seventh layer, through aligned mixed reactant openings 85 in simple plates 80, 90, and 100. The purpose of reaction channels 115 is to provide sufficient residence time within the preferred reactor so that the reaction between Reactants A and B can proceed either completely or primarily to completion. It is contemplated that should a particular reaction require addition time for completion, a separate residence chamber can be added in a layer downstream in the preferred reactor.

Figure 12:
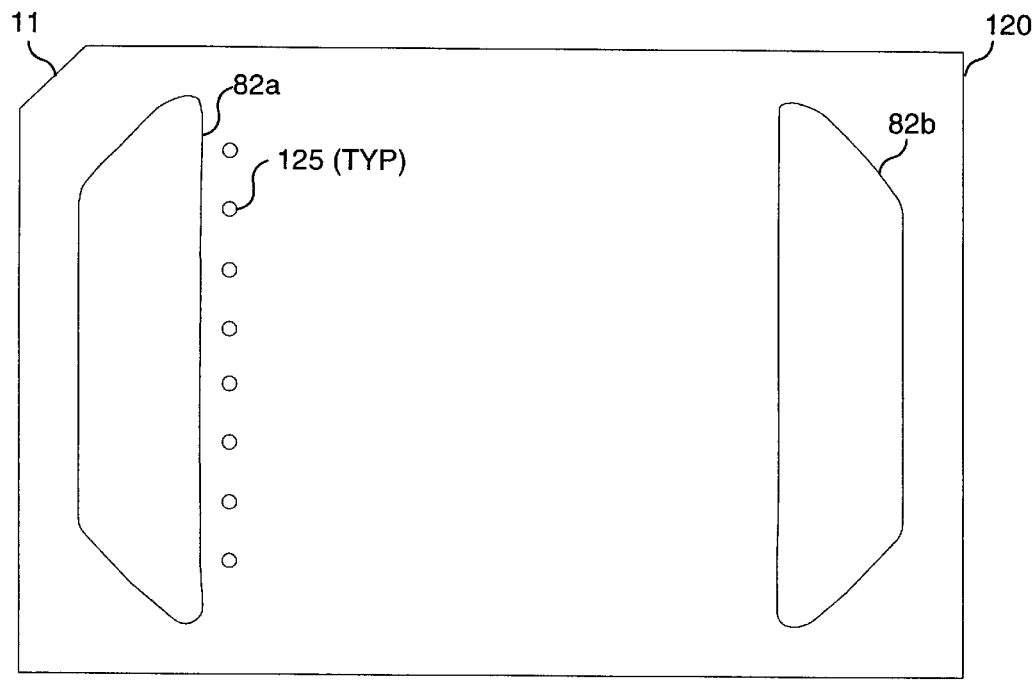
FIG. 12 is a plan view of the twelfth simple plate of the preferred reactor, illustrating two heat exchanger manifolds, and a plurality of product openings.

As was mentioned in relation to tenth simple plate 100 in FIG. 10, the twelfth layer is required to have enlarged heat transfer media A intake and exhaust manifolds to feed a fourth heat exchanger in the thirteenth layer. Note that a twelfth simple plate 120 as shown in FIG. 12 is quite similar to tenth simple plate 100. In fact, the layers are identical except for the location of chamfer 11. Thus, the same configuration pattern can be used to manufacture both tenth simple plate 100 and twelfth simple plate 120 other than location of the chamfer. Heat transfer media A flows through twelfth simple plate 120 via enlarged heat transfer media A intake manifold 82a and enlarged heat transfer media A exhaust manifold 82b. Twelfth simple plate 120 also includes a plurality of product openings 125, which are connected in fluid communication with reaction channels 115 of eleventh simple plate 110. These openings are identical in size to mixed reactant openings 85 of preceding layers, but product openings 125 are disposed on the left side of simple plate 120 rather than the right side of the simple plates (as the mixed reactants flow through the reaction channels from right to left).

Figure 13:
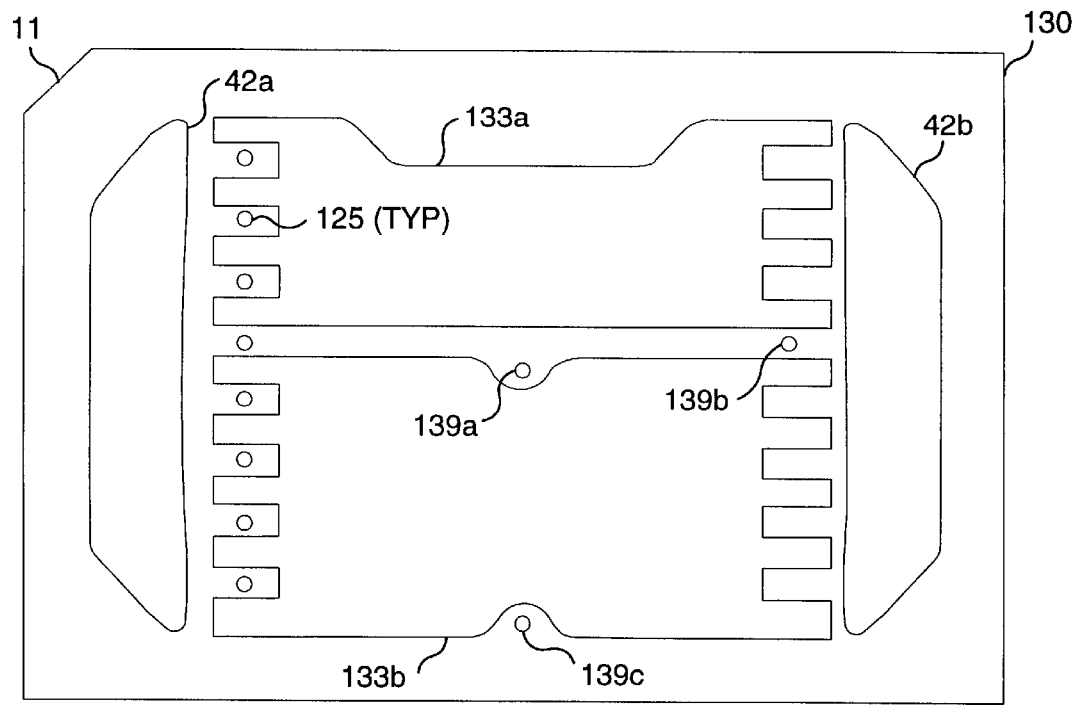
FIG. 13 is a plan view of the thirteenth simple plate of the preferred reactor, illustrating two heat exchanger manifolds, a plurality of product openings, a plurality of temperature sensor openings, and a fourth heat exchangers that is separated into an upper section and a lower section.

The thirteenth layer of the preferred reactor incorporates a fourth heat exchanger, which is separated into two sections, an upper fourth heat exchanger 133a, and a lower fourth heat exchanger 133b. The fourth heat exchanger is also used to moderate the temperatures of the mixture of Reactants A and B flowing through reaction channels 115 of eleventh simple plate 110. FIG. 13 shows a thirteenth simple plate 130 that includes chamfer 11. Reacted product from Reactants A and B passes through product fluid openings 125, into lower levels of the reactor.

As was the case in the tenth layer, the flow of heat transfer media A through thirteenth simple plate 130 is relatively complex. Heat transfer media A flows into a heat transfer media A intake manifold 42a and a heat transfer media A exhaust manifold 42b from similarly located (but larger) manifolds in twelfth simple plate 120. It should be noted that heat transfer media A intake manifold 42a and exhaust manifold 42b are not actually needed in thirteenth simple plate 130 to feed any heat exchanger in a subsequent layer. These manifolds are included to maintain the proper fluid pressure of heat transfer media A in the preferred reactor. If these manifolds were absent, the fluid pressure of heat transfer media A in third heat exchanger 93 of the ninth layer would be different than in the fourth heat exchanger (upper 133a and lower 133b), which is undesirable, as both the third and fourth heat exchangers are moderating the temperature of the reactants in reaction channels 115 of the eleventh layer, and thus both the third and fourth heat exchangers should have similar flow characteristics.

It should also be noted the incorporation of the heat transfer media A intake and exhaust manifolds in thirteenth simple plate 130 simplifies the production process. Note that thirteenth simple plate 130 is structurally very similar to the ninth simple plate 90 illustrated in FIG. 9. With minor modifications, ninth simple plate 90 can be modified to yield thirteenth simple plate 130. As noted with respect to FIGS. 10 and 12, the differences would include the location of chamfers 11, as well as the additional change of splitting heat exchanger 93 (of FIG. 9) layer into two heat exchangers 133a and 133b for thirteenth simple plate 130.

Heat transfer media A is required to flow through thirteenth simple plate 130 to service fourth heat exchangers 133a and 133b. Heat transfer media A is fed into these heat exchangers in the same manner as heat transfer media is fed into heat exchanger 93 from FIG. 9, i.e. via cutouts that overlap the enlarged heat transfer media A intake and exhaust manifolds of the immediately preceding layer. Intake manifold 82a and exhaust manifold 82b of FIG. 12 are enlarged such that heat transfer media A can enter and exit fourth heat exchangers 133a and 133b.

In FIG. 13, the reason that the single heat exchanger 93 of FIG. 9 has been separated into two heat exchangers is so that a plurality of temperature sensors can be incorporated into the thirteenth layer. Temperature sensor openings 139a, 139b, and 139c enable three temperature sensors (not shown) to be disposed adjacent to the thirteenth layer. Such temperature sensors will provide good temperature information relative to the temperature of the combined Reactants A and B flowing through the reaction channels of eleventh simple plate 110. Note that temperature sensors disposed in passages 139a–139c will actually measure the temperature of solid portions of twelfth simple plate 120 against which these passages abut. However, as discussed above, one preferable characteristic of the material from which the simple plates are fabricated is that the material be thermally conductive, at least with respect to layers that are transferring thermal energy to or from a fluid channel and a heat exchanger. Note that if such a layer is sufficiently thin, then the thermal conductivity of most materials is adequate. The temperature of the product of Reactants A and B flowing through reaction channels 115 in eleventh simple plate 110 will be very similar to the temperature of corresponding sections of twelfth simple plate 120. Because the temperature of the product in reaction channels 115 directly relates to the overall yield and quality of the product, three temperature sensors rather than one are employed in the preferred reactor.

Because the temperature of the reactants and the resulting product is so critical to yield and quality, the preferred reactor sandwiches reactant channels 115 of layer 11 between third heat exchanger 93 of layer 9 and fourth heat exchangers 133a and 133b of layer 13, to enable better temperature control. Third heat exchanger 93 actually modify the temperature of a solid portion of tenth simple plate 100 that forms the upper surface of reaction channels 115. Fourth heat exchangers 133a and 133b moderate the temperature of a solid portion of twelfth simple plate 120 that forms the lower surface of reaction channels 115. It should be noted that the heat exchangers of the preferred reactor actually moderate the temperature of a solid portion of simple plates both above and below the opening that corresponds to the heat exchanger, that the purpose of the heat exchangers is to control the temperature of the reacting product in reaction channels 115. Note that fourth heat exchangers 133a and 133b are moderating the temperature of a solid portion of both simple plate 120 of layer 12 and a simple plate 140 of layer 14. While moderating a solid portion of simple plate 120 does effect the temperature of the product in reaction channels 115, the moderation of the solid portion of simple plate 140 serves no functional purpose. In the preferred reactor, the modification of the temperature of non-target portions of simple plates, such as simple plate 140, does not cause any problems. However, it is envisioned that in different stacked plate reactors, such non-target temperature changes could be undesirable. In such reactors, a simple plate that does not conduct thermal energy (i.e. whose thickness is sufficient to prevent heat transfer) could be used to isolate the heat exchangers to avoid non-target temperature changes.

Figure 14:
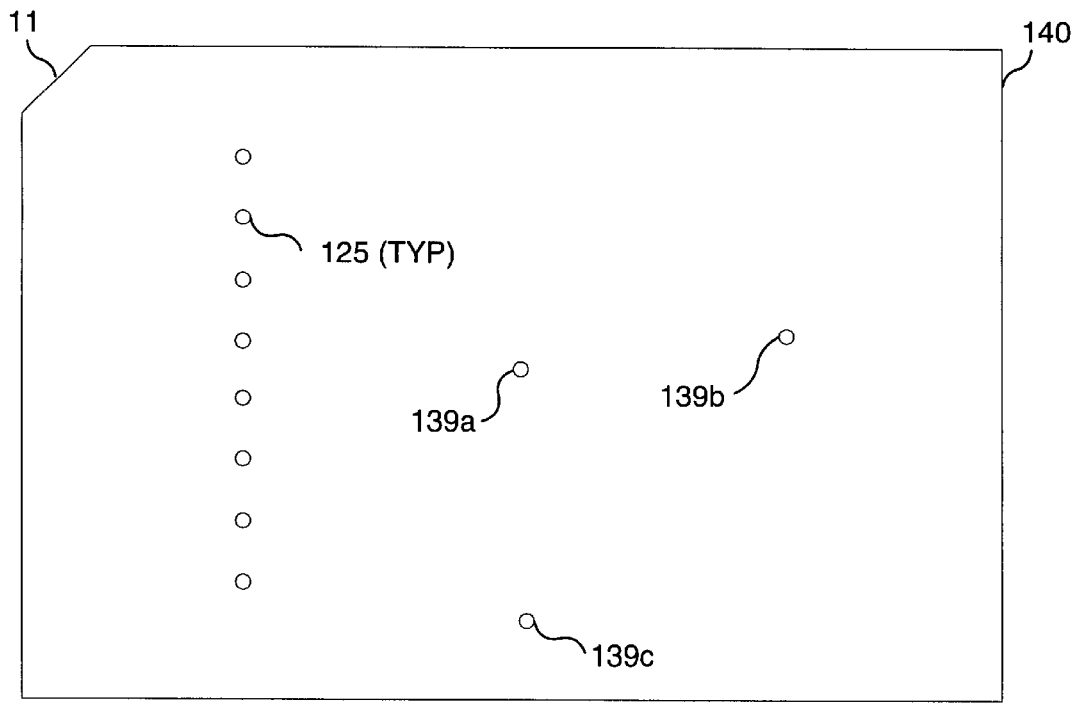
FIG. 14 is a plan view of the fourteenth simple plate of the preferred reactor, illustrating a plurality of product openings and a plurality of temperature sensor openings.

The fourteenth layer of the preferred reactor is a relatively simple layer, involving only product fluid openings to withdraw reacted product from the reactor, and passages for temperature sensors as described above. FIG. 14 illustrates fourteenth simple plate 140, which includes chamfer 11. Temperature sensor passages 139a, 139b, and 139c enable temperature sensors to be inserted into the reactor to monitor the temperature of reaction channels 115 as discussed above. Product openings 125 are used to direct the reacted product to lower levels of the reactor.

The fifteenth layer is also relatively simple. FIG. 15 illustrates a fifteenth simple plate 150, having chamfer 11. The plurality of product openings 125 from the fourteenth layer are combined into a single product channel 155. Again, three temperature sensor openings 139a, 139b, and 139c are included to enable temperature sensors to be passed deeper into the core of the reactor.

The final layer of the preferred reactor is the sixteenth layer. FIG. 16 illustrates a sixteenth simple plate 160, also having chamfer 11. The single product channel 155 of the fifteenth layer is reduced in area to a single product outlet port 165. Again, temperature sensor openings 139a–139c are available so that temperature sensors can be inserted deeper into the reactor. It should be noted that in the preferred reactor the thickness of both the top simple plate 10 and the bottom simple plate are significantly greater than the thickness of the intermediate simple plates. The greater thickness provides both greater structural integrity, as well as helping to thermally isolate the inner layers of the reactor from the outside environment.

FIG. 17 is an exploded isometric view of a preferred reactor 170 that includes the sixteen layers described in regard to FIGS. 1–16. Simple plates 10–160 are shown stacked in order so that the relative positions of each simple plate to each other may be examined. The preferred dimensional thickness of each simple plate is as follows:

| | |
|---|---|
| Top simple plate 10: | 3.0 mm. |
| Second simple plate 20: | 0.3 mm. |
| Third simple plate 30: | 0.3 mm. |
| Fourth simple plate 40: | 0.3 mm. |
| Fifth simple plate 50: | 0.3 mm. |
| Sixth simple plate 60: | 0.3 mm. |
| Seventh simple plate 70: | 0.2 mm. |
| Eighth simple plate 80: | 0.3 mm. |
| Ninth simple plate 90: | 0.6 mm. |
| Tenth simple plate 100: | 0.3 mm. |

-continued

| | |
|---|---|
| Eleventh simple plate 110: | 0.2 mm. |
| Twelfth simple plate 120: | 0.3 mm. |
| Thirteenth simple plate 130: | 0.6 mm. |
| Fourteenth simple plate 140: | 0.3 mm. |
| Fifteenth simple plate 150: | 0.3 mm. |
| Sixteenth simple plate 160: | 3.0 mm. |

Simple plates 10 and 160 (the top and bottom simple plates) are thicker than other plates to provide greater structural stability. Simple plates 20–60, 100, 120, 140 and 150 are much thinner, to enhance heat transfer. As will be discussed below, a thickness of 0.3 mm provides a reasonable heat transfer ability for a wide variety of materials. Simple plate 70 is thinner by ⅓ to ensure proper laminar flow within mixing chambers 75. Simple plate 11 is the same thickness as simple pate 70, to maintain fluidic equilibrium conditions in the reactor. Simple plates 90 and 130 are thicker than other plates to provide a larger mass of fluid in the heat exchangers 93, 133a and 133b. It should be noted that the preferred plate thickness represent sheet metal thickness' that are commercially available, and that the ready availability of such materials lowers production costs.

For simple plates that include solid portions used to transfer thermal energy to or from heat exchangers, a preferred thickness is about 0.3 mm. As plate thickness increases, mechanical stability increases and heat transfer ability decreases. The 0.3 mm thickness provides good heat transfer characteristics without sacrificing mechanical stability. When graphs representing mechanical stability as a function of plate thickness (50 μm–1 mm) and heat transfer ability as a function of plate thickness (50 μm–1 mm) are combined, the curves representing each functional relationship intersect at approximately 0.3 mm. It should be noted that this optimum value of 0.3 mm is independent of the actual material selected (glass, metal, plastic, etc.). While the shape of the curves defining the functional relationships change when a different material is selected, the intersection of the curves at 0.3 mm remains relatively constant. Thus, 0.3 mm represents a simple plate thickness that provides for reasonable heat transfer ability without sacrificing structural integrity.

FIG. 18A illustrates a fluid flow path of Reactant A, as it enters top simple plate 10 and proceeds through the sixth simple plate 60 of reactor 170. Reactant A enters through inlet 15 in top simple plate 10, proceeds to second simple plate 20 of the second layer, and enters Reactant A distributor 25. Reactant A then passes to third simple plate 30 of the third layer, passing through four Reactant A openings 35. In fourth simple plate 40 of the fourth layer, Reactant A passes through four Reactant A openings 45, which are part of the inter-digital-mixer. As discussed above, the purpose of the inter-digital-mixer is to precisely align the fluid flows for Reactants A and B to optimize mixing in later layers of the reactor. The purpose of Reactant A openings 45 is to precisely align a plurality of Reactant A fluid paths with a plurality of Reactant B fluid paths, so that a stacked laminar flow can be achieved with equilibrated pressure drops. It should be noted that first heat exchanger 24 is used to bring both Reactants A and B to the proper temperature in the inter-digital-mixer of the fourth layer.

In the fifth layer, fifth simple plate 50 incorporates a plurality of reactant A openings that are aligned with a plurality of Reactant B openings. These openings form an alternating pattern of 24 openings in four rows of six openings each (for a total of 12 Reactant A openings and 12

Reactant B openings). In the sixth layer, sixth simple plate 60 incorporates four fluid channels 65. It is in the four channels 65 that Reactants A and B first intermingle. Because of the pattern of fluid paths for Reactants A and B enabled by the inter-digital-mixer, Reactants A and B enter channels 65 in a stacked laminar flow pattern.

FIG. 18B illustrates the fluid path that Reactant B takes in entering the first six layers of a reactor 170. Reactant B enters top simple plate 10 through opening 17, passes through the second layer an identical Reactant B openings 17 in second simple plate 20. In the third layer, Reactant B enters Reactant B distributor 37 in third simple plate 30. In the fourth layer, Reactant B enters four Reactant B openings 47 in fourth simple plate 40. As noted above, openings 47 (and 45) are collectively referred to as the inter-digital-mixer. After passing through the fourth layer, Reactant B flows into twelve openings 57 in fifth simple plate 50, of the fifth layer. Reactant B then proceeds to the four fluid channels 65 on sixth simple plate 60, where Reactants A and B are first co-mingled.

FIG. 18C illustrates the combined flows of Reactants A and B after passing through the sixth layer and proceeding through layers 7–16 of reactor 170. Reactants A and B as combined (in a stacked laminar flow pattern) flow through four fluid channels 75 on seventh simple plate 70. Channels 75 lead to four mixing chambers 77. In mixing chambers 77, the stacked laminar flow is compressed, further enhancing rapid diffusion mixing. Second heat exchanger 46 is used to control the temperature of the reactants as they mix in mixing chambers 77. After Reactants A and B become thoroughly mixed in mixing chambers 77, the now mixed Reactants A and B flow through a plurality of mixed reactant openings 85 on eighth simple plate 80. The mixed reactants then flow through the ninth and tenth layers via identical mixed reactant openings 85 in simple plates 90 and 100, respectively. The mixed reactants then flow into reaction channels 115 on eleventh simple plate 110. Reaction channels 115 preferably provide sufficient residence time so that the majority (if not all) of the reaction is complete. If reaction channels 115 do not provide sufficient residence time, then an additional residence time chamber can be added downstream of reactor 170. As noted above, the quality and yield of the desired reaction is greatly affected by the ability to control temperature during the reaction process. The preferred reactor provides heat exchangers on simple plates 90 and 130 to precisely control the temperature within reaction channels 115. If additional residence time chambers are required, then control of the temperature in the additional residence time chambers is also highly desirable. After passing through reaction channels 115 in the eleventh layer, the resulting product passes through a plurality of product openings 125 in simple plates 120, 130, and 140 of layers 12, 13 and 14, respectively. The eight individual product streams represented by these product openings are then combined into a single product channel 155 on fifteenth simple plate 150, of layer 15. This single product exits the reactor via a product outlet 165 on sixteenth simple plate 160, in the bottom (sixteenth) layer of the reactor.

FIGS. 19A–19C illustrate the fluid paths for heat transfer media A, B, and C throughout the preferred reactor. FIG. 19A illustrates the fluid path for heat transfer media B, which services first heat exchanger 24 in the second layer. Heat transfer media B flows into heat transfer media inlet 14a in top simple plate 10 and proceeds to heat exchanger 24 on second simple plate 20. Heat transfer media B passes through heat exchanger 24, and exits heat exchanger 24 via outlet port 14b in top simple plate 10. The purpose of heat exchanger 24 is to adjust the temperature of the solid section of portion of the third layer that is immediately above the inter-digital-mixer (openings 45 and 47) in fourth simple plate 40. In this manner, heat exchanger 24 is moderating the temperatures of Reactants A and B prior to the reactants being mixed together. It is contemplated that for the majority of reactions, it will be desirable for Reactants A and B to be of similar temperature. Those of ordinary skill in the art will readily understand, however, that there may be some reactions in which Reactant A and Reactant B will preferably be kept at separate temperatures. It is contemplated that a different stacked plate design using the same principles of the invention can be designed and fabricated to provide for a separate heat exchanger to individually modify the temperatures of Reactants A and B.

FIG. 19B illustrates the fluid path that heat transfer media C takes through layers 1–4 of the preferred reactor. Heat transfer media C enters the reactor through inlet 16a in top simple plate 10 and then proceeds through heat transfer media C intake manifolds 26a on simple plates 20 and 30, in layers 2 and 3, respectively. Heat transfer media C then enters heat exchanger 46 on fourth simple plate 40 of layer 4 and exits heat exchanger 46 by utilizing heat transfer media C exhaust manifolds 26b of simple plates 30 and 20, in layers 3 and 2, respectively. Heat transfer media C then exits the reactor using outlet port 16b of top simple plate 10. The purpose of second heat exchanger 46 is to modify the temperature of the solid portion of sixth simple plate 60 that corresponds to the mixing chambers 77 of seventh simple plate 70. Because the mixing of chemicals often spontaneously generates heat, a great deal of heat can be generated as Reactants A and B are thoroughly mixed. Second heat exchanger 46 is thus able to cool Reactants A and B while in mixing chambers 77, so that the temperatures of the reactants do not exceed the ideal temperature for the desired reaction. Second heat exchanger 46 occupies both the fourth and fifth layers (simple plates 40 and 50), to increase the capacity of the heat exchanger.

FIG. 19C illustrates the fluid path for heat transfer media A as it passes through the first thirteen layers of preferred reactor 170. Heat transfer media A enters the reactor at top simple plate 10 via intake port 12a. The heat transfer media A then passes through identical heat transfer media A intake manifolds 22a on simple plates 20 and 30 of layers 2 and 3 respectively. Heat transfer media A continues to pass through heat transfer media A intake manifolds in layers 4, 5, 6 and 7, via intake manifolds 42a. It should be noted that intake manifolds 42a differ in size and shape relative to the intake manifolds 22a of layers 2 and 3. The functional purpose of the size change is both reduce potential pressure drops within the fluid paths of the reactor, as well as to reduce the surface area of simple plates 40–70 to enhance bonding.

In layer 8, the shape of heat transfer media A intake manifold 82a changes once again. The purpose of the size change between the heat transfer media A intake manifolds in layers 7 and 8 is so that heat transfer media A can be fed into two separate sections of the layer 9. In a first heat transfer media A fluid path in layer 9, heat transfer media A flows into a heat transfer media A intake manifold 42a, and from there to heat transfer media A intake manifold 42a of tenth simple plate 100 in layer 10. From there, heat transfer media A flows to heat transfer media A intake manifold 42a in layer 11, an enlarged heat transfer media A intake manifold in layer 12, and then to heat transfer media A intake manifold 42a in layer 13.

In a second heat transfer media A fluid path in layer 9, fluid flows out of heat transfer media A intake manifold 82a of eighth simple plate 80 and into third heat exchanger 93 on ninth simple plate 90 of layer 9. As discussed above, the purpose of third heat exchanger 93 is to moderate the temperature of the solid portion of layer 10 immediately adjacent to reaction channels 115 in layer 11. Heat transfer media A exits heat exchanger 93 by returning to layer 8 via heat transfer media A exhaust manifold 82a, which is enlarged and overlaps the right end of third heat exchanger 93.

Simple plate 100 of layer 10 includes enlarged heat transfer media A intake manifold 82a (as well as exhaust manifold 82b). It should be noted that reaction channels 115 of layer 11 are not quite long enough to overlap the enlarged heat transfer medial intake and exhaust manifolds 82a and 82b, thus no heat transfer media enters reaction channels 115. Here, the functional purpose of the size change of the intake and exhaust manifolds is to reduce the surface area of tenth simple plate 100, to enhance bonding, rather than to feed a heat exchanger (as in layer 8 and eighth simple plate 80).

Referring now to layer 11, note that again the size and shape of heat transfer media A intake manifold 42a has changed relative to the intake manifolds of layers 8 and 10. This size change relates to maintaining a calculated fluidic equilibrium throughout the micro reactor. However, it is contemplated that the overall effect of the size change is relatively minor, and that an effective micro reactor can be achieved without changing the size of the intake manifolds on layer 11.

In layer 12, the size and shape of heat transfer media A intake manifold 82a is again enlarged, to once again divert some heat transfer fluid A into a second fluid path that services fourth heat exchangers 133a and 133b of layer 13. Heat transfer media A also flows into a heat transfer media A intake manifold 42a in layer 13. The functional purpose of heat transfer media A intake manifold 42a of layer 13 is to ensure that the fluid pressure within fourth heat exchangers 133a and 133b matches the fluid pressure within third heat exchanger 93. Note both the third and fourth heat exchangers are moderating the temperature of reaction channels 115, and thus preferably both heat exchanges should have similar flow characteristics.

Heat transfer fluid A that has entered fourth heat exchangers 133a and 133b exits layer 13 via heat transfer media A exhaust manifold 42b in layer 12. From there, heat transfer media A moves successively through heat transfer media exhaust manifolds 42b in layer 11, 82b in layer 10, 42b in layer 9, 82b in layer 8, 42b in layers 7–4 and 22b in layers 3–2. Heat transfer media A finally exits the reactor via outlet 12b in top simple plate 10.

Generally the heat transfer media used in the preferred reactor will be liquids, although it is envisioned that selected gases may also be beneficially employed. Fluidized solid heat transfer media (such as sand or silica) are known in the art, and might be used, though the dimensions involved in the fluid channels of the preferred reactor raise the concern that the solid heat transfer media could cause clogging of the heat transfer pathways.

The final Figures provide detail regarding the operation of the inter-digital-mixer of simple plate 40, in layer 4, illustrating how it enables a stacked laminar flow to be achieved. As noted above, a beneficial characteristic of laminar flow is that such a flow pattern enables diffusion mixing to occur. Diffusion mixing is extremely rapid, and an additional benefit is that no mechanical or electrically powered stirring or agitation means are required to mix the reactants, thus simplifying the reactor design.

Figure 20:
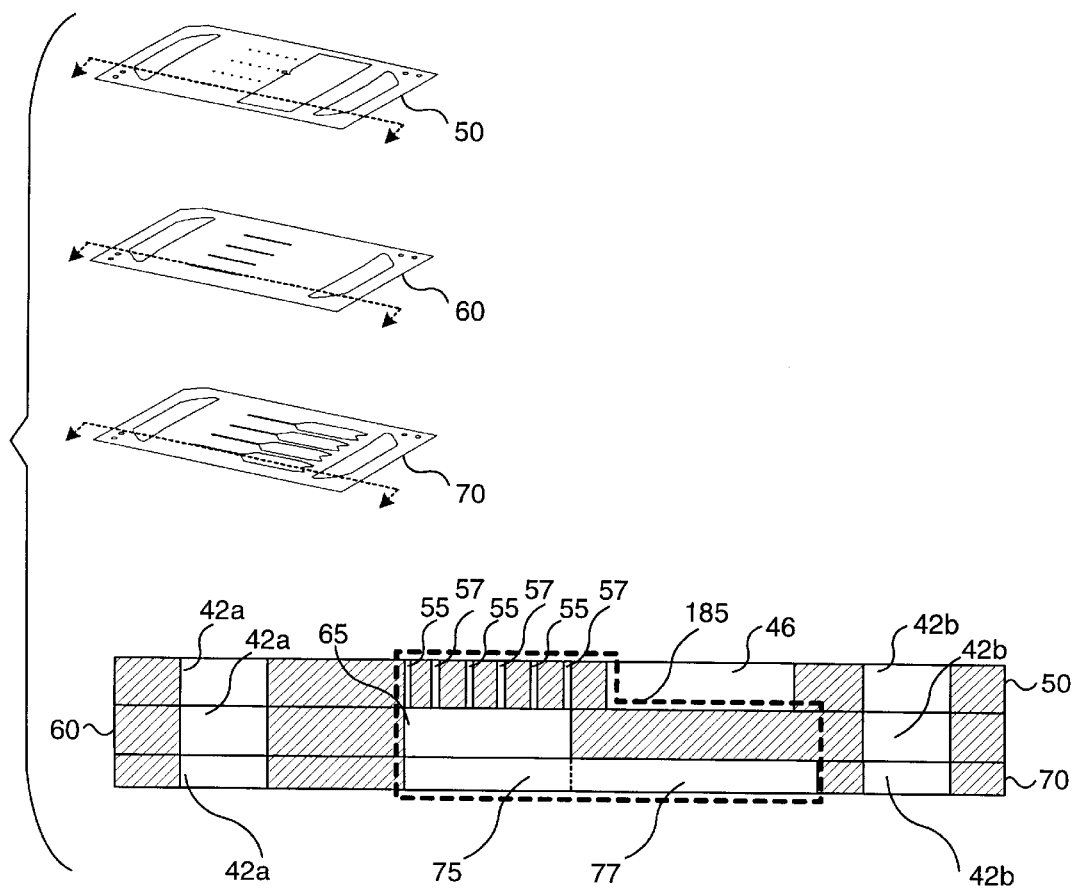
FIG. 20 is a cross-sectional view of simple plates five through seven of the preferred reactor, illustrating both the relative thickness of these plates and a fluid path for both reactants through the inter-digital-mixer mixer and the mixing areas.

FIG. 20 illustrates side elevational views of layers 5–7, which implement the stacked laminar flow of the reactants. Isometric views of simple plates 50–70 are shown with dashed lines indicating where the cross-sectional views have been taken from. It should be noted that the structures being discussed in relation to FIG. 20 (Reactant A openings 55, Reactant B openings 57, fluid channels 65, fluid channels 75, and mixing chambers 77) are present in sets of four, and the cross-sectional view illustrated could have been taken from three other portions of simple plates 50–70 as well. It should be understood that while the side elevational view illustrates only one set of the four structures (for example, one fluid channel 65), the preferred reactor includes four sets of the structures being discussed (i.e., four fluid channels 65).

Fifth simple plate 50 includes Reactant A openings 55, and Reactant B openings 57. As can be clearly seen in the isometric view of fifth simple plate 50, these openings are grouped in four rows of six. Each of the four rows has three Reactant A openings 55, and three Reactant B openings 57, in an alternating pattern. Thus, the preferred reactor includes 12 Reactant A openings 55, and 12 Reactant B openings 57, while in the side elevational view of FIG. 20, only three of each are visible (one of the four rows). Each row of openings leads to a fluid channels 65 in sixth simple plate 60. Each fluid channel 65 is in fluid communication with a corresponding fluid channel 75 in seventh simple plate 70, and each fluid channel in turn leads to a mixing chamber 77, also in the seventh layer. Note that the openings forming fluid channels 65 and 75 are superimposed on each other, in effect forming a continuous volume. As the commingled Reactants A and B move from this continuous volume into mixing chambers 77, the reactants move from a relatively large volume into a relatively small volume. This reduction in volume is further heightened because seventh simple plate 70 is ⅔ the thickness of sixth simple plate 60 (0.2 mm vs. 0.3 mm in thickness). As will be described in further detail below, this reduction in thickness enhances the diffusion mixing. Due to the laminar flow the stacking of the plurality of reactant streams remains as it is after the thickness reduction. After such diffusion mixing in mixing chambers 77, the now mixed reactants exit mixing chambers 77 via the plurality of mixed reactant openings 85 in layer 8 (not shown here, see FIGS. 8 and 18C). A dashed line in FIG. 20 indicates an area 185 that corresponds to the fluid path of the reactants through layers 5–7.

Figure 21:
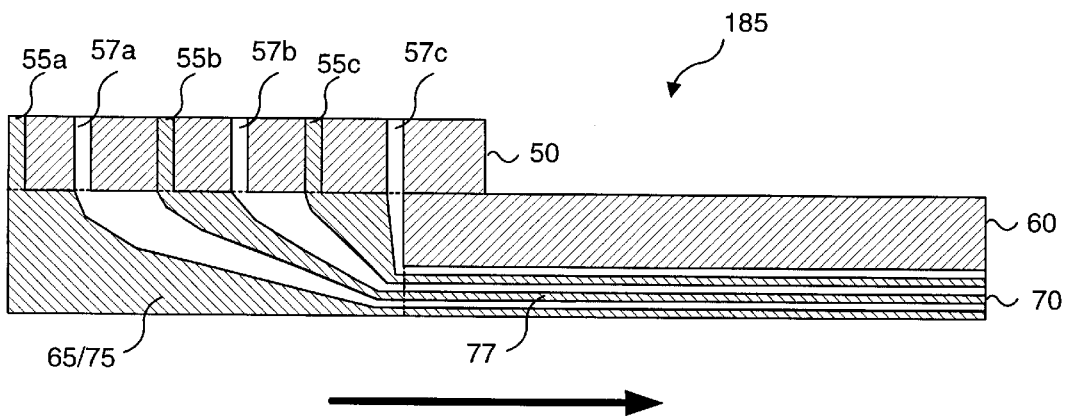
FIG. 21 is a schematic view of selected portions of simple plates five through seven of the preferred reactor, illustrating how the inter-digital-mixer provides a stacked laminar flow of the reactants in the mixing areas of the seventh simple plate.

FIG. 21 is an enlarged view of area 185 of FIG. 20. FIG. 21 illustrates how alternating openings 55 and 57 for Reactants A and B result in a "stacked" laminar flow. As can be clearly seen in FIGS. 18B and 18C, the reactants are flowing from left to right through layers 5–7. Reactant A enters the combined volume of fluid channels 65 and 75 first, via Reactant A opening 55a. Because Reactant A from opening 55a is the first fluid entering the combined volume of fluid channels 65 and 75, it moves to the bottom of the combined volume. A very short time later, Reactant B enters the combined volume of fluid channels 65 and 75, via Reactant B opening 57a. Because Reactant A from opening 55a has reached the bottom of the combined volume 65/75 first, Reactant B from opening 57a is "stacked" on top of Reactant A from opening 55a.

Reactant A from opening 55b flows into combined volume 65/75 next, and is "stacked" on top of Reactant B from opening 57b. Reactants A and B from openings 57b, 55c, and 57c enter combined volume 65/75 and are similarly stacked on top of one another. The result is that in each of the four combined fluid channels 67/75 of the preferred reactor, a six layered fluid stack is formed, with Reactant A on the bottom, then Reactant B immediately above, and so on. The resulting order of the stack, from top to bottom, is:

| 1st Layer | Reactant B from opening 57c |
|---|---|
| 2nd Layer | Reactant A from opening 55c |
| 3rd Layer | Reactant B from opening 57b |
| 4th Layer | Reactant A from opening 55b |
| 5th Layer | Reactant B from opening 57a |
| 6th Layer | Reactant A from opening 55a |

The height reduction of the combined volume of fluid channels 65/75 to mixing chambers 77 further enforces a stacked laminar flow. Preferably the channel height is reduced by two thirds in the mixing area respective to the lamination channel (fluid channels 65 and 75), resulting in a thickness of each individual fluid layer of less than 50 μm. In this dimension, mixing by diffusion is enforced. In a laminar flow regime, fluids stay together as stacked layers when being forced into a narrower mixing area. To achieve the same volumetric flow rate in the mixing area as in the lamination channel, the mixing area is broader than the lamination channels (fluid channels 65/75), as can be seen in the isometric view of simple plate 70 (see also FIG. 7).

It is critically important that when the reactants enter the lamination channels (fluid channels 65/75), they are stacked one on top of the other, rather than side by side. In the preferred reactor, the inter-digital-mixer of layer 4 (fourth simple plate 40) ensures that the plurality of reactant fluid streams are properly aligned so that when they enter the lamination channels (fluid channels 65/75) the reactant streams are properly stacked on top of one another. FIG. 22 illustrates one design for an inter-digital-mixer that will not ensure the reactants will properly stack on one another, while FIG. 23 illustrates the preferred design of the inter-digital-mixer that does enable proper stacking.

In FIG. 22, both Reactant A opening 45a and Reactant B opening 47 are similar in size and shape. These openings are shown as superimposed over fluid channel 65. It should be understood that openings 45a and 47 are part of fourth simple plate 40 (the fourth layer), while fluid channel 65 is part of sixth simple plate 60. However, openings 45a and 47 are in fluid communication, and are shown here together to illustrate the fluid path enabled by this poorly designed inter-digital-mixer. In FIG. 22, an area 186 is indicated by dashed lines. In an enlarged view of area 186, details of the fluid paths enabled by this poorly designed inter-digital-mixer can be seen.

As noted above, the function of the inter-digital-mixer is to separate two individual reactant fluid paths into a plurality of fluid paths. It is important that these plurality of fluid paths are properly aligned, so that the stacked laminar flow described above can be achieved. Thus, the design of the inter-digital-mixer is extremely important, as a poorly designed inter-digital-mixer will not ensure that the desired stacked laminar flow is achieved.

In the enlarged detail of area 186, a Reactant A fluid path 145a and a Reactant B fluid path 147 are shown. Note that as illustrated, both the reactants enter fluid channel 65 in a side by side laminar flow pattern, rather than in the desired stacked laminar flow pattern, because the reactants are entering fluid channel 65 from opposing sides, rather than from the same side. The side by side effect is due to how the fluid fronts of each fluid path propagate. Note that each fluid path (145a and 147) is changing direction by approximately 90 degrees as the fluid path enters fluid channel 65. The fluid front of each fluid path will have a tendency to propagate fastest along the inside of that 90 degree corner, as the fluid on the inside of the corner has less distance to travel. When fluid path 145a encounters fluid path 147, each respective fluid front is maximized along the channel wall corresponding to the inside of the 90 degree corner associated with each fluid path. Thus a side by side laminar flow condition results.

Compare the poorly designed inter-digital-mixer of FIG. 22 with the preferred inter-digital-mixer of FIG. 23. The shape of Reactant A opening 45 has been changed to include a curve at the portion of the openings that are superimposed over fluid channel 65. These curves ensure that even during low pressure or low flow conditions, Reactant A enters fluid channel 65 from the same side as Reactant B. FIG. 23 similarly includes dashed lines indicating an area 187. In the enlarged view of area 187, a Reactant A fluid flow 245 can be seen with a Reactant B fluid flow 247 stacked on top, rather than side by side, as in FIG. 22. As noted above, in layers 4–7 (the inter-digital-mixer, fluid channels 65 and 75, and mixing chambers 77) the reactants flow from left to right, Reactant A enters fluid channel 65 first, and is thus on the bottom of the channel, with Reactant B stacked on top. Because the openings alternate between Reactant A and Reactant B, a six layer stacked laminar flow is achieved, with three layers of Reactant A and three layers of Reactant B in an alternating pattern. While additional simple plates could have been added to the preferred reactor to define a reactant fluid path that also ensured that the reactants would enter fluid channel 65 from the same side, this modification would not only increase the cost and complexity of the reactor, but it would also result in different pressure drops between the reactants. This difference would result in less than ideal mixing dynamics, and thus, is not a preferred solution. It should be noted that the shape of openings 45, in particular, the curve radius, length, and width have been carefully selected to achieve an equal pressure drop for both Reactants A and B.

Exemplary Chemical Reaction Performed in a Stacked Simple Plate Reactor

The described chemical reaction belongs to the class of organometallic conversions, i.e., the addition of an organolithium compound to a carbonyl compound. Cyclohexanone (1) reacts in a one step procedure with methyl lithium to produce the 1,2-addition product 1-methyl-cyclohexanol (2).

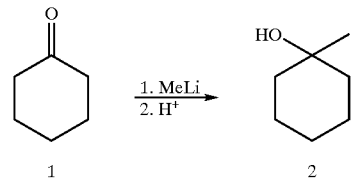

Supply of the Starting Materials:
1. A 1.5 molar solution of methyl lithium dissolved in diethylether (commercially available in 100-ml bottles sealed with a septum).
2. Preparation of 100 ml of a solution of 13.2 grams (0.15 moles) of cyclohexanone (commercially available liquid) in dry diethylether.

Solution No. 2 is transferred into a pressure compensated bottle with tube connectors. Both solutions are connected to an argon atmosphere prior to use to avoid hydrolysation with air.

Thermal Conditioning and Setting up of the System:

The reactor temperature is adjusted to −20° C. by cryostats, which are connected to the heat exchangers of the reactor. Solvent (diethylether) is pumped continuously through the complete system until the solvent flow leaving the reactor has reached −20° C.

Performing the Reaction:

After reaching thermal equilibrium, the two-reactant solutions are transferred by individual pumps via Teflon™ tubing into the reactor. The pump rate is set to 1 ml/min for each reactant. The two reactant flows are each divided into four parallel laminar flow streams with dimensions of several micrometers. They enter the inter-digital-mixer located under heat exchanger 1, which is a cross flow type heat exchanger, where they are cooled to the appropriate temperature (−20° C.). It should be noted that this temperature is a function of the desired reaction. In some cases, each reactant may require pre-treatment to obtain a different reactant temperature. Thus, the stacked simple plate reactor may preferably include a heat exchanger for modifying the temperature of each reactant. Of course, if the reactant temperatures are to be the same, then a stacked simple plate reactor can be designed with a single heat exchanger to pretreat both reactants.

In the inter-digital-mixer the two reactant flows are each divided again into 12 individual laminar flow streams for each reactant. These 24 streams enter the four lamination channels in groups of six streams, where each group of six streams are combined again (stacked onto each other). From here, the four groups of six stacked fluid streams enter the four mixing chambers (which are placed under heat exchanger 2), and the four groups of six stacked fluid streams are reduced in thickness so that diffusion mixing will occur. Thus in each of the four groups of six stacked fluid streams, three single streams of reactant A are united with three single streams of reactant B. After mixing, the reactants exit the four mixing chambers at two exits per mixing chamber, thus resulting in eight mixed reactant streams. These eight mixed reactant streams enter the eight reaction channels, which are sandwiched between heat exchangers 3 and 4. It is within the reaction channels that the final reaction takes place, and it is here that the most heat is generally produced; thus the reaction channels are sandwiched between two heat exchangers.

Heat transfer is extremely efficient due to the high surface to volume ratio, to the selection of an extremely thermally transparent material for the simple plates that form the heat exchanger (by the control of the material and/or the thickness of the simple plates), and to the thinness of the simple plates (the distance between the mixing zone and heat exchanger is in the range of a few micrometers). Thus, the heat of the exothermic reaction can be reduced to 1–2° K. above the determined reaction temperature.

The internal volume of the mixing zone is approximately 1 ml, providing a residence time of 30 seconds, during which the majority of the reaction is completed. For reactions that need a longer reaction time, an additional residence time chamber can be added to the reactor, either by using additional simple plates, or by adding a separate residence chamber module downstream of the reactor.

The resultant product stream leaves the reactor via a Teflon™ tube into a collection flask that is filled with 2N hydrochloric acid. Instant quenching of the addition adduct and excess reagent takes place.

Benefits of the Simple Plate Stacked Reactor:

Advantages of the stacked simple plate reactor system are precise temperature control, exact adjustment of reaction time, and eliminating the need of a protective atmosphere, since the reactor is a closed environment. Enhanced safety is provided due to the small quantities of material, and the closed environment operating conditions.

The system is especially advantageous when large quantities of product are required, because the reactor can work continuously, and can be operated for hours, even up to days, without maintenance. Accordingly, automated production of large amounts of the desired product without the loss of efficiency and safety can be achieved. Additional product can be obtained by operating additional reactors in parallel under identical operating conditions.

System Description:

The reactants are provided in conventional laboratory bottles with tube connectors. The bottles are connected to a pump module by Teflon™ tubes. Inside a pump module disposed upstream from the pumps are three way valves, which are connected to the reactants, the solvents and pump inlet. For conditioning the stacked simple plate reactor, the valves are set to the solvents, so that the pumps first fill the whole system with solvent until the stacked simple plate reactor reaches thermal equilibrium. Then the valves are set to the reactants, enabling the pumps to deliver the reactants into the stacked simple plate reactor. A filter is placed inline between the pump outlet and reactor inlet to avoid clogging of the system by particulates. Fluidic connection of pumps and reactor can be achieved by commercially available HPLC fittings. Controlling the temperature of the stacked simple plate reactor is achieved by pumping heat transfer media from a cryostat into the internal heat exchangers of the stacked simple plate reactor. Product coming out of the system is collected in a conventional laboratory bottle.

Measuring and Automation Control Devices:

All pumps, valves and cryostats are preferably controlled by a microcontroller or computer, programmed with appropriate software, enabling convenient adjustment and control of the system. The following sensor devices are optionally used to provide analog signals that are converted to digital signals for input to the microcontroller or computer, to facilitate more efficient manual or automated control of the chemical process:

Pressure sensors disposed downstream from each pump and at the inlet and outlets of the stacked simple plate reactor.

Temperature sensors integrated in the stacked simple plate reactor and disposed close to the mixing zone and at the reactor outlet.

Optional flow sensors introduced into each reactant stream for improved flow adjustment.

Excellent control and adjustment of flow and ratio of the reactants, determination of the pressure buildup inside the system by differential pressure measurement, and exact adjustment and control of the reaction temperature can thus be achieved.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. Apparatus for reacting one chemical with at least one other chemical to form a chemical product, said apparatus comprising a plurality of simple plates stacked in layers, each simple plate having at least one opening that extends therethrough, an opening in each simple plate overlapping at least one other opening in an adjacent simple plate, thereby forming at least one passage within the apparatus for each of said one chemical and said at least one other chemical, such that at least one passage for said one chemical and at least one passage for said at least one other chemical merge within the apparatus to form a reaction chamber, the chemical product being formed within said reaction chamber by a reaction between said one chemical and said at least one other chemical.

2. A reactor for carrying out a chemical process, comprising a plurality of simple plates stacked together in layers, said reactor including at least two chemical reactant inlet ports and at least one product outlet port for the receipt and discharge of a chemical product, at least two inlet pathways for accommodating the chemical reactants, wherein each inlet pathway is connected in fluid communication with a different one of said chemical reactant inlet ports, said at least two inlet pathways merging within the reactor to form at least one reaction chamber in which at least two chemical reactants can react to generate a chemical product, at least one outlet pathway coupling said at least one reaction chamber in fluid communication with said at least one product outlet port, and wherein each chemical reactant inlet port, inlet pathway, reaction chamber and product outlet port comprises an opening through at least one simple plate aligned with at least a portion of an opening through an adjacent simple plate.

3. The reactor of claim 2, wherein said simple plates comprise a material selected from the group consisting of crystalline wafers, ceramics, glasses; polymers, composite materials and metals.

4. The reactor of claim 3, wherein said simple plates are fabricated from a stainless steel.

5. The reactor of claim 3, wherein the material used for the crystalline wafers is selected from the group consisting of silicon and germanium.

6. The reactor of claim 2, wherein openings in said simple plates are configured to accommodate carrying out a plurality of operations that affect the chemical process.

7. The reactor of claim 6, wherein said plurality of operations includes at least one of controlling a temperature, controlling a chemical residence time, mixing the chemicals, and reacting the chemicals.

8. The reactor of claim 7, wherein at least one of the simple plates operates as a heat exchanger to control the temperature of at least one of the chemicals within the reactor.

9. The reactor of claim 7, wherein said reactor includes an opening through at least one of the simple plates that comprises a mixing pathway, said opening comprising the mixing pathway being sized so that at least one of the chemicals achieves a stacked laminar flow through the mixing pathway with respect to at least one other of the chemicals, said mixing pathway being in fluid communication with an inlet pathway corresponding to each of said at least two chemicals, and in fluid communication to said reaction chamber.

10. A chemical reactor for processing at least two reactants to form a desired chemical product, comprising:

(a) a stack of simple plates, including two outer simple plates and at least one intermediate simple plate;

(b) at least two inlet openings for receiving the reactants, such that each different reactant is directed into a different inlet opening, and an outlet opening for discharging the chemical product, each inlet opening and said outlet opening being formed in at least one of the outer simple plates; and (c) an opening through at least one intermediate simple plate forming a reaction chamber, said reaction chamber being in fluid communication with each inlet opening for receiving the reactants, said at least two reactants mixing in said chemical reactor and reacting therein to produce the chemical product, said reaction chamber also being in fluid communication with the outlet opening, so that said chemical product is discharged from the chemical reactor through the outlet opening.

11. The chemical reactor of claim 10, further comprising:

(a) a first heat exchange fluid inlet port and a first heat exchange fluid outlet port through which a first heat transfer fluid is introduced into and discharged from the chemical reactor, said first heat exchange fluid inlet port and said first heat exchange fluid outlet port being disposed in at least one of the simple plates; and (b) a first heat exchanger defined by an opening in at least one intermediate simple plate in the stack and by adjacent simple plates disposed on opposite sides of said opening, said opening being in fluid communication with the first heat exchange fluid inlet port and the first heat exchange fluid outlet port.

12. The chemical reactor of claim 11, wherein said first heat exchanger is used to modify the temperature of at least one of the reactants and a chemical product produced as a result of mixing said at least two reactants.

13. The chemical reactor of claim 11, further comprising:

(a) a second heat exchange fluid inlet port and a second heat exchange fluid outlet port through which a second heat transfer fluid is introduced into and discharged from the chemical reactor, said second heat exchange fluid inlet port and said second heat exchange fluid outlet port being disposed in at least one of the simple plates; and (b) a second heat exchanger defined by an opening in at least one intermediate simple plate in the stack and by adjacent simple plates disposed on opposite sides of said opening, said opening being in fluid communication with the second heat exchange fluid inlet port and the second heat exchange fluid outlet port.

14. The chemical reactor of claim 13, wherein the first and the second heat exchangers are defined by opening in different intermediate simple plates.

15. The chemical reactor of claim 12, wherein the second heat exchanger is used to modify a temperature of at least one of the at least two reactants such that said at least one of the at least two reactants has a different temperatures.

16. The chemical reactor of claim 10, wherein the mixing of the reactants is achieved by diffusion mixing.

17. The chemical reactor of claim 16, further comprising a plurality of intermediate simple plates.

18. The chemical reactor of claim 17, wherein at least some of the plurality of intermediate simple plates each include a plurality of openings formed therethrough and at least one of the plurality of openings defines a first fluid path for a first reactant of said at least two reactants, and a second fluid path for a second reactant of said at least two reactants.

19. The chemical reactor of claim 18, wherein said intermediate simple plates that include openings defining the first fluid path and the second fluid path comprise an inter-digital-mixer that separates and aligns said first fluid path and said second fluid path, forming a plurality of individual fluid paths.

20. The chemical reactor of claim 19, wherein the plurality of individual fluid paths are joined in a laminar flow pathway to provide a stacked laminar flow of said first and said second at least two reactants.

21. The chemical reactor of claim 20, wherein a height of said laminar flow pathway is reduced to enhance the stacked laminar flow.

22. The chemical reactor of claim 21, wherein the height of said laminar flow pathway is reduced by employing a thinner intermediate simple plate to define a portion of the laminar flow pathway that has a reduced height, said thinner intermediate simple plate having a thickness about ⅔ that of an adjacent intermediate simple plate used to define an immediately preceding portion of said laminar flow pathway that is not reduced in height.

23. The chemical reactor of claim 21, wherein a height of each individual fluid path that is joined in said laminar flow pathway to provide a stacked laminar flow of said first and said second at least two reactants is less than or equal to about 50 micrometers.

24. The chemical reactor of claim 21, wherein a width of said laminar flow pathway is increased as its height is reduced, so that a flow rate of a fluid in said laminar flow pathway remains constant.

25. The chemical reactor of claim 19, wherein the inter-digital-mixer maintains a substantially equivalent pressure drop for each of the individual fluid paths when said first fluid path and said second fluid path are separated and aligned into the plurality of individual fluid paths.

26. The chemical reactor of claim 19, further comprising at least one opening in an intermediate simple plate in which the individual fluid paths are joined, the inter-digital-mixer ensuring that the individual fluid paths enter said at least one opening from a common side of said intermediate simple plate in which said at least one opening is formed.

27. The chemical reactor of claim 17, wherein openings in a substantial portion of said plurality of intermediate simple plates share a common shape and size, to minimize fabrication costs for the chemical reactor.

28. The chemical reactor of claim 17, wherein said outer simple plates and said plurality of intermediate simple plates are chamfered to provide a reference when assembling the simple plates to form the chemical reactor.

29. The chemical reactor of claim 17, further comprising at least one temperature sensor disposed to monitor a temperature of at least one of said at least two chemical reactants and the chemical product.

30. The chemical reactor of claim 29, wherein at least one temperature sensor is disposed in one of the two outer simple plates.

31. The chemical reactor of claim 29, wherein at least one temperature sensor is disposed in one of said plurality of intermediate simple plates.

32. The chemical reactor of claim 17, wherein a thickness of said outer simple plates is about 3 millimeters, and a thickness of said plurality of intermediate simple plates is at least 0.2 millimeters and not more than 0.6 millimeters.

33. The chemical reactor of claim 17, further comprising means-for applying a compressive force to the stack of simple plates, such that the stack of simple plates are removably held together with an applied compressive force.

34. The chemical reactor of claim 33, wherein said means comprises a housing that applies the compressive force against the two outer simple plates.

35. The chemical reactor of claim 33, wherein a mean surface roughness of the plates is less than 1 micrometers, and the simple plates are substantially free of scratches.

36. The chemical reactor of claim 33, wherein said means develops a pressure at least equal to about 50 Newtons per square centimeter.

37. The chemical reactor of claim 17, wherein the outer simple plates and the plurality of intermediate simple plates are permanently joined in the stack.

38. The chemical reactor of claim 37, wherein the mean surface roughness of the plates is less than 5 micrometers.

39. The chemical reactor of claim 37, wherein the stack of simple plates are permanently joined using diffusion welding.

40. The chemical reactor of claim 37, wherein the stack of simple plates are permanently joined using vacuum soldering.

41. The chemical reactor of claim 13, wherein at least one of the intermediate simple plates that are adjacent to the intermediate simple plate in which one of the first and the second heat exchangers is defined is about 0.3 millimeters in thickness.

42. The chemical reactor of claim 13, wherein a common heat transfer fluid flows through the first and the second heat exchanger, and wherein a flow rate and fluid pressure of said common heat transfer fluid within each of the first and the second heat exchangers are substantially the same for each of said heat exchangers.

43. The chemical reactor of claim 13, wherein an opening in a simple plate serves at least one the following functions:
   (a) reduces a surface area of a simple plate, thereby enhancing bonding between adjacent simple plates;
   (b) provides a fluid path for one of:
      (i) said at least two reactants;
      (ii) the chemical product; and
      (iii) a heat transfer fluid;
   (c) facilitates mounting a temperature sensor;
   (d) separates a single fluid path into a plurality of fluid paths;
   (e) provides at least one of a heat exchanger, a mixing chamber, an inter-digital-mixer, and a reaction pathway; and
   (f) enhances a flow characteristic of a fluid, including a direction of a fluid flow and a pressure drop of the fluid within the chemical reactor.

44. A method for fabricating a chemical reactor for combining at least two reactants to produce a desired product, comprising the steps of:
   (a) providing a plurality of simple plates, said plurality of simple plates including two outer simple plates and at least one intermediate simple plate in which is formed at least one opening, at least one of the outer simple plates including at least two inlet ports for said at least two reactants and an outlet port for discharging the desired product;
   (b) stacking said plurality of simple plates such that said at least one opening in said at least one intermediate simple plate is in fluid communication with each inlet port and the outlet port, such that two reactants entering the chemical reactor via different inlet ports are combined within said at least one opening in said at least one intermediate simple plate; and
   (c) securing said plurality of simple plates in the stack.

45. The method of claim 44, wherein the plurality of plates include an index feature, and the step of stacking the plurality of simple plates further includes the step of aligning the index feature.

46. Apparatus for reacting one chemical with at least one other chemical to form a chemical product, said apparatus comprising a plurality of simple plates stacked in layers, each simple plate having at least one opening that extends therethrough, an opening in each simple plate overlapping at least one other opening in an adjacent simple plate, thereby forming at least one passage within the apparatus to convey and mix said one chemical with said at least one other chemical, at least one opening being configured so that said one chemical achieves a stacked laminar flow through said at least one passage with respect to at least one of said at least one other chemical, the chemical product being formed within said passage by a reaction between said one chemical and said at least one other chemical, after said laminar flow is achieved.

47. A reactor for carrying out a chemical process, comprising a plurality of simple plates stacked together in layers, said layers including at least one inlet port and at least one outlet port for the receipt and discharge of chemicals, respectively, and at least one pathway for accommodating the chemicals while they are processed, wherein said at least one pathway is connected in fluid communication with said inlet and outlet ports and comprises an opening through at least one simple plate aligned with an opening through an adjacent simple plate, and wherein said at least one pathway includes an opening through at least one of the simple plates that comprises a mixing pathway, said opening comprising the mixing pathway being sized so that at least one of the chemicals achieves a stacked laminar flow through the mixing pathway with respect to at least one other of the chemicals.

48. Apparatus for reacting one chemical with at least one other chemical to form a chemical product, said apparatus comprising a plurality of simple plates stacked in layers, each simple plate having at least one opening that extends therethrough, an opening in each simple plate overlapping at least one other opening in an adjacent simple plate, thereby forming at least one passage within the apparatus to convey and mix said one chemical with said at least one other chemical, at least one opening being configured so that said one chemical achieves a stacked laminar flow through said at least one passage with respect to at least one of said at least one other chemical, such that a thickness of each layer in said stacked laminar flow is less than a thickness of a simple plate comprising at least one longitudinal opening through which said stacked laminar flow moves, a the chemical product being formed within said passage by a reaction between said one chemical and said at least one other chemical, after said stacked laminar flow is achieved.

49. A reactor for carrying out a chemical process, comprising a plurality of simple plates stacked together in layers, said layers including at least one inlet port and at least one outlet port for the receipt and discharge of chemicals, respectively, and at least one pathway for accommodating the chemicals while they are processed, wherein said at least one pathway is connected in fluid communication with said inlet and outlet ports and comprises an opening through at least one simple plate aligned with an opening through an adjacent simple plate, and wherein said at least one pathway includes an opening through at least one of the simple plates that comprises a mixing pathway, said opening comprising the mixing pathway being configured so that at least one of the chemicals achieves a stacked laminar flow through the mixing pathway with respect to at least one other of the chemicals, wherein at least one simple plate comprises a longitudinal opening through which each layer of said stacked laminar flow moves.

50. A chemical reactor for processing at least two reactants to form a desired chemical product, comprising:

(a) a stack of simple plates, including two outer simple plates and at least one intermediate simple plate, openings within said simple plates being sized and configured such that when the simple plates are stacked in a proper order, a plurality of fluid control structures are defined by openings in said simple plates, said fluid control structures comprising:
  (i) inlet openings for receiving the reactants, such that each different reactant is directed into a different inlet opening, and an outlet opening for discharging the chemical product;
  (ii) fluid paths for each different reactant, such that one fluid path is fluid communication with each inlet; and
  (iii) a volume in fluid communication with each fluid path, said at least two reactants mixing in said volume to react and produce a chemical product, said volume also being in fluid communication with the outlet opening, so that said chemical product is discharged from the chemical reactor through the outlet opening.

51. The chemical reactor of claim 50, wherein an orientation of said fluid paths direct said reactants to enter said volume such that the reactants achieve a stacked laminar flow configuration in at least a portion of said volume.

52. The chemical reactor of claim 51, wherein said fluid control structures comprise a plurality of fluid paths for each reactant, each fluid path for a specific reactant being in fluid communication with the inlet corresponding to the specific reactant, said plurality of fluid paths being oriented such that the reactants achieve a stacked laminar flow configuration in at least a portion of said volume, the stacked laminar flow comprising alternating layers of different reactants.

53. The chemical reactor of claim 51, wherein said at least a portion of said volume is defined by a longitudinal opening in one of said simple plates.

54. The chemical reactor of claim 51, wherein said volume is defined by aligned openings in a plurality of adjacent simple plates, said volume comprises a first portion and a second portion in fluid communication with each other, said first portion being in fluid communication with each fluid path, said second portion being in fluid communication with said outlet, a dimension of said first portion being substantially greater than a dimension of said second portion.

55. The chemical reactor of claim 54, wherein said at least a portion of said volume comprises said second portion.

56. A method for configuring a stacked plate chemical reactor for combining at least two reactants to produce a desired product, such that at least one fluid pathway within the stacked plate chemical reactor comprises overlapping openings in adjacent plates, comprising the steps of:

(a) defining at least one fluid pathway within the stacked plate chemical reactor;

(b) for each defined fluid pathway, determining a size and a disposition of an opening on each individual plate through which the defined fluid pathway will pass, such that when the stacked plate reactor is assembled in a defined order, each defined fluid pathway is established within the stacked plate chemical reactor, and it least two of the stacked plates of the stacked plate reactor comprise simple plates that are disposed adjoining each other; and (c) assembling a plurality of individual simple plates having openings corresponding to those determined to be required to achieve each defined fluid pathway, in the order required to achieve a stacked plate chemical reactor that includes each defined fluid pathway.

57. The method of claim 56, wherein the step of defining at least one fluid pathway comprises the step of defining a fluid pathway for each reactant that will be combined to generate the desired product.

58. The method of claim 56, wherein the step of defining at least one fluid pathway comprises the step of defining a fluid pathway for each desired reaction chamber.

59. The method of claim 58, wherein if the step of defining a fluid pathway for each desired reaction chamber results in a plurality of reaction chambers, further comprising the step of defining a reactant distributor fluid pathway to supply each reaction chamber with the reactants that will be combined therein.

60. The method of claim 56, wherein the step of defining at least one fluid pathway comprises the step of defining a heat transfer fluid pathway.

61. A method for configuring a stacked plate chemical reactor for combining at least two reactants to produce a desired product, such that substantially all fluid pathways within the stacked plate chemical reactor comprise overlapping openings in adjacent plates, comprising the steps of:

(a) determining the number of reactants required to produce the desired product;

(b) determining the number of reaction chambers that will be used to combine the reactants to produce the desired product, and if more than one reaction chamber will be used, determining:

(i) a number of product outlets that will be used;
(ii) a number of reactant distributors that will be used; and
(iii) a number of product collectors that will be used;

(c) determining if any heat exchangers will be required, and if so, determining a number of heat transfer fluids that will be used to service the required heat exchangers;

(d) defining a fluid pathway within the stacked plate chemical reactor for each reactant reaction chamber, each product outlet, each distributor, each collector, each heat exchanger, and each heat transfer fluid;

(e) for each defined fluid pathway, determining a size and a disposition of an opening in each individual plate through which the defined fluid pathway will pass, such that when the stacked plate reactor is assembled, each defined fluid pathway is established within the stacked plate chemical reactor, and at least two of the stacked plates of the stacked plate reactor comprise simple plates that are disposed adjoining each other;

(f) obtaining the individual plates and simple plates required to assemble the defined stacked plate reactor; and (g) assembling the plates and simple plates obtained, in the order required to achieve the stacked plate chemical reactor.

* * * * *

(12) EX PARTE REEXAMINATION CERTIFICATE (5851st)
United States Patent
Schwalbe et al.

(10) Number: US 6,537,506 C1
(45) Certificate Issued: Aug. 7, 2007

(54) MINIATURIZED REACTION APPARATUS

(75) Inventors: Thomas Schwalbe, Bad Vilbel, DE (US); Klaus Golbig, Maintal-Doernigheim, DE (US); Michael Hohmann, Darmstadt, DE (US); Petra Georg, Frankfurt, DE (US); Andreas Oberbeck, Wiesbaden, DE (US); Bernd Dittmann, Sulzbach, DE (US); Jiri Stastna, Eschborn, DE (US); Sebastian Oberbeck, Greifenstein, DE (US)

(73) Assignee: Cellular Process Chemistry, Inc., Richland, WA (US)

Reexamination Request:
No. 90/006,649, May 23, 2003

Reexamination Certificate for:
Patent No.: 6,537,506
Issued: Mar. 25, 2003
Appl. No.: 09/496,999
Filed: Feb. 3, 2000

(51) Int. Cl.
*B01F 5/06* (2006.01)
*B01F 13/00* (2006.01)
*B01F 13/10* (2006.01)
*B01F 15/06* (2006.01)
*B01F 15/00* (2006.01)
*B01J 19/00* (2006.01)
*B01J 19/24* (2006.01)
*F28D 9/00* (2006.01)

(52) U.S. Cl. .................. 422/130; 422/99; 422/100; 422/129; 422/131; 422/138

(58) Field of Classification Search ............... None
See application file for complete search history.

(56) References Cited

U.S. PATENT DOCUMENTS 3,585,131 A * 6/1971 Esmond ............... 210/321.77
3,881,701 A    5/1975 Schoenman et al. .......... 259/4
4,222,671 A * 9/1980 Gilmore ..................... 366/337
4,310,416 A * 1/1982 Tanaka et al. .......... 210/321.75
4,894,146 A * 1/1990 Giddings .................. 209/12.2
5,209,906 A * 5/1993 Watkins et al. ............. 422/200

(Continued)

FOREIGN PATENT DOCUMENTS

WO      WO 00/34728       6/2000

*Primary Examiner*—Alan Diamond

(57) ABSTRACT

A stacked plate chemical reactor in which simple plates, each incorporating no surface features other that an opening, are stacked together. When openings in adjacent plates are properly aligned, a fluid pathway is defined between inlet ports for each chemical reactant and an outlet port for a chemical product. In one embodiment of the invention, sixteen simple plates are stacked to provide a reactor incorporating three heat transfer fluid pathways, two reactant fluid pathways, one product fluid pathway, multiple mixing chambers, multiple reaction chambers, two reactant pretreatment heat exchangers, two reaction chamber heat exchangers, and multiple temperature sensor pathways. Precise dimensional control of the reactant fluid pathways height enables stacked laminar flow paths for the reactants to be achieved, allowing efficient and rapid diffusion mixing to occur. Because the simple plates incorporate no features other than openings, fabrication of such plates is easily achieved. Different reactor designs, having additional reactant pathways, more or fewer heat transfer fluid pathways, more or fewer heat exchangers, more or fewer mixing chambers, more of fewer reaction chambers, and more or fewer sensor pathways can readily be achieved by adding or removing plates from the stack, and or by changing the pattern and number of openings in the simple plates that are used. The simple plates can be field in the stack during use of the chemical reactor using pressure exerted on opposite outer simple plates of the stack, or can be permanently joined. A preferred material for the fabrication of the plates is stainless steel, although other materials such as glass, plastic, and other metals can alternatively be used, which are compatible with the selected reactants and the desired product.

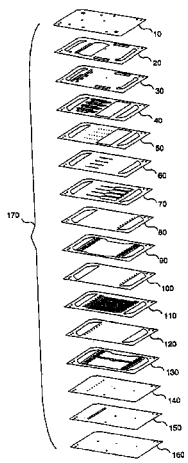

U.S. PATENT DOCUMENTS

| | | | |
|---|---|---|---|
| 5,250,263 A | | 10/1993 | Manz .......................... 422/81 |
| 5,399,317 A | * | 3/1995 | Stolowitz ..................... 422/99 |
| 5,534,328 A | * | 7/1996 | Ashmead et al. ............ 428/166 |
| 5,580,523 A | * | 12/1996 | Bard ........................... 422/50 |
| 5,595,712 A | * | 1/1997 | Harbster et al. ............. 422/129 |
| 5,641,400 A | | 6/1997 | Kaltenbach et al. ...... 210/198.2 |
| 5,690,763 A | * | 11/1997 | Ashmead et al. .............. 156/60 |
| 5,698,485 A | * | 12/1997 | Bruck et al. ................. 264/624 |
| 5,741,466 A | * | 4/1998 | Bodnaras ..................... 422/228 |
| 5,811,062 A | * | 9/1998 | Wegeng et al. .............. 422/129 |
| 5,928,880 A | * | 7/1999 | Wilding et al. ............. 435/7.21 |
| 5,939,024 A | * | 8/1999 | Robertson ................... 422/101 |
| 5,961,932 A | * | 10/1999 | Ghosh et al. ................ 422/193 |
| 5,976,472 A | * | 11/1999 | Chatterjee et al. ........... 422/130 |
| 5,993,750 A | * | 11/1999 | Ghosh et al. ................ 422/191 |
| 6,036,927 A | * | 3/2000 | Chatterjee et al. ........... 422/211 |
| 6,085,966 A | * | 7/2000 | Shimomuki et al. ......... 228/193 |
| 6,126,723 A | * | 10/2000 | Drost et al. ........................ 96/4 |
| 6,171,865 B1 | | 1/2001 | Weigl et al. ................... 436/52 |
| 6,192,596 B1 | | 2/2001 | Bennett et al. ................. 34/76 |
| 6,221,226 B1 | * | 4/2001 | Kopf-Sill ..................... 204/602 |
| 6,240,640 B1 | * | 6/2001 | Matsuoka et al. ....... 29/897.32 |
| 6,264,900 B1 | * | 7/2001 | Schubert et al. ............. 422/224 |
| 6,494,614 B1 | * | 12/2002 | Bennett et al. .............. 366/336 |

* cited by examiner

US 6,537,506 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 31–37:

Preferably, openings within different layers align so as to form at least one inlet port and at least one outlet port, for the receipt and discharge of chemicals, and to form at least one pathway for conveying chemicals to be processed. At least one pathway is formed that is fluid connection with the inlet and outlet ports, and each simple plate has a least one opening formed in it. *In an exemplary reactor, no openings penetrate the peripheral edges defining the perimeter of the simple plates.*

Column 4, lines 47–55:

It is also preferable that the reactor accommodate a plurality of operations, including temperature control, control of chemical residence time, chemical mixing, and chemical reacting. Temperature control is achieved using a combination of one or more temperature sensors and one or more heat exchangers. Preferably, chemical mixing is carried out by employing pathways sized so that a reactant achieves a stacked laminar flow with respect to at least one other reactant. *In an exemplary factor, fluid passages used to implement heat exchangers are not in fluid communication with fluid passages for reactants or products, or fluid passages corresponding to reaction volumes and mixing volumes. In an exemplary reactor, the pathways configured to achieve chemical mixing are defined entirely by openings in the simple plates, and such pathways are enclosed within the reactor. An exemplary mixing volume is implemented by an elongate opening extending along a longitudinal axis in the simple plate in which the elongate opening is formed. Different reactants are introduced into the elongate opening through different openings in an immediately adjacent simple plate. The simple plates are flat; and thus they do not include surface features such as grooves, etching, or channels that do not completely penetrate the simple plate.*

Column 4, lines 47-55:

Preferably, any stacked simple plate reactor should have the ability to maintain a desired narrow temperature range within the reactor, so that reaction dynamics can be closely controlled. In a preferred embodiment, the reactant and heat transfer media enter the stacked simple plate reactor via vertically oriented fluidic channels. Reacted product and spent heat transfer media exit the reactor via similarly disposed vertically oriented fluidic channels. The chemical processing operations occur in horizontally disposed channels within the reactor (*where vertical is intended to refer to a direction parallel to a thickness of each simple plate, and horizontal is intended to refer to a direction that is orthogonal to a thickness of each simple plate*). It should be noted that the use of the term channel when used in conjunction with a stacked simple plate reactor should not be construed to mean that such a channel corresponds to a groove formed into the surface of an individual plate. While each individual simple plate only has openings and no grooves, channels or other fluid pathways are easily obtained in a stacked simple plate reactor. To form a channel, an elongated narrow opening is formed in one simple plate and that simple plate is sandwiched between two simple plates that do not have a corresponding elongated opening. The top of the channel is defined by the upper simple plate, the sides of the channel are defined by the sides of the opening formed in the middle simple plate, and the bottom of the channel is defined by the bottom plate. Thus, the depth of the channel is the same as the thickness of the middle simple plate. Fluid pathways between adjacent simple plates within a stacked simple plate reactor are created when openings through the stacked simple plates are aligned.

Column 21, lines 20–57:

FIG. 18C illustrates the combined flows of Reactants A and B after passing through the sixth layer and processing through layers 7–16 of reactor 170. Reactants A and B as combined (in a stacked laminar flow pattern) flow through four fluid channels 75 on seventh simple plate 70. Channels 75 lead to four mixing chambers 77. In mixing chambers 77, the stacked laminar flow is compressed, further enhancing rapid diffusion mixing. Second heat exchanger 46 is used to control the temperature of the reactants as they mix in mixing chambers 77. After Reactants A and B become thoroughly mixed in mixing chambers 77, the now mixed Reactants A and B flow through a plurality of mixed reactant openings 85 on eighth simple plate 80. The mixed reactants then flow through the ninth and tenth layers via identical mixed reactant openings 85 in simple plates 90 and 100, respectively. The mixed reactants then flow into reaction channels 115 on eleventh simple plate 110. Reaction channels 115 preferably provide sufficient residence time so that the majority (if not all) of the reaction is complete. If reaction channels 115 do not provide sufficient residence time, then an additional residence time chamber can be added downstream of reactor 170, As noted above, the quality and yield of the desired reaction is greatly effected by the ability to control temperature during the reaction process. The preferred reactor provides heat exchangers on simple plates 90 and 130 to precisely control the temperature within reaction channels 115. If additional residence time chambers are required, then control of the temperature in the additional residence time chambers is also highly desirable. After passing through reaction channels 115 in the eleventh layer, the resulting product passes through a plurality of product openings 125 in simple plates 120, 130, and 140 of layers 12, 13 and 14, respectively. The eight individual product streams represented by the these openings are then combined into a single product channel 155 on fifteenth simple plate 150, of layer 15. This single product exits the reactor via a product outlet 165 on sixteenth simple plate 160, in the bottom (sixteenth) layer of the reactor. *Note that for each reaction channel 115, the resulting product exits the reaction channel at a single location (i.e., there is only one opening 125 for each reaction channel).*

Column 24, lines 46–60:

FIG. 21 is an enlarged view of area 185 of FIG. 20. FIG. 21 illustrates how altering openings 55 and 57 for Reactants A and B result in a "stacked" laminar flow. As can be clearly seen in FIGS. 18B and 18C, the reactants are flowing from left to right through layers 5–7. Reactant A enters the combined volume of fluid channels 65 and 75 first, via Reactant A opening 55a. Because Reactant A from opening 55a is the first fluid entering the combined volume of fluid channels 65 and 75, it moves to the bottom of the combined volume. A very short time later, Reactant B enters the combined volume of fluid channels 65 and 75, via Reactant B opening 57a. Because Reactant A from opening 55a has reached the bottom of the combined volume 65/75 first, Reactant B from opening 57a is "stacked" on top of Reactant A from opening 55a. *Note that the arrow in FIG. 21 indicates that the reactants are flowing horizontally (i.e., orthogonal to the thickness of the simple plates).*

Column 26, lines 8–37:

Compare the poorly design inter-digital-mixer of FIG. 22 with the preferred inter-digital mixer of FIG. 23. The shape of Reactant A opening 45 has been changed to include a curve at the portion of the openings that are superimposed over fluid channel 65. These curves ensure that even during low pressure or low flow conditions, Reactant A enters fluid channel 65 from the same side as Reactant B. FIG. 23 similarly includes dashed lines indicating an area 187. In the enlarged view of area 187, a Reactant A fluid flow 245 can be seen with a Reactant B fluid 247 stacked on top, rather than side by side, as in FIG. 22. As noted above, in layers 4–7 (the inter-digital-mixer, fluid channels 65 and 75, and mixing chambers 77) the reactants flow from left to right, Reactant A enters fluid channel 65 first, and is thus on the bottom of the channel, with Reactant B stacked on top. *Note that in FIG. 23, each layer of Reactant A and Reactant B extends across the width of fluid channel 65, whereas in FIG. 22, because Reactant A and Reactant B are disposed side-by-side, the reactants do not extend across the width of the fluid channel.* Because the openings alternate between Reactant A and Reactant B, a six layer stacked laminar flow is achieved, with three layers of Reactant A and three layers of Reactant B in an alternating pattern. While additional simple plates could have been added to the preferred reactor to define a reactant fluid path that also ensured that the reactants would enter fluid channel 65 from the same side, this modification would not only increase the cost and complexity of the reactor, but it would also result in different pressure drops between the reactants. This difference would result in less than ideal mixing dynamics, and thus, is not a preferred solution. It should be noted that the shape of openings 45, in particular, the curve radius, length and width have been carefully selected to achieved an equal pressure drop for both Reactants A and B.

AS A RESULT OF REEXAMINATION, IT HAS BEEN DETERMINED THAT:

Claims 11, 12, 17, 49, 51, 52 and 59 are cancelled.

Claims 1, 2, 8, 10, 13–15, 18–19, 27–29, 32, 33, 37, 44, 46–48, 50, 53, 54, 56–58, 60 and 61 are determined to be patentable as amended.

Claims 3–7, 9, 16, 20–26, 30, 31, 34–36, 38–43, 45 and 55, dependent on an amended claim, are determined to be patentable.

New claims 62–86 are added and determined to be patentable.

1. Apparatus for reacting one chemical with at least one other chemical to form a chemical product, said apparatus comprising [a plurality of] *at least three* simple plates stacked in layers, each simple plate having at least one opening that extends therethrough, *a first planar surface, and a second planar surface that is opposite to said first planar surface, both said first and said second planar surfaces being substantially parallel, each simple plate further having peripheral edges defining a perimeter of said first and said second planar surfaces, such that each opening penetrates said first planar surface and said second planar surface, but not said peripheral edges,* an opening in each simple plate overlapping at least one other opening in an adjacent simple plate, thereby forming at least one passage within the apparatus for each of said one chemical and said at least one other chemical, *a passage being present as a horizontal channel and being defined by three adjacent simple plates, a top of the channel is defined by an upper one of the three adjacent simple plates, a bottom of the channel is defined by a lower one of the three adjacent simple plates, and each vertical side of the channel is defined by only a side of an opening in a middle one of the three adjacent simple plates,* such that at least one passage for said one chemical and at least one passage for said at least one other chemical merge within the apparatus to form a reaction chamber, the chemical product being formed within said reaction chamber by a reaction between said one chemical and said at least one other chemical, *the reaction chamber including an outlet for discharging the chemical product.*

2. A reactor for carrying out a chemical process, comprising a plurality of simple plates stacked together in layers, *each simple plate comprising a first planar surface, and a second planar surface that is opposite to said first planar surface, both said first and said second planar surfaces being substantially parallel, each simple plate further having peripheral edges defining a perimeter of said first and said second planar surfaces,* said reactor including at least two chemical reactant inlet ports and at least one product outlet port for the receipt and discharge of a chemical product, *each inlet port and each outlet port being defined by an opening in a simple plate, wherein the opening penetrates the first planar surface and the second planar surface of the simple plate, but not the peripheral edges of the simple plate,* at least two inlet pathways for accommodating the chemical reactants, wherein each inlet pathway is connected in fluid communication with a different one of the said chemical reactant inlet ports, said at least two inlet pathways merging within the reactor to form at least one reaction chamber in which at least two chemical reactants can react to generate a chemical product, at least one outlet pathway coupling said at least one reaction chamber in fluid communication with said at least one product outlet port, *at least one heat exchanger volume, said at least one heat exchanger volume being disposed to thermally condition at least one of the chemical reactants, as well as the at least one reaction chamber, the at least one heat exchanger volume being fluidically isolated from the at least two inlet pathways and the at least one reaction chamber, and wherein each chemical reactant inlet port, inlet pathway, reaction chamber, heat exchanger volume, and product outlet port* comprises an opening through at least one simple plate aligned with at least a portion of an opening through an adjacent simple plate.

8. The reactor of claim 7, wherein [at least one of the simple plates operates as a heat exchanger to control the temperature of at least one of the chemicals within the reactor] *the at least one heat exchanger volume is configured to thermally condition a chemical reactant in a first one of the at least two inlet pathways without also thermally conditioning a chemical reactant in a second one of the at least two inlet pathways.*

10. A chemical reactor for processing at least two reactants to form a desired chemical product, comprising:
(a) a stack of simple plates, including two outer simple plates and [at least one intermediate simple plate] *a plurality of intermediate simple plates*;
(b) at least two *reactant* inlet openings for receiving the reactants, such that each different reactant is directed into a different *reactant* inlet opening, and an outlet opening for discharging the chemical product, each *reactant* inlet opening and said outlet opening being formed in at least one of the outer simple plates; [and]
(c) an opening through at least one intermediate simple plate forming a reaction chamber, said reaction chamber being in fluid communication with each *reactant* inlet opening for receiving the reactants, said at least two reactants mixing in said chemical reactor and reacting therein to produce the chemical product, said reaction chamber also being in fluid communication with the outlet opening, so that said chemical product is discharged from the chemical reactor through the outlet opening*;*
(d) *a first heat exchange fluid inlet port and a first heat exchange fluid outlet port through which a first heat transfer fluid is introduced into and discharged from the chemical reactor, said first heat exchange fluid inlet port and said first heat exchange fluid outlet port being disposed in at least one of the outer simple plates; and*
(e) *a first heat exchanger defined by an opening in at least one intermediate simple plate in the stack and by adjacent simple plates disposed on opposite sides of said opening, the first heat exchanger being in fluid communication with the first heat exchanger fluid inlet port and the first heat exchanger fluid outlet port, the first heat exchanger being fluidically isolated from the at least two reactant inlet openings and the reaction chamber, and the first heat exchanger being disposed to thermally condition at least one of:*
    (i) *a first reactant before the first reactant enters the reaction chamber:*
    (ii) *a second reactant before the second reactant enters the reaction chamber; and*
    (iii) *a fluid in the reaction chamber.*

13. The chemical reactor of [claim 11] *claim 10*, further comprising:
(a) a second heat exchange fluid inlet port and a second heat exchange fluid outlet port through which a second heat transfer fluid is introduced into and discharged from the chemical reactor, said second heat exchange fluid inlet port and said second heat exchange fluid outlet port being disposed in at least one of the simple plates; and
(b) a second heat exchanger defined by an opening in at least one intermediate simple plate in the stack and by adjacent simple plates disposed on opposite sides of said opening, said opening being in fluid communication with the second heat exchange fluid inlet port and the second heat exchange fluid outlet port.

14. The chemical reactor of claim 13, wherein the first and the second heat exchangers are defined by [opening] *openings* in different intermediate simple plates.

15. The chemical reactor of [claim 12] *claim 13*, wherein the second heat exchanger is used to modify a temperature of at least one of the at least two reactants such that said at least one of the at least two reactants has a different [temperatures] *temperature*.

18. The chemical reactor of [claim 17] *claim 10*, wherein at least some of the plurality of intermediate simple plates each include a plurality of openings formed therethrough and at least one of the plurality of openings defines a first fluid path for a first reactant of said at least two reactants, and a second fluid path for a second reactant of said at least two reactants.

19. The chemical reactor of claim 18, wherein said intermediate simple plates that include openings defining the first fluid path and the second fluid path comprise an inter-digital-mixer that separates and aligns said first fluid path and said second fluid path, forming a plurality of individual fluid paths *for a first one of said at least two reactants, and for a second one of said at least two reactants*.

27. The chemical reactor of [claim 17] *claim 10*, wherein openings in a substantial portion of said plurality of intermediate simple plates share a common shape and size, to minimize fabrication costs for the chemical reactor.

28. The chemical reactor of [claim 17] *claim 10*, wherein said outer simple plates and said plurality of intermediate simple plates are chamfered to provide a reference when assembling the simple plates to form the chemical reactor.

29. The chemical reactor of [claim 17] *claim 10*, further comprising at least one temperature sensor disposed to monitor a temperature of at least one of said at least two chemical reactants and the chemical product.

32. The chemical reactor of [claim 17] *claim 10*, wherein a thickness of [said] *each* outer simple [plates] *plate* is about 3 millimeters, and a thickness of [said plurality of] *each* intermediate simple [plates] *plate* is at least 0.2 millimeters and not more than 0.6 millimeters.

33. The chemical reactor of [claim 17] *claim 10*, further comprising means for applying a compressive force to the stack of simple plates, such that the stack of simple plates are removably held together with an applied compressive force.

37. The chemical reactor of [claim 17] *claim 10*, wherein the outer simple plates and the plurality of intermediate simple plates are permanently joined in the stack.

44. A method for fabricating a chemical reactor for combining at least two reactants to produce a desired product, comprising the steps of:
(a) providing a plurality of simple plates, said plurality of simple plates including two outer simple plates and [at least one intermediate simple plate in which is] *a plurality of intermediate simple plates in which are* formed at least [one opening] *two openings, said openings in the plurality of intermediate simple plates being configured to define a reaction chamber and a heat exchanger, the reaction chamber and the heat exchanger being configured to be fluidically isolated from one another*, at least one of the outer simple plates including at least two inlet ports for said at least two reactants, *a heat exchanger inlet port for introduction of a heat transfer media, a heat exchanger outlet port for removal of a spent heat transfer media,* and an outlet port for discharging the desired product;
(b) stacking said plurality of simple plates [such that said at least one opening in said at least one intermediate simple plate is] *such that:*
    (i) *each opening in an intermediate simple plate configured to define said reaction chamber is* in fluid communication with each inlet port *for said at least two reactants* and the outlet port *for discharging the desired product, and* such that two reactants entering the chemical reactor via different inlet ports are combined within said [at least one opening in said at least one intermediate simple plate] *reaction chamber;*

(ii) each opening in an intermediate simple plate configured to define said heat exchanger is in fluid communication with said heat exchanger inlet port and said heat exchanger outlet port; and (iii) each opening in an intermediate simple plate configured to define said reaction chamber is fluidically isolated from each opening in an intermediate simple plate configured to define said heat exchanger; and (c) securing said plurality of simple plates in the stack.

46. Apparatus for reacting one chemical with at least one other chemical to form a chemical product, said apparatus comprising a plurality of simple plates stacked in layers, each simple plate having at least one opening that extends therethrough, an opening in each simple plate overlapping at least one other opening in an adjacent simple plate, thereby forming at least one passage within the apparatus to convey and mix said one chemical with said at least one other chemical, at least one opening configured so that said one chemical achieves a stacked laminar flow though said at least one passage with respect to at least one of said at least one other chemical, *the stacked laminar flow comprising alternating layers of said one chemical and said at least one other chemical stacked one on top of the other, with there being more than one layer of each of said one chemical and said at least one other chemical,* the chemical product being formed within said passage by a reaction between said one chemical and said at least one other chemical, after said laminar flow is achieved.

47. A reactor for carrying out a chemical process, comprising a plurality of simple plates stacked together in layers, said layers including:

(a) at least one inlet port and at least one outlet port for the receipt and discharge of chemicals, respectively[, and];

(b) at least one pathway for accommodating the chemicals while they are processed, wherein said at least one pathway is connected in fluid communication with said inlet and outlet ports and comprises an opening through at least one simple plate aligned with an opening through an adjacent simple plate, [and] wherein said at least one pathway includes an opening through at least one simple plates that comprises a mixing pathway, said opening comprising the mixing pathway being sized so that [at least one of the chemicals achieves a stacked laminar flow through the mixing pathway with respect to at least one other of the chemicals] *the chemicals achieve a stacked laminar flow through the mixing pathway, the laminar flow comprising a layer of one of the chemicals stacked on a layer of another of the chemicals, each such layer extending across a width of the mixing pathway;* and (c) at least one heat exchanger volume, the at least one exhanger volume being configured to thermally condition at least one of the chemicals and a fluid contained within the mixing pathway, the at least one heat exchanger volume being fluidically isolated from the mixing pathway and being defined by an opening through at least one simple plate.

48. Apparatus for reacting one chemical with at least one other chemical to form a chemical product, said apparatus comprising a plurality of simple plates stacked in layers, each simple plate having at least one opening that extends therethrough, an opening in each simple plate overlapping at least one other opening in an adjacent simple plate, thereby forming at least one passage within the apparatus to convey and mix said one chemical with said at least one other chemical, at least one opening being configured so that said one chemical achieves a stacked laminar flow through said at least one passage with respect to at least one of said at least one other chemical, such that a thickness of each layer in said stacked laminar flow is less than a thickness of a simple plate comprising at least one longitudinal opening through which said stacked laminar flow moves, [a] the chemical product being formed within said passage by a reaction between said one chemical and said at least one other chemical, after said stacked laminar flow is achieved.

50. A chemical reactor for processing at least two reactants to form a desired chemical product, comprising:

(a) a stack of simple plates, including two outer simple plates and at least one intermediate simple plate, openings within said simple plates being sized and configured such that when the simple plates are stacked in a proper order, a plurality of fluid control structures are defined by openings in said simple plates, said fluid control structures comprising:

(i) inlet openings for receiving the reactants, such that each different reactant is directed into a different inlet opening, and an outlet opening for discharging the chemical product, *each inlet opening and the outlet opening being formed in an outer simple plate*;

(ii) *a plurality of* fluid paths for each different reactant, such that [one] *each* fluid path *for a specific reactant* is *in* fluid communication with [each inlet] *the inlet opening for said specific reactant*; and (iii) a *reaction* volume in fluid communication with each fluid path, said at least two reactants mixing in said *reaction* volume to react and produce [a] *the* desired chemical product, *the plurality of fluid paths being oriented such that the reactants achieve a stacked laminar flow configuration in at least a portion of said reaction volume, the stacked laminar flow configuration comprising alternating layers of different reactants, the reactants being thoroughly mixed in the reaction volume*, said *reaction* volume also being in fluid communication with the outlet opening, so that said chemical product is discharged from the chemical reactor through the outlet opening.

53. The chemical reactor of [claim 51] *claim 50*, wherein said at least a portion of said *reaction* volume is defined by a longitudinal opening in one of said simple plates.

54. The chemical reactor of [claim 51] *claim 50*, wherein said *reaction* volume is defined by aligned openings in a plurality of adjacent simple plates[, said volume] *and* comprise a first portion and a second portion in fluid communication with each other, said first portion being in fluid communication with each fluid path, said second portion being in fluid communication with said outlet, a dimension of said first portion being substantially greater than a dimension of said second portion.

56. A method for configuring a stacked plate chemical reactor for combining at least two reactants to produce a desired product, such that [at least one fluid pathway] *a plurality of fluid pathways* within the stacked plate chemical reactor comprises overlapping openings in adjacent plates, comprising the steps of:

(a) defining [at least one fluid pathway within the stacked plate chemical reactor] *a plurality of fluid pathways within the stacked plate chemical reactor, the plurality of fluid pathways comprising*:

(i) *a mixing and reactant pathway configured to facilitate the combining of the at least two reactants to produce the desired product;*

(ii) a first reactant pathway configured to convey a first reactant into the mixing and reactant pathway;

(iii) a second reactant pathway configured to convey a second reactant into the mixing and reactant pathway;

(iv) a product pathway configured to convey the desired product from the mixing and reactant pathway to a product outlet;

(v) a heat exchanger pathway configured to thermally condition a fluid within at least one of the plurality of fluid pathways, the heat exchanger pathway being fluidically isolated from the mixing and reactant pathway, the first reactant pathway, the second reactant pathway, and the product pathway;

(vi) a heat transfer media inlet pathway configured to convey a heat transfer media into the heat exchanger pathway; and, (vii) a heat transfer media outlet pathway configured to convey the heat transfer media out of the heat exchanger pathway;

(b) for each defined fluid pathway, determining a size and a disposition of an opening on each individual plate through which the defined fluid pathway will pass, such that when the stacked plate reactor is assembled in a defined order, each defined fluid pathway is established within the stacked plate chemical reactor, and at least two of the stacked plates of the stacked plate reactor comprise simple plates that are disposed adjoining each other, *such that each inlet and each outlet in fluid communication with a fluid pathway is defined by an opening in an outer simple plate*; and (c) assembling a plurality of individual simple plates having openings corresponding to those determined to be required to achieved each defined fluid pathway, in the order required to achieved a stacked plate chemical reactor that includes each defined fluid pathway.

57. The method of claim 56, wherein the step of defining [at least one fluid pathway comprises the step of defining a fluid pathway for each reactant that will be combined to generate the desired product] *the plurality of fluid pathways comprises the step of defining the heat exchanger pathway such that a heat transfer plate configured to fluidically isolate the heat exchanger pathway from the at least one fluid pathway conveying the fluid that the heat exchanger pathway is configured to thermally condition has a thickness of at least about 0.2 millimeters and no more than about 0.6 millimeters*.

58. The method of claim 56, wherein the step of defining [at least one fluid pathway] *the plurality of fluid pathways* comprises the step of defining a [fluid pathway for each desired reaction chamber] *plurality of mixing and reaction pathways*.

60. The method of claim 56, wherein the step of defining [at least one fluid pathway comprises the step of defining a heat transfer fluid pathway] *the plurality of fluid pathways comprises the step of defining*:

(a) an additional heat exchanger pathway configured to thermally condition a fluid within at least one of the plurality of fluid pathways, the additional heat exchanger pathway thermally conditioning a fluid in *different fluid pathways than* the heat exchanger pathway, the additional heat exchanger pathway being fluidically isolated from the mixing and reactant pathway, the first reactant pathway, the second reactant pathway, and the product pathway;

(b) an additional heat transfer media inlet pathway configured to convey a heat transfer media into the additional heat exchanger pathway; and (c) an additional heat transfer media outlet pathway configured to convey the heat transfer media out of the additional heat exchanger pathway.

61. *A method for configuring a stacked plate chemical reactor for combining at least two reactants to produce a desired product, such that substantially all fluid pathways within the stacked plate chemical reactor comprise overlapping openings in adjacent plates, comprising the steps of:*

(a) *determining the number of reactants required to produced the desired product;*

(b) *determining the number of reaction chambers that will be used to combined the reactants to produce the desired product, and if more than one reaction chamber will be used, determining:*

(i) *a number of product outlets that will be used;*

(ii) *a number of reactant distributors that will be used; and*

(iii) *a number of product collectors that will be used;*

(c) *determining* [if any] *a number of heat exchanger that will be required, and* [if so,] *determining a number of heat transfer fluids that will be used to service the required heat exchangers;*

(d) *defining a fluid pathway within the stacked plate chemical reactor for each reactant, each reaction chamber, each product outlet, each distributor, each collector, each heat exchanger, and each heat transfer fluid;*

(e) *for each defined fluid pathway, determining a size and a disposition of an opening in each individual plate through which the defined fluid pathway will pass, such that when the stacked plate reactor is assembled, each defined fluid pathway is established within the stacked plate chemical reactor, and at least two of the stacked plates of the stacked plate reactor comprise simple plates that are disposed adjoining each other, such that an inlet and an outlet in fluid communication with the fluid pathway are each defined by an opening in an outer simple plate, the openings in the stacked plates being form so that the required heat exchangers are fluidically isolated from openings in the stacked plates corresponding to fluid pathways for each reactant, each reaction chamber, and each product outlet;*

(f) *obtaining the individual plates and simple plates required to assemble the defined stackled plate reactor; and*

(g) *assembling the plates and simple plates obtained, in the order required to achieve the stacked plate chemical reactor.*

62. *A method for fabricating and then using a chemical reactor for combining at least two reactants to produce a desired product, comprising the steps of:*

(a) *providing a plurality of simple plates, said plurality of simple plates including two outer simple plates and a plurality of intermediate simple plates in which are formed at least one opening, at least one of the outer simple plates including at least two inlet ports for said at least two reactants and an outlet port for discharging the desired product;*

(b) *stalking said plurality of simple plates such that said at least one opening in said intermediate simple plates is in fluid communication with each inlet port and the outlet port, such that the at least two reactants entering the chemical reactor via different inlet ports are combined within the at least one opening in the plurality of intermediate simple plates, openings in the intermediate simple plates being configured and oriented to* enable diffusion-based-mixing to occur in the at least one opening in the plurality of intermediate simple plates, the diffusion-based-mixing occurring between a layer of a first one of said at least two reactants and a layer of a second one of the at least two reactants, where such layers are stacked together one layer on top of the other layer;

(c) securing said plurality of simple plates in the stack, thereby achieving a stacked plate reactor; and then (d) introducing at least two reactants into said reactor, such that diffusion-based-mixing of said at least two reactants results in a chemical reaction between said at least two reactants, thereby yielding the desired product, which is directed out of the reactor via the outlet port.

63. A method for configuring and then using a stacked plate chemical reactor for combining at least two reactants to produce a desired product, such that at least one fluid pathway within the stacked plate chemical reactor comprises overlapping openings in adjacent plates, comprising the steps of:

(a) defining at least one fluid pathway within the stacked plate chemical reactor;

(b) for each defined fluid pathway, determining a size and a disposition of an opening on each individual plate through which the defined fluid pathway will pass, such that:

(i) when the stacked plate reactor is assembled in a defined order, each defined fluid pathway is established within the stacked plate chemical reactor;

(ii) at least three of the stacked plates of the stacked plate reactor comprise simple plates that are disposed adjoining each other, each simple plate of the stacked plate reactor comprising a first planar surface, and a second planar surface that is opposite to said first planar surface, both said first and said second planar surface being substantially parallel, each simple plate of the stacked plate reactor further having peripheral edges defining a perimeter of said first and said second planar surfaces, such that each opening penetrates said first planar surface and said second planar surface, but not said peripheral edges; and (iii) a portion of said at least one fluid pathway is defined by three adjacent simple plates and is present as a horizontal channel, a top of the channel is defined by an upper one of the three adjacent simple plates, a bottom of the channel is defined by a lower one of the three adjacent simple plates, and each vertical side of the channel is defined by only a side of an opening in a middle one of the three adjacent simple plates;

(c) assembling at least three individual simple plates having openings corresponding to those determined to be required to achieve each defined fluid pathway, in the order required to achieve a stacked plate chemical reactor that includes each defined fluid pathway; and then (d) introducing at least two reactants into said reactor, such that mixing of said at least two reactants results in a chemical reaction between said at least two reactants, thereby yielding the desired product, which is directed out of the reactor via an outlet port.

64. A method for configuring and then using a stacked plate chemical reactor for combining at least two reactants to produce a desired product, such that at least one fluid pathway within the stacked plate chemical reactor comprises overlapping openings in adjacent plates, comprising the steps of:

(a) defining at least one fluid pathway within the stacked plate chemical reactor;

(b) for each defined fluid pathway, determining a size and a disposition of an opening on each individual plate through which the defined fluid pathway will pass, such that:

(i) when the stacked plate reactor is assembled in a defined order, each defined fluid pathway is established within the stacked plate chemical reactor;

(ii) at least two of the stacked plates of the stacked plate reactor comprise simple plates that are disposed adjoining each other; and (iii) mixing of the at least two reactants is achieved while the at least two reactants each flow stacked with respect to each other through a horizontally extending opening in an intermediate simple plate, such that a direction of the flow of each reactant in the horizontally extending opening is orthogonal to a thickness of the intermediate simple plate;

(c) assembling a plurality of individual simple plates having openings corresponding to those determined to be required to achieve each defined fluid pathway, in the order required to achieve a stacked plate chemical reactor that includes each defined fluid pathway; and then (d) introducing at least two reactants into said reactor, such that mixing of said at least two reactants results in a chemical reaction between said at least two reactants, thereby yielding the desired product, which is directed out of the reactor via an outlet port.

65. Apparatus for reacting one chemical with at least one other chemical to form a chemical product, said apparatus comprising a plurality of simple plates stacked in layers, each simple plate having at least one opening that extends therethrough, an opening in each simple plate overlapping at least one other opening in an adjacent simple plate, thereby forming at least one passage within the apparatus for each of said one chemical and said at least one other chemical, such that at least one passage for said one chemical and at least one passage for said at least one other chemical merge within the apparatus to form a reaction chamber, the reaction chamber having only a single fluid outlet for discharging a fluid, the chemical product being formed within said reaction chamber by a reaction between said one chemical and said at least one other chemical, mixing of said one chemical and said at least one other chemical being achieved while said one chemical and said at least one other chemical each flow stacked with respect to each other through a horizontally extending opening in an intermediate simple plate, such that a direction of the flow of said one chemical and said at least one other chemical in the horizontally extending opening is orthogonal to a thickness of the intermediate simple plate.

66. Apparatus for reacting one chemical with at least one other chemical to form a chemical product, said apparatus comprising a plurality of simple plates stacked in layers, each simple plate having at least one opening that extends therethrough, an opening in each simple plate overlapping at least one other opening in an adjacent simple plate, thereby forming at least one passage within the apparatus for each of said one chemical and said at least one other chemical, such that at least one passage for said one chemical and at least one passage for said at least one other chemical merge within the apparatus to form both a mixing chamber where said one chemical and said at least one other chemical are thoroughly mixed and a reaction chamber in fluid communication with the mixing chamber, such that said one chemical and said at least one other chemical are thoroughly mixed while flowing through the mixing chamber, stacked with respect to each other, in a horizontal direction and experience a substantially equivalent pressure drop in the mixing chamber, the horizontal direction being orthogonal to a thickness of the simple plates, the chemical product being formed within said reaction chamber by a reaction between said one chemical and said at least one other chemical.

67. A method for fabricating and then using a chemical reactor for combining one chemical reactant with at least one other chemical reactant to form a desired chemical product, comprising the steps of:

(a) providing a plurality of simple plates, said plurality of simple plates including two outer simple plates and a plurality of intermediate simple plates in which are formed at least one opening, at least one of the outer simple plates including at least two inlet ports for said one chemical reactant and said at least one other chemical reactant, and an outlet port for discharging the desired chemical product;

(b) stacking said plurality of simple plates such that said at least one opening in said intermediate simple plates is in fluid communication with each inlet port and the outlet port, so that the one chemical reactant and said at least one other chemical reactant entering the chemical reactor via different inlet ports are combined within the at least one opening in said plurality of intermediate simple plates, openings in the intermediate simple plates being configured and oriented to achieve a mixing pathway in which the one chemical reactant and the at least one other chemical reactant achieve a stacked laminar flow with respect to each other, such that when the one chemical reactant and the at least one other chemical reactant first combine, their flows are substantially parallel;

(c) securing said plurality of simple plates in the stack, thereby achieving a stacked plate reactor; and then (d) introducing the one chemical reactant and the at least one other chemical reactant into said reactor, such that stacked laminar flow mixing of the one chemical reactant and the at least one other chemical reactant results in a chemical reaction between the one chemical reactant and the at least one other chemical reactant, thereby yielding the desired chemical product, which is directed out of the reactor via the outlet port.

68. A method for fabricating and then using a chemical reactor for combining one chemical reactant with at least one other chemical reactant to form a desired chemical product, comprising the steps of:

(a) providing a plurality of simple plates, said plurality of simple plates including two outer simple plates and a plurality of intermediate simple plates in which are formed at least one opening, at least one of the outer simple plates including at least two inlet ports for said one chemical reactant and said at least one other chemical reactant, and an outlet port for discharging the desired chemical product;

(b) stacking said plurality of simple plates such that said at least one opening in said plurality of intermediate simple plates is in fluid communication with each inlet port and the outlet port, such that the one chemical reactant and said at least one other chemical reactant entering the chemical reactor via different inlet ports are combined within the at least one opening in said plurality of intermediate simple plates, openings in the intermediate simple plates being configured and oriented to enable said one chemical reactant and said at least one other chemical reactant to achieve a stacked laminar flow in a mixing pathway, the stacked laminar flow including a plurality of alternating stacked layers of said one chemical reactant and said at least one other chemical reactant;

(c) securing said plurality of simple plates in the stack, thereby achieving a stacked plate reactor; and then (d) introducing the one chemical reactant and the at least one other chemical reactant into said reactor, such that stackled laminar flow mixing of the one chemical reactant and the at least one other chemical reactant results in a chemical reaction between the one chemical reactant and the at least one other chemical reactant, thereby yielding the desired chemical product, which is directed out of the reactor via the outlet port.

69. Apparatus for reacting one chemical with at least one other chemical to form a chemical product, said apparatus comprising:

(a) a plurality of metal simple plates stacked in layers, each metal simple plate having at least one opening that extends therethrough, an opening in each metal simple plate overlapping at least one other opening in an adjacent metal simple plate, thereby forming at least one passage within the apparatus for each of said one chemical and said at least one other chemical, such that at least one passage for said one chemical and at least one passage for said at least one other chemical merge within the apparatus to form a reaction chamber, the chemical product being formed within said reaction chamber by a reaction between said one chemical and said at least one other chemical which are thoroughly mixed, openings in the metal simple plates being configured such that said one chemical and said at least one other chemical are introduced into the reaction chamber as a stacked laminar flow, the stacked laminar flow comprising a layer of said one chemical and a layer of said at least one other chemical stacked on top of one another; and (b) means for facilitating a permanent assembly of the plurality of metal simple plates into a leak proof stacked plate reactor, said means comprising a mean surface roughness of the metal simple plates being less than about 5 micrometers, and the metal simple plates being substantially free of scratches.

70. Apparatus for reacting one chemical with at least one other chemical to form a chemical product, said apparatus comprising:

(a) a plurality of metal simple plates stacked in layers, each metal simple plate having at least one opening that extends therethrough, an opening in each metal simple plate overlapping at least one other opening in an adjacent metal simple plate, thereby forming at least one passage within the apparatus for each of said one chemical and said at least one other chemical, such that at least one passage for said one chemical and at least one passage for said at least one other chemical merge within the apparatus to form a reaction chamber, the chemical product being formed within said reaction chamber by a reaction between said one chemical and said at least one other chemical, and at least some of the openings being configured and oriented to achieve a mixing pathway in which said one chemical and said at least one other chemical are thoroughly mixed, such that said one chemical and said at least one other chemical experience substantially equivalent pressure drops in the mixing pathway while also achieving a horizontal flow stacked with respect to each other that is orthogonal to a thickness of the simple plates; and (b) means for facilitating a permanent assembly of the plurality of metal simple plates into a leak proof stacked plate reactor, said means comprising a mean surface roughness of the metal simple plates being less than about 1 micrometers, and the metal simple plates being substantially free of scratches.

71. A chemical reactor for processing at least two reactants to form a desired chemical product, comprising:

(a) a stack of simple plates, including two outer simple plates and a plurality of intermediate simple plates;

(b) at least two reactant inlet openings for receiving the at least two reactants, such that each different reactant is directed into a different reactant inlet opening; and an outlet opening for discharging the chemical product, each reactant inlet opening and the outlet opening being formed in at least one of the outer simple plates;

(c) an opening through at least one of the plurality of intermediate simple plates forming a reaction chamber, the reaction chamber being in fluid communication with each reactant inlet opening for receiving the reactants, the at least two reactants mixing in the chemical reactor and reacting therein to produce the chemical product, the reaction chamber also being in fluid communication with the outlet opening, so that the chemical product is discharged from the chemical reactor through the outlet opening;

(d) a first heat exchange fluid inlet port and a first heat exchange fluid outlet port through which a first heat transfer fluid is introduced into and discharged from the chemical reactor, the first heat exchange fluid inlet port and the first heat exchange fluid outlet portion being formed in at least one of the outer simple plates;

(e) a first heat exchanger defined by an opening in at least one intermediate simple plate in the stack and by adjacent simple plates disposed on opposite sides of the opening, the first heat exchanger being in fluid communication with the first heat exchanger fluid inlet port and the first heat exchanger fluid outlet port, the first heat exchanger being disposed to thermally condition at least one of:

(i) a first reactant;

(ii) a second reactant; and (iii) a product produced as a result of mixing said at least two reactants; and (f) a second heat exchanger defined by an opening in at least one intermediate simple plate in the stack and by adjacent simple plates disposed on opposite sides of the opening, the opening being in fluid communication with the first heat exchange fluid inlet port and the first heat exchange fluid outlet port.

72. A chemical reactor for processing at least two reactants to form a desired chemical product, comprising:

(a) a stack of simple plates, including two outer simple plates and a plurality of intermediate simple plates;

(b) at least two reactant inlet openings for receiving the at least two reactants, such that each different reactant is directed into a different reactant inlet opening; and a product outlet opening for discharging the chemical product, each reactant inlet opening and the product outlet opening being formed in at least one of the outer simple plates;

(c) a first fluid path for a first one of the at least two reactants, the first fluid path being formed by openings in at least some of the plurality of intermediate simple plates;

(d) a second fluid path for a second one of the at least two reactants, the second fluid path being formed by openings in at least one of the plurality of intermediate simple plates;

(e) an opening through at least one of the plurality of intermediate simple plates forming a reaction chamber, the reaction chamber being in fluid communication with each reactant inlet opening for receiving the reactants, with the first fluid path, and with the second fluid path, the at least two reactants thoroughly mixing in the chemical reactor and reacting therein to produce the chemical product, the reactant chamber also being in fluid communication with the product outlet opening, so that said chemical product is discharged from the chemical reactor through the product outlet opening; and (f) an inter-digital-mixer that separates and aligns the first fluid path and the second fluid path, forming a plurality of individual fluid paths for the first one of the at least two reactants and a plurality of individual fluid paths for the second one of the at least two reactants, the inter-digital-mixer being formed by openings in at least one of the plurality of intermediate simple plates, the inter-digital-mixer facilitating diffusion mixing.

73. A chemical reactor for processing at least two reactants to form a desired chemical product, comprising:

(a) a stack of simple plates, including two outer simple plates and a plurality of intermediate simple plates;

(b) at least two reactant inlet openings for receiving the at least two reactants, such that each different reactant is directed into a different reactant inlet opening; and a product outlet opening for discharging the chemical product, each reactant inlet opening and the outlet opening being formed in at least one of the outer simple plates;

(c) an elongate opening through at least one of the plurality of intermediate simple plates forming a mixing chamber, the elongate opening extending along a horizontal axis of the intermediate simple plate in which the elongate opening is formed, a vertical axis corresponding to a thickness of the intermediate simple plate, the elongate opening being in fluid communication with the at least two reactant inlet openings, such that a first one of the at least two reactants is introduced into the mixing chamber via a first opening in an immediately adjacent intermediate simple plate, while a second one of the at least two reactants is introduced into the mixing chamber via a second opening in the immediately adjacent intermediate simple plate, such that the first one and the second one of the at least two reactants establish a parallel horizontal flow stacked with respect to each other in the mixing chamber; and (d) at least one additional opening through a different one of the plurality of intermediate simple plates forming a reaction chamber, the reaction chamber being in fluid communication with each reactant inlet opening for receiving the at least two reactants and with the mixing chamber, the at least two reactants thoroughly mixing in the mixing chamber and reacting in the reaction chamber to produce the chemical product, each opening for discharging fluid from said reaction chamber being configured to discharge the desired chemical product, said reaction chamber also being in fluid communication with the product outlet opening, so that the chemical product is discharged from the chemical reactor through the product outlet opening.

74. A chemical reactor for processing at least two reactants to form a desired chemical product, comprising:
   (a) a stack of simple plates, including two outer simple plates and a plurality of intermediate simple plates;
   (b) at least two reactant inlet openings for receiving the at least two reactants, such that each different reactant is directed into a different reactant inlet opening; and an outlet opening for discharging the chemical product, each reactant inlet opening and the outlet opening being formed in at least one of the outer simple plates;
   (c) an opening through at least one of the plurality of intermediate simple plates forming a reaction chamber, the reaction chamber being in fluid communication with each reactant inlet opening for receiving the reactants, the at least two reactants mixing in the chemical reactor and reacting therein to produce the chemical product, the reaction chamber also being in fluid communication with the outlet opening, so that the chemical product is discharged from the chemical reactor through the outlet opening;
   (d) a heat exchange fluid inlet port and a heat exchange fluid outlet port through which a heat transfer fluid is introduced into and discharged from the chemical reactor, the heat exchange fluid inlet port and the heat exchange fluid outlet port being formed in at least one of the outer simple plates; and
   (e) a heat exchanger defined by an opening in at least one intermediate simple plate in the stack and by adjacent simple plates disposed on opposite sides of the opening, the heat exchanger being in fluid communication with the heat exchanger fluid inlet port and the first exchanger fluid outlet port, the heat exchanger being fluidically isolated from a volume defined by openings in at least one of the plurality of intermediate simple plates by a heat transferring intermediate simple plate, the heat transferring intermediate simple plate having a thickness that is at least about 0.2 millimeters and not more than about 0.6 millimeters, the heat exchanger being configured to thermally condition a fluid in the volume.

75. The chemical reactor of claim 74, wherein the volume comprises the reaction chamber.

76. The chemical reactor of claim 74, wherein the volume comprises a fluid path coupling at least one of the at least two reaction inlet openings to the reaction chamber.

77. The chemical reactor of claim 74, wherein the heat transferring intermediate simple plate has a thickness of about 0.3 millimeters.

78. Apparatus for reacting one chemical with at least one other chemical to form a chemical product, said apparatus comprising a plurality of flat simple plates stacked in layers, an opening in each simple plate overlapping at least one other opening in an adjacent simple plate, thereby forming at least one passage within the apparatus for each of said one chemical and said at least one other chemical, such that at least one passage for said one chemical and at least one passage for said at least one other chemical merge within the apparatus to form a reaction chamber wherein said one chemical and said at least one other chemical are thoroughly mixed, the chemical product being formed within said reaction chamber by a reaction between said one chemical and said at least one other chemical, each flat simple plate consisting of:
   (a) a first planar surface;
   (b) a second planar surface that is opposite to said first planar surface, both said first and said second planar surfaces being substantially parallel;
   (c) peripheral edges defining a perimeter of said first and said second planar surfaces; and
   (d) each opening penetrates said first planar surface and said second planar surface, but not said peripheral edges, each passage for said one chemical and said at least one other chemical and the reaction chamber consisting of said openings in said simple plates.

79. The chemical reactor of claim 78, wherein at least one flat simple plate immediately adjacent to an opening defining a heat exchanger has a thickness of about 0.3 millimeters.

80. Apparatus for reacting one chemical with at least one other chemical to form a chemical product, said apparatus comprising a plurality of simple plates stacked in layers, each simple plate having at least one opening that extends therethrough, an opening in each simple plate overlapping at least one other opening in an adjacent simple plate, thereby forming at least one passage within the apparatus for each of said one chemical and said at least one other chemical, such that at least one passage for said one chemical and at least one passage for said at least one other chemical merge within the apparatus to form a reaction chamber, the chemical product being formed within said reaction chamber by a reaction between said one chemical and said at least one other chemical, overlapping openings also forming at least one heat transfer volume, the at least one heat transfer volume being disposed to enable thermal conditioning of one of the at least one passage for said one chemical and the at least one passage for said at least one other chemical, without thermally conditioning the other of the at least one passage for said one chemical and the at least one passage for said at least one other chemical.

81. Apparatus for reacting one chemical with at least one other chemical to form a chemical product, said apparatus comprising a plurality of simple plates stacked in layers, each simple plate having at least one opening that extends therethrough, a first planar surface, and a second planar surface that is opposite to said first planar surface, both said first and said second planar surfaces being substantially parallel, each simple plate further having edge surfaces extending between said first and said second planar surfaces, such that each opening penetrates said first planar surface and said second planar surface, but not said edge surfaces, an opening in each simple plate overlapping at least one other opening in an adjacent simple plate, thereby forming:
   (a) at least one passage within the apparatus for each of said one chemical and said at least one other chemical, such that at least one passage for said one chemical and at least one passage for said at least one other chemical merge within the apparatus to form a reaction chamber, the chemical product being formed within said reaction chamber by a reaction between said one chemical and said at least one other chemical; and
   (b) at least one heat transfer volume, the at least one heat transfer volume being disposed so as to enable simultaneous thermal conditioning of at least two of: the at least one passage for said one chemical, the at least one passage for said at least one other chemical, and the reaction chamber; the at least one heat transfer volume being fluidicially isolated from the at least one passage for said one chemical, the at least one passage for said at least one other chemical, and the reaction chamber.

82. A reactor for carrying out a chemical process, comprising a plurality of simple plates stacked together in layers, each simple plate comprising a first planar surface, and a second planar surface that is opposite to said first planar surface, said first and said second planar surfaces being substantially parallel to each other, each simple plate further having edge surfaces extending between said first and said second planar surfaces, said reactor including at least two chemical reactant inlet ports and at least one product outlet port for the receipt and discharge of a chemical product, each chemical reactant inlet port and each product outlet port being defined by an opening in a simple plate that penetrates the first planar surface and the second planar surface of the simple plate, but not the edge surfaces of the simple plate, at least two inlet pathways for accommodating the chemical reactants, wherein each inlet pathway is connected in fluid communication with a different one of said chemical reactant inlet ports, said at least two inlet pathways merging within the reactor to form at least one reaction chamber in which at least two chemical reactants react to generate a chemical product, at least one outlet pathway coupling said at least one reaction chamber in fluid communication with said at least one product outlet port, at least one heat exchanger volume being also provided, said at least one heat exchanger volume being disposed to thermally condition at least one of the chemical reactants, as well as at least one reaction chamber, the at least one heat exchanger volume being fluidically isolated from the at least two inlet pathways and the at least one reaction chamber, and wherein each chemical reactant inlet port, each inlet pathway, each reaction chamber, each heat exchanger volume, and each product outlet port comprises an opening through at least one simple plate aligned with at least a portion of an opening through an adjacent simple plate.

83. A method for fabricating and then using a chemical reactor for combining one chemical reactant with at least one other chemical reactant to form a desired chemical product, comprising the steps of:
(a) providing a plurality of simple plates, said plurality of simple plates including two outer simple plates and a plurality of intermediate simple plates in which are formed at least one opening, at least one of the outer simple plates including at least two inlet ports for said one chemical reactant and said at least one other chemical reactant, and an outlet port for discharging the desired chemical product;
(b) stacking said plurality of simple plates such that said at least one opening in said plurality of intermediate simple plates is in fluid communication with each inlet port and the outlet port, so that the one chemical reactant and said at least one other chemical reactant entering the chemical reactor via different inlet ports are combined within the at least one opening in the plurality of intermediate simple plates, openings in the intermediate simple plates being configured and oriented to enable mixing of said one chemical reactant and said at least one other chemical reactant to be achieved while said one chemical reactant and said at least one other chemical reactant each flow in a stacked relationship with respect to one another through a horizontally extending opening in at least one intermediate simple plate, such that a direction of the flow of said one chemical and said at least one other chemical in the horizontally extending opening is orthogonal to a thickness of the intermediate simple plate;
(c) securing said plurality of simple plates in the stack, thereby achieving a stacked plate reactor; and then
(d) introducing the one chemical reactant and the at least one other chemical reactant into said reactor, such that mixing of the one chemical reactant and the at least one other chemical reactant results in a chemical reaction between the one chemical reactant and the at least one other chemical reactant, thereby yielding the desired chemical product, which is directed out of the reactor via the outlet port.

84. A method for fabricating and then using a chemical reactor for combining one chemical reactant with at least one other chemical reactant to form a desired chemical product, comprising the steps of:
(a) providing a plurality of simple plates, said plurality of simple plates including two outer simple plates and a plurality of intermediate simple plates in which are formed at least one opening, each simple plate comprising a first planar surface, and a second planar surface that is opposite to said first planar surface, both said first and said second planar surfaces being substantially parallel, each plate further having peripheral edges defining a perimeter of said first and said second planar surfaces, such that each opening penetrates said first planar surface and said second planar surface, but not said peripheral edges, at least one of the outer simple plates including at least two inlet ports for said one chemical reactant and said at least one other chemical reactant, and an outlet port for discharging the desired chemical product;
(b) stacking said plurality of simple plates such that said at least one opening in said plurality of intermediate simple plates is in fluid communication with each inlet port and the outlet port, such that the one chemical reactant and said at least one other chemical reactant entering the chemical reactor via different inlet ports are combined within the at least one opening in the plurality of intermediate simple plates, and such that a portion of a fluid pathway for the one chemical reactant and said at least one other chemical reactant is defined by three adjacent simple plates, said fluid pathway is present as a horizontal channel, a top of the channel being defined by an upper one of the three adjacent simple plates, a bottom of the channel being defined by a lower one of the three adjacent simple plates, and each vertical side of the channel being defined by only a side of an opening in a middle one of the three adjacent simple plates;
(c) securing said plurality of simple plates in the stack, thereby achieving a stacked plate reactor; and then
(d) introducing the one chemical reactant and the at least one other chemical reactant into said reactor, such that mixing of the one chemical reactant and the at least one other chemical reactant results in a chemical reaction between the one chemical reactant and the at least one other chemical reactant, thereby yielding the desired chemical product, which is directed out of the reactor via the outlet port.

85. A method for configuring and then using a stacked plate chemical reactor for combining at least two reactants to produce a desired product, such that at least one fluid pathway within the stacked plate chemical reactor comprises overlapping openings in adjacent plates, comprising the steps of:

(a) defining at least one fluid pathway within the stacked plate chemical reactor;

(b) for each defined fluid pathway, determining a size and a disposition of an opening on each individual plate through which the defined fluid pathway will pass, such that:

(i) when the stacked plate reactor is assembled in a defined order, each defined fluid pathway is established within the stacked plate chemical reactor;

(ii) at least two of the stacked plates of the stacked plate reactor comprise simple plates that are disposed adjoining each other; and (iii) openings in adjacent simple plates being configured and oriented to enable said at least two reactants to achieve a stacked laminar flow in a mixing pathway, the stacked laminar flow including a plurality of alternating stacked layers of said at least two reactants;

(c) assemblying a plurality of individual simple plates having openings corresponding to those determined to be required to achieve each defined fluid pathway, in the order required to achieve a stacked plate chemical reactor that includes each defined fluid pathway; and then (d) introducing at least two reactants into said reactor, such that mixing of said at least two reactants results in a chemical reaction between said at least two reactants, thereby yielding the desired product, which is directed out of the reactor via an outlet port.

86. A method for fabricating and then using a chemical reactor for combining one chemical reactant with at least one other chemical reactant to form a desired chemical product, comprising the steps of:

(a) providing a plurality of simple plates, said plurality of simple plates including two outer simple plates and a plurality of intermediate simple plates in which are formed at least one opening, at least one of the outer simple plates including at least two inlet ports for said one chemical reactant and said at least one other chemical reactant, and an outlet port for discharging the desired chemical product;

(b) stacking said plurality of simple plates such that said at least one opening in said plurality of intermediate simple plates is in fluid communication with each inlet port and the outlet port, such that the one chemical reactant and said at least one other chemical reactant entering the chemical reactor via different inlet ports are combined within the at least one opening in the plurality of intermediate simple plates, such that:

(i) a first reactant inlet fluid path coupling a first one of the at least two inlet ports to a mixing volume and a second reactant inlet fluid path coupling a second one of the at least two inlet ports to the mixing volume each exhibit substantially equivalent pressure drops; and (ii) a stacked laminar flow comprising a plurality of alternating layers of each of the one chemical reactant and the at least one other chemical reactant is established in the mixing volume;

(c) securing said plurality of simple plates in the stack, thereby achieving a stacked plate reactor; and (d) introducing the one chemical reactant and the at least one other chemical reactant into said reactor, such that mixing of the one chemical reactant and the at least one other chemical reactant results in a chemical reaction between the one chemical reactant and the at least one other chemical reactant, thereby yielding the desired chemical product, which is directed out of the reactor via the outlet port.

\* \* \* \* \*